US008639260B2

(12) United States Patent
Fox et al.

(10) Patent No.: US 8,639,260 B2
(45) Date of Patent: Jan. 28, 2014

(54) TELECOMMUNICATION NETWORKS

(75) Inventors: David Andrew Fox, Newbury (GB); Youssef Chami, Newbury (GB); Steve Allen, Newbury (GB); John McCracken, Newbury (GB); Matthew Cheng, Newbury (GB); Marina Gallego-Lopez, Newbury (GB)

(73) Assignee: Vodafone IP Licensing Limited, Newbury, Berkshire (GB)

( * ) Notice: Subject to any disclaimer, the term of this patent is extended or adjusted under 35 U.S.C. 154(b) by 36 days.

(21) Appl. No.: 13/135,438

(22) Filed: Jul. 5, 2011

(65) Prior Publication Data
US 2012/0064908 A1 Mar. 15, 2012

(30) Foreign Application Priority Data

| Jul. 2, 2010 | (GB) | 1011162.3 |
| Jul. 2, 2010 | (GB) | 1011166.4 |
| Jul. 2, 2010 | (GB) | 1011168.0 |
| Jul. 2, 2010 | (GB) | 1011176.3 |
| Jul. 2, 2010 | (GB) | 1011177.1 |
| Sep. 13, 2010 | (GB) | 1015219.7 |
| Sep. 29, 2010 | (GB) | 1016343.4 |

(51) Int. Cl.
*H04W 72/00* (2009.01)
(52) U.S. Cl.
USPC ..... 455/452.1; 455/450; 455/423; 455/432.1; 455/435.1; 455/422.1; 455/418; 455/522
(58) Field of Classification Search
USPC ........ 455/423, 452, 450, 435.1, 432.1, 422.1, 455/418, 522
See application file for complete search history.

(56) References Cited

U.S. PATENT DOCUMENTS

| 5,457,680 | A | * | 10/1995 | Kamm et al. ................. 370/332 |
| 6,125,278 | A | | 9/2000 | Wieczorek et al. |
| 6,980,808 | B1 | | 12/2005 | Smith |
| 2004/0017310 | A1 | | 1/2004 | Vargas-Hurlston et al. |
| 2010/0214923 | A1 | | 8/2010 | Vivanco et al. |

FOREIGN PATENT DOCUMENTS

| EP | 1 195 073 B1 | 3/2006 |
| EP | 1 777 890 A1 | 4/2007 |
| EP | 1 959 703 A1 | 8/2008 |
| EP | 2 073 486 A1 | 6/2009 |
| EP | 2 347 629 A | 5/2010 |
| WO | WO 00/10296 | 2/2000 |
| WO | WO 2010/052570 A1 | 5/2010 |

OTHER PUBLICATIONS

Jonathan Rodriguez, et al., "A Middleware Architecture Supporting Seamless and Secure Multimedia Services Across an Intertechnology Radio Access Network-Seamless Content Delivery in the Future Mobile Internet", IEEE Wireless Communications, Oct. 1, 2009, XP011279051, ISSN: 1536-1284, vol. 16, No. 5, pp. 24-31.

* cited by examiner

*Primary Examiner* — Nghi H Ly
(74) *Attorney, Agent, or Firm* — Muirhead and Saturnelli, LLC

(57) ABSTRACT

A mobile telecommunications network includes a core and a radio access network having a radio for wireless communication with mobile terminals registered with the network, wherein the radio access network includes a controller operable to control the use of network resources by the mobile terminals. The controller may include an application programming interface, API, which provides a consistent interface to a multiplicity of applications hosted on the control mean. The controller may be provided at an access node site and/or a gateway site.

15 Claims, 22 Drawing Sheets

TELECOMMUNICATION NETWORKS

TECHNICAL FIELD

This application relates to a mobile telecommunications network including a core and a radio access network having a radio that wirelessly communicates with mobile terminals registered with the network, and to a method of operating such a mobile telecommunications network.

BACKGROUND

Recently, a dramatic rise in sales of both smart-phones and laptop data cards has resulted in a substantial increase in the amount of data communications passing through mobile telecommunications networks. This volumetric increase can also be attributed to enhancements made to the capabilities of the networks. In fact it has been reported that mobile data growth grew 30 percent over the course of the second quarter of 2009. The most popular use for mobile data was HTTP browsing, although usage of HTTP streaming is growing considerably. Other mobile data uses include HTTP downloading and Peer-to-Peer (P2P) activities such as file sharing.

This ability to use the cellular networks for mobile data services, such as Internet browsing, is resulting in subscribers treating their mobile networks in much the same way as they treat their fixed networks. That is, users are tending to expect the same service from the Internet, irrespective of their access method. However, mobile networks have a more restricted capacity and are more costly to operate, as compared to fixed networks.

In this regard, from the network operator's viewpoint, as the mobile broadband traffic volume carried over 2G, 3G and HSPA (High Speed Packet Access) networks continues to grow, the cost of supporting this data volume is becoming more and more expensive based on the current network architecture and deployments. In fact, access and data volumes are likely to rise faster than the revenue used to build and maintain the networks. This cost differential is exacerbated by one of the current business models being utilised, whereby operators charge a flat rate for unlimited amounts of data.

The increased usage is also unfortunately likely to result in an increase of data traffic jams, and hence a degradation of service for mobile users if not properly managed.

It has been proposed to control data-heavy users by "choking" the bandwidth available to them when a maximum data volume limit is exceeded. Whilst this addresses the problem on an individual level, it does not address the network capacity problem as a whole.

It is therefore apparent that mobile broadband is at a crossroads as networks and business models are strained by bandwidth demand that is unmatched by revenue generation.

These problems may only get worse with moves to position mobile data as a replacement for fixed DSL (Digital Subscriber Line) access and with the advent of higher radio access speeds with the proposed 4G LTE/SAE (Long Term Evolution/System Architecture Evolution) network. A large percentage of this traffic may consist of data which is destined for the public Internet, a significant proportion of which mobile operators may not be able to add value to, despite carrying the data on their own backhaul transport, core transport or cellular core infrastructure.

In addition to the problems discussed above, conventional mobile telephone communications networks have architectures that are hierarchical and expensive to scale. Many of the network elements, such as the BTS, routers, BSC/RNC etc are proprietary: devices of one manufacturer often do not interface with devices from another manufacturer. This makes it difficult to introduce new capabilities into the network as a different interface may be required for devices from each manufacturer. Further, conventional base stations are not capable of intelligent local routing or processing. Furthermore, the capacity of existing networks is not always used effectively. For example, many cell sites are under used, whilst others are heavily used.

The current network architecture has the following disadvantages:—
- Hierarchical and expensive to scale
- Backhaul is a major problem
- Proprietary platforms: BTS, BSC/RNC, SGSN etc
- Closed nodes and interfaces
- Very limited application or customer awareness (except for QoS priority)
- No intelligent local routing or processing
- Inefficient use of installed capacity There is therefore a need to overcome or ameliorate at least one of the problems of the prior art. In particular there is a need to address the needs of both the network operators and the users in improving the provision of mobile broadband data services.

SUMMARY OF THE INVENTION (P100937-GB-PSP)

In one aspect the system described herein provides a mobile telecommunications network including a core and a radio access network having a for wireless communication with mobile terminals registered with the network, wherein the radio access network includes a controller operable to control the allocation of network resources to the mobile terminals, and wherein the controller is operable to gauge the radio conditions available to the mobile terminals and to control the transmission of data between the radio access network and the mobile terminals in dependence thereon.

In the embodiment the radio access network comprises a plurality of cells and the controller controls the transmission of data within a one of the cells in dependence upon the gauged conditions within that cell.

The controller may gauge the radio conditions by assessing the radio conditions available to the mobile terminals. For example, the controller may calculate the load on the cell and/or the quality of the radio conditions at the location of the mobile terminals.

The controller may be operable to gauge the radio conditions by predicting the radio conditions available to the mobile terminals. The controller may build and maintain a record of radio quality across a coverage area of the network (a cell in the embodiment), and may use this record to predict the radio conditions available to the mobile terminals within that coverage area. The record may be in the form of a map of the coverage area, indicating which areas of the coverage area provide which qualities of radio coverage. The controller may calculate the present location and/or velocity of the mobile terminal and may control the transmission of data in dependence thereon. In the embodiment the controller uses the record of radio quality across the coverage area and the calculated present location and velocity of one of the mobile terminals to estimate the radio conditions available to that mobile terminal at a future location and to control the transmission of data between the radio access network and that mobile terminal at the calculated location in dependence thereon. That is, the controller may calculate the present location of the mobile terminal. If the velocity of the mobile terminal is also calculated, this allows the position of the mobile terminal at a time in the future to be estimated. By consulting the record of radio quality across the coverage area, the controller can determine the radio conditions at an estimated future location of the mobile terminal. The controller may increase the amount of data transmitted at the calculated (present) location of the mobile terminal if the radio conditions at the estimated future location predicted to be below a quality threshold. Alternatively or additionally, the controller may decrease the amount of data transmitted at that calculated (present) location of the mobile terminal if the radio conditions at the future location are predicted to be above a quality threshold. For example, in the embodiment, if the controller determines that the mobile terminal is moving from a present location in which radio conditions are relatively poor to a future location in which the radio conditions are relatively good, the amount of data transmitted to the mobile terminal at the present location may be reduced, and the amount of data that is transmitted at the future location is increased. Conversely, if the present radio conditions are assessed to be relatively good, and the future radio conditions are predicted to be relatively poor, then additional data may be transmitted to the mobile terminal at the present location, and less or no data may be transmitted at the predicted future location. Advantageously, the mobile terminal includes a buffer or other memory for storing this received data. According to the embodiment, relatively more data may be transmitted to the buffer when the mobile terminal experiences good radio conditions then when the mobile terminal experience is poor radio conditions. This is advantageous because the transmission of data when the mobile terminal experiences good radio conditions is much more efficient in terms of bandwidth used.

The system described herein also provides a telecommunications method as defined in the claims.

In another aspect, there is provided a mobile telecommunications network including a core and a radio access network having a radio for wireless communication with mobile terminals registered with the network, wherein the radio access network includes a controller operable to control the allocation of network resources between mobile terminals and between radio access nodes.

This controller may be operable to assess the downlink radio quality, downlink bandwidth efficiency for the mobile terminals and to transmit data to the mobile terminals in dependence thereon This controller may be operable to assess the uplink radio quality, uplink bandwidth efficiency for the mobile terminals and to allocate network resources to the mobile terminals in dependence thereon This controller may be operable to calculate the location of the mobile terminal The calculation of the location is determined through measurements of own and neighbouring cell provided by the mobile terminal.

The calculation of the location is determined through network measurements of transmissions from the mobile terminal.

The controller may be operable to build and maintain a coverage/quality map of radio quality across the coverage area, and to transmit data or allocate network resources to the mobile terminals in dependence thereon.

The controller may measure the change in location to determine the speed and direction of the mobile terminals The controller may be operable to predict future downlink radio quality, and downlink bandwidth efficiency for the mobile terminal and act thereon.

The controller may be operable to predict future uplink radio quality, uplink bandwidth efficiency for the mobile terminals and to allocate network resources to the mobile terminals in dependence thereon.

The predicted future radio conditions are used by the controller to schedule the transmission of data The predicted future radio conditions may be used by the controller to differentially allocate resources to the mobile terminals The predicted future radio conditions may be used by the controller to optimise the scheduling of applications hosted by the controller or by the mobile terminals The predicted future radio conditions may be used by the controller to optimise the network parameters for caching, media optimisation, traffic routing and radio parameters.

The predicted future radio conditions may be used by the controller to trigger optimisations and RRM decisions on other cells hosted by the controller or other controller.

In a further aspect, there is provided a mobile telecommunications network including a core and a radio access network having a radio for wireless communication with mobile terminals registered with the network, wherein the radio access network includes a controller operable to control the use of network resources by the mobile terminals, and wherein the controller is operable to predict the current and future radio quality and capacity available to the mobile terminals and to transmit data, initialise applications or terminate applications in dependence thereon.

The controller may be operable to build and maintain a logical map of radio quality across its coverage area, and to transmit data initialise applications or terminate applications to the mobile terminals in dependence thereon.

The controller may determine location of mobile terminals through radio measurement.

The controller may determine speed of mobile terminals through changes in radio measurements.

The radio measurements may include received signal strength, transmit power levels, neighbour cell measurements.

The controller may modify the radio measurement control parameters to give greater resolution to frequency of measurement.

The controller may controls the flow of packets for specific applications.

The controller may control the resource allocated by the controller to each mobile terminal. The resources include the memory resources, Call Admission Control parameters, Cell load/congestion parameters.

The controller may measure the speed and direction of the mobile terminals, and uses this in conjunction with future radio link quality measurements.

The radio link quality measurements may include CQI, ACK/NACK ratios, BLER, Frame Errors Rates, BERs, Qqual, RSSI, RSCP . . . etc.

The flow of data to the mobile terminal may be controlled dependent on knowledge of:
   mobile terminal buffer occupancy,
   Basestation Downlink Buffer Occupancy, and/or
   Video playback rate and session duration and volume of
      data transmitted by the session.

The controller may initiate or terminate an application hosted by or controlled by the controller based on the prediction of the future radio environment.

In another aspect, the system described herein provides a mobile telecommunications network including a core and a radio access network having a radio for wireless communication with mobile terminals registered with the network, wherein the radio access network includes a controller operable to control the allocation of network resources to the mobile terminals, and wherein the controller is operable to gauge the radio conditions and backhaul (between the radio access network and the core) available to the mobile terminals and to control the transmission of data between the radio access network and the mobile terminals in dependence thereon.

The controller may be operable to gauge the radio conditions by assessing the radio conditions and backhaul resources available to the mobile terminals.

The controller may be operable to gauge the radio conditions by predicting the backhaul capacity available to the mobile terminals.

The controller may be operable to build and maintain a record of backhaul capacity for a cell or radio site, and to use this record to predict the backhaul capacity available to the mobile terminals.

The controller may be operable to trigger initialisation, suspension or termination of applications based on the radio conditions or backhaul capacity measured or predicted.

The controller may be operable to control transmission of the data based on the current and predicted mobile location.

The system described herein also provides a method of operating a mobile telecommunications network.
(P100971-GB-PSP)

The system described herein provides in another aspect a mobile telecommunications network including a core and a radio access network having a radio for wireless communication with terminals registered with the network, wherein the radio access network includes a controller operable to control the use of network resources by the terminals, wherein the controller hosts at least one application that provides service to at least one of the terminals, and wherein the controller is operable to adjust the use of network resources in dependence upon the application providing service to the terminal.

The controller may be operable to adjust the content provided by the application. For example, the content may be a web page, and the resolution of the web page may be reduced in order to reduce use of network resources by the application if the controller determines that this is appropriate.

The system described herein also provides a mobile telecommunications network including a core and a radio access network having a radio for wireless communication with terminals registered with the network, wherein the radio access network includes a controller operable to control the use of network resources by the terminals, wherein at least one of the terminals runs at least one application that provides service to the terminal, and wherein the terminal further includes a resource manager operable to adjust the network resource used by the application.

The resource manager may be a firewall.

The resource manager may be operable to receive network resource data from the controller and to adjust the network resource used by the application in dependence upon the network resource data.

The resource manager may receive network resource data from controller by any suitable mechanism. Cell broadcast may be used to efficiently transmit receive network resource data to a plurality of terminals simultaneously.

The controller may monitor whether the terminal uses network resource in accordance with the provided network resource data. Data packets that are transmitted that are not in accordance with the provided network resource data may be discarded.

The resource manager may be an application aware scheduler.

The resource manager may be operable to adjust the network resource used by the application in dependence upon a characteristic of the application. For example, the characteristic may include whether data delay (latency) is acceptable. The resource manager may allocate more resources to an application where data delay in unacceptable, such as a VoIP application.
(P100935-GB-PSP)

According to a further aspect of the system described herein, there is provided a mobile telecommunications network including a core and a radio access network having a radio for wireless communication with mobile terminals registered with the network, wherein the radio access network includes a controller operable to control the use of network resources by the mobile terminals, and wherein the controller is operable control to the transfer of data between the mobile terminals and a store.

The data may be data for upload from the mobile terminals to the store. The data may be backup data from the mobile terminals.

The controller may be operable to temporarily store data transmitted from the mobile terminals at the radio (e.g., radio site/access node), for subsequent transmission to the data store.

The controller may be operable to temporarily store backup data from the mobile terminals, for subsequent transmission to the store.

The store may be provided at the core, a webpage and/or cloud storage.

The controller may be provided on a novel "platform" of the type described in detail below in the detailed embodiment to be described by way of example. The controller may include a backup or upload application implemented on such a platform.

The backup data may be transmitted from the terminals to the core backup store, cloud storage or website, or from the backup store to the terminal, or in both directions.

The controller may be operable to temporarily store data from the mobile terminals for subsequent transmission to the core backup store, cloud storage or website. However, in some circumstances the data may be retained for long term storage or permanent storage by the controller—for example if it is determined that the terminal is fixed in position or has a low mobility state, so that it is likely that, should the data be required again by the terminal, the terminal may be in communication with the same controller. The controller may include local storage for storing the data (whether temporarily or otherwise).

The controller may transmit the temporarily stored backup data (for example to the core backup store, cloud storage or website) in dependence upon one or more predetermined criteria. The criteria may be determined by the controller and may include at least one of location of the terminal, priority of the data, radio site backhaul load, network load, time of day, user's subscription information, mobility of the terminal (e.g., whether it is stationary, fast moving or slow moving), available storage on the terminal and/or core backup store, cloud storage or website, radio access technology through which the mobile terminal is connected (such as 2G, 3G etc), offered throughput for the terminal (the communication speed available to the terminal at its current location), the anticipated user experience of the data flow with the current network load, and the user activity in other services (such as other requirements for data communication by other services being used by the terminal).

The controller may be provided at an access node site at the edge of the network, data stores may be provided in addition to the core backup store, cloud storage or website. Each distributed backup store may be associated with a respective controller (and may be in the same geographical location as the controller or proximate the controller). The controller may control when data from each backup store (whether the core backup store or one or more of the distributed backup stores) is transmitted to the terminal or to another one of the backup stores (the core backup store or one or more of the distributed backup stores).

The controller may predict the future location of terminals and control on which of the backup stores (core backup store and/or distributed backup store, cloud storage or website) data are stored in dependence upon the predicted future location. Advantageously, the controller may select a backup store that is likely to be at a location geographically near the mobile terminal when this data are required in future.

The system described herein also provides a corresponding method of operating a mobile telecommunications network.

According to a another aspect of the system described herein, there is provided a mobile telecommunications network and a radio access network, both including data storage, having a radio for wireless communication with mobile terminals registered with the network, wherein the radio access network includes a controller operable to control the use of network resources by the mobile terminals, and wherein the controller is operable to control the uploading of data between the mobile terminals and storage in the core network, cloud storage or website.

The controller may be provided on a novel "platform" of the type described in detail below in the detailed embodiment to be described by way of example. The controller may include an application implemented on such a platform responsible for the transfer of data from terminal to a data store, for example to control uplink connections and data associated with such applications. The controller may chose to terminate data from the terminal at a local data store before later transmitting it to a data store in the core network, cloud storage or website.

The controller may transmit the temporarily stored data to a core data store, cloud storage or website in dependence upon one or more predetermined criteria, for example the available backhaul bandwidth.

According to a further aspect of the system described herein, there is provided a mobile telecommunications network and a radio access network having a radio for wireless communication with mobile terminals registered with the network, wherein the radio access network includes a controller operable to control the use of network resources by the mobile terminals, and wherein the controller is operable to control the backing up of data between the mobile terminals and storage in the core network, cloud storage or website.

According to a further embodiment of the system described herein, there is provided a mobile telecommunications network including a core having a store and a radio access network having a radio for wireless communication with mobile terminals registered with the network, wherein the radio access network includes a controller operable to control the use of network resources by the mobile terminals, and wherein the controller is operable to control the synchronisation of stored data between the mobile terminals and the backup data store.

In an embodiment to be described, the controller accesses a user specific context for each subscriber using a content synchronisation service. The user specific context may be available from the each backup store. The user specific context may include a list of locations and security credentials for each of the locations where data are stored for the specific user or mobile terminal. The user specific context may include a list of file names and content descriptions relating to the data stored for a specific user or mobile terminal at the or each of the storage locations.

In an embodiment, the controller may only synchronise a sub-set of the data stored in the backup store or the device.

In an embodiment, the data are selected for synchronisation by the user of the mobile terminal.

The selected data may be prioritised and scheduled for synchronisation by the user of the mobile terminal and/or the controller.

In an embodiment, the controller may be operable to synchronise data based on the measured location of the terminal.

In an embodiment, the controller selectively stores data destined for the mobile terminal prior to transmission to the terminal by the mobile network. For example, when it is required to restore backed up data to the mobile terminal, this data may be retrieved from the core backup store and may be temporally stored in a store associated with the controller until it is transmitted to the mobile terminal wirelessly by the network.

In an embodiment, the decision to store data in the or each backup store may be based upon user defined criteria and/or network operator defined criteria and/or criteria defined by the controller.

When a plurality of backup stores are provided, in an embodiment, the controller is operable to interconnect with the stores local to the mobile terminal, over a fixed (wired) connection or a mobile (wireless) connection, for example via the interne. The controller may synchronise a list of data stored locally, and may retrieve data from the local store when requested by the mobile terminal, or by network or user criteria.

The mobile terminal may access and synchronise selected data stored on local storage and the core backup store over the Internet.

The user defined criteria for data backup and/or restore may include, without limitation, priority, storage capacity of the mobile terminal, selected applications and data sources, time of day, terminal location, cost to synchronise, minimum throughput, minimum battery level, and specific services.

The operator defined criteria may include, without limitation: network load, time of day, user subscription information, priority of data, measured location of the device, mobility of the device, the available storage on the device and/or the or each backup store, the radio access technology through which the mobile is connected, the offered throughput for the terminal, and the user activity in other services.

In an embodiment, the controller selects the physical location of the backup store in dependence upon the registered billing address of the mobile terminal, the available storage resource, the typical usage patterns and movement patterns of the mobile terminal.

In an embodiment, the controller may consolidate user stored content from multiple local stores and backup stores in a single location.

In an embodiment, the controller may be operable to move the user's stored content from one backup store to another backup store (whether a local backup store or the core backup store).

In an embodiment, the movement of the content may be based on the available capacity in the or each backup store, a change in the user location, statistical analysis of terminal movement, and/or the typical type of access technology used by the user to synchronise or access the stored data.

In an embodiment, the controller may be operable to predict the future location of the mobile terminals based on historic movement patterns or based on user provided information. The controller may populate data stores at identified locations prior to the predicted user presence at those locations. This is advantageous because this means that the data are available locally to the mobile terminal, so the data can be provided more quickly and more efficiently to the mobile terminal.

In an embodiment, the controller may populate local data stores over the mobile (wireless/cellular) network, although this may also be done using a fixed (cable) connection.

In another aspect, the system described herein provides a mobile telecommunications network including a core having a backup store and a radio access network having a radio for wireless communication with mobile terminals registered with the network, wherein the radio access network includes a controller operable to control the use of network resources by the mobile terminals, and wherein the controller is operable control to the backing up of data from the mobile terminals to the backup store.

The controller may be operable to temporarily store backup data from the mobile terminals, for subsequent transmission to the backup store.

The controller may be operable to transmit the temporarily stored backup data in dependence upon network load. (P100943-GB-PSP)

In another aspect, the system described herein provides a mobile telecommunications network including a core and a radio access network having a radio for wireless communication with mobile terminals registered with the network, wherein the radio access network includes a controller operable to control the use of network resources by the mobile terminals, and wherein the controller is further operable to control the charging for use of the network resources.

The resources may be used directly by a mobile terminal user or by an application hosted by the controller that provides a service to the user.

In an embodiment, the controller may be provided by the novel "platform" described in detail below. In an embodiment, the controller may be implemented using a billing function on the platform that communicates with the charging/accounting functionality of the core network.

The controller may be operable to charge (e.g., the users) in dependence upon the performance of the radio. The performance of the radio may be measured throughout an active session during which network resources are consumed, such as when data are transmitted. The usage of radio may be grouped by performance criteria, defined by the controller, with different charging rates. For example, a higher charge may be made when the network performance (e.g., represented by data throughput/quality) is high, and a lower charge may be made when the performance is poor. The charging rate can be also linked to the required throughput or latency (e.g., guaranteed data rate is a different price than best effort data rate)

The controller may schedule the delivery of data (e.g., to users) in dependence upon the profitability of the transaction with the user. For example, network resources may be preferentially used to transmit data in transactions with users that generate greater a profit that transactions which generate less profit.

The controller may be operable to provide a cost quote to a user or an application before provision of network resources, such as delivery of data. The application may be hosted by the controller. The application may provide services to the user. The cost quote may be communicated to the hosted application over an open API of the controller, allowing a standardised interface between the application and other functionality of the controller, such as network functionality and soft nodes providing baseband functions. One or more quotes may be provided for the provision of network resources. For example, a quote for a higher cost may be provided for the transmission of data earlier or at a fast rate than for the transmission of data later or at a slower rate. The user or application may select the quote that best suits its needs. The data is then transmitted at an appropriate rate according to the selected quote. In an embodiment, the data transmission only commences after a cost quote has been accepted by the user or the application. The cost quote or quotes may be based on the measurements of radio conditions for the mobile terminal that is to receive the data and the network load applicable to the data transmission. These measurements may be performed in real-time, or these measurements may be based on statistical or historical information—which allows the current network or system load to be predicted, based on information, for example, about the geographical position of the mobile terminal or the time of day or date. The cost quote may include a set of variable performances (e.g., throughput, delay, percent of dropped data packets etc and their associated costs). In one arrangement, the application provides an indication of the maximum cost associated with a required transaction involving the use of network resources, and the controller receives this information of maximum cost and returns a delivery quote which indicates the offered delivery performance that can be provided corresponding to that quote. Thus, if the maximum cost is relatively high, the delivery quote may be high delivery performance (e.g., high data rate), and conversely if the maximum cost indication is low, the offered delivery performance may be lower (e.g., a lower data rate).

The controller may charge the user of the mobile terminal in dependence upon their location. The location may be measured by the controller through GPS or radio parameters, such as path loss, received power, neighbour cell measurements etc. The location may be a measure of a particular geographic location. For example, if the measured geographical location corresponds to the known home address of the user of the mobile terminal, the user may be charged at a different rate based on a "home" tariff. The location may be a measure of relative radio performance. For example the location may be associated with high or low radio quality within the radio coverage area of the network. If the radio coverage of the network at this location is known, then the charge for use of the network resources may depend upon the radio performance at the location. In locations where radio performance is poor, the charge may be higher to reflect the higher amount of resources that may be required to provide the data transmission.

The controller may be operable to charge (e.g., users) in dependence upon the characteristics of the data transmitted. The controller may charge the users in dependence upon the application type through which the data are transmitted. The controller may charge the user in dependence upon how frequently a user transitions between idle and active states. The controller may charge users in dependence upon the number of handovers performed during a data session. The controller may charge users in dependence upon the distance travelled during an active session. The controller may charge users in dependence upon whether content is served from a cache or from the Internet. For example, if the data is stored on a cache associated with the controller or co-located with the controller, then the charge may be less than if the data needs to be retrieved from a remote store, for example via the Internet. The controller may charge the user in dependence upon the quantity of resources utilised at the controller. Resources may be processing load or storage requirements.

In another aspect, the system described herein provides a mobile telecommunications network including a core and a radio access network having a radio for wireless communication with mobile terminals registered with the network, wherein the radio access network includes a controller operable to control the use of network resources by the mobile terminals, and wherein the controller is further operable to control the charging of mobile terminal users for use of the network resources.

The controller may charge the users in dependence upon the performance of the radio.

The controller may schedule the delivery of data to users in dependence upon the profitability of the transaction.

The controller may provide a cost indication to a user before delivery of data.

The controller may charge the users in dependence upon their location.

The controller may charge the users in dependence upon the characteristics of the data transmitted.
(P100942-GB-PSP)

According to a another aspect of the system described herein, there is provided a mobile telecommunications network including a core and a radio access network having a radio for wireless communication with terminals registered with the network, wherein the radio access network includes a controller operable to control the use of network resources by the terminals, wherein the controller is operable to perform self organising network functions.

The terminals may be mobile terminals, which communicate wirelessly with the radio access network, or may be terminals that communicate via a fixed/wired connection with the network (including the controller); such terminals may be fixed devices.

In an embodiment, the controller controls the use of network resources by the terminals and hosts applications, for example applications used by the terminals to obtain services.

The controller may monitor the terminal type (the type of device that the terminal represent—e.g., smartphone running the Android operating system), the customer type (for example, the type of subscription the customer has with the network—e.g., pay as you go) and/or the application or applications used by the terminal.

The controller may monitor the network performance in relation to a particular application, particular application characteristics or a particular class of customer.

In an embodiment, the controller includes a self organising network (SON) entity that is provided in the services part of a novel "platform", which is described in detail below. The SON entity communicates with a network functions part and a soft node part of the platform through an open Application Programming Interface (API) and is able to control the physical/transport layer, the network layer and application layers of the mobile telecommunications network.

The controller may in real time modify specific parameters from the physical/transport layer of a network, the functionality within the network layer or the hardware resources, such as the memory size of the cache available and/or the quantity of resources used from the resource pool available to the controller.

The controller may modify the parameters of the terminals associated therewith and/or parameters of other controller in a radio access network.

The control mean may modify or optimise application(s) bandwidth used by terminals based on the resources available required Quality of Service.

According to a further aspect of the system described herein, there is provided a mobile telecommunications network including a core, transmission network and a radio access network having a radio for wireless communication with terminals registered with the network, wherein the radio access network includes a controller operable to control the use of network resources by the terminals, the radio and core network being connected by means of the transmission network, wherein the controller is operable to perform self organising network functions.

In another aspect, the system described herein provides a mobile telecommunications network including a core and a radio access network having a radio for wireless communication with mobile terminals registered with the network, wherein the radio access network includes a controller operable to control the use of network resources by the mobile terminals, wherein the controller is operable to perform Self Organising Network functions.

The controller may monitor the device type, customer types and/or application used. The controller may in real time modify radio specific parameters, traffic handling algorithms and/or processor capacity network functions.

BRIEF DESCRIPTION OF THE DRAWINGS

Embodiments of the system described herein will now be set forth in more detail with reference to the accompanying Figures in which.

DETAILED DESCRIPTION OF VARIOUS EMBODIMENTS

Certain elements of a 3G mobile telecommunications network, and its operation, will now briefly be described with reference to FIG. 1.

Each base station (e.g., Node B 1 and Femto 2) corresponds to a respective cell of the cellular or mobile telecommunications network and receives calls from and transmits calls to a mobile terminal (not shown) in that cell by wireless radio communication in one or both of the circuit switched or packet switched domains. The mobile terminal may be any portable telecommunications device, including a handheld mobile telephone, a personal digital assistant (PDA) or a laptop computer equipped with a network access datacard.

The nodeB 1 or Femto 2 can be considered to comprise two main parts: a radio frequency part and a baseband part. The radio frequency part handles the transmission of radio frequency signals between the antenna of the nodeB 1 or Femto 2 and the mobile terminal, and for converting radio frequency signals into digital baseband signals (and vice versa). The baseband part is responsible for controlling and managing the transmission of the baseband signals to other components of the mobile telecommunications network.

In a macro 3G network, the Radio Access Network (RAN) comprises Node Bs and Radio Network Controllers (RNCs). The Node B is the function within the 3G network that provides the physical and transport radio link between the mobile terminal (User Equipment, UE) and the network. The Node B performs the transmission and reception of data wirelessly across the radio interface, and also applies the codes that are necessary to describe channels in a CDMA system. The RNC is responsible for control the Node Bs that are connected to it. The RNC performs Radio Resource Management (RRM), some of the mobility management functions and is the point where encryption is done before user data is sent to and from a mobile terminal. The RNC connects to the Circuit Switched Core Network through a Media Gateway (MGW) and to an SGSN (Serving GPRS Support Node) 5 in the Packet Switched Core Network. In FIG. 1, Node B 1 is controlled by RNC 3 across the Iub interface. An RNC may control more than one node B.

Figure 1:
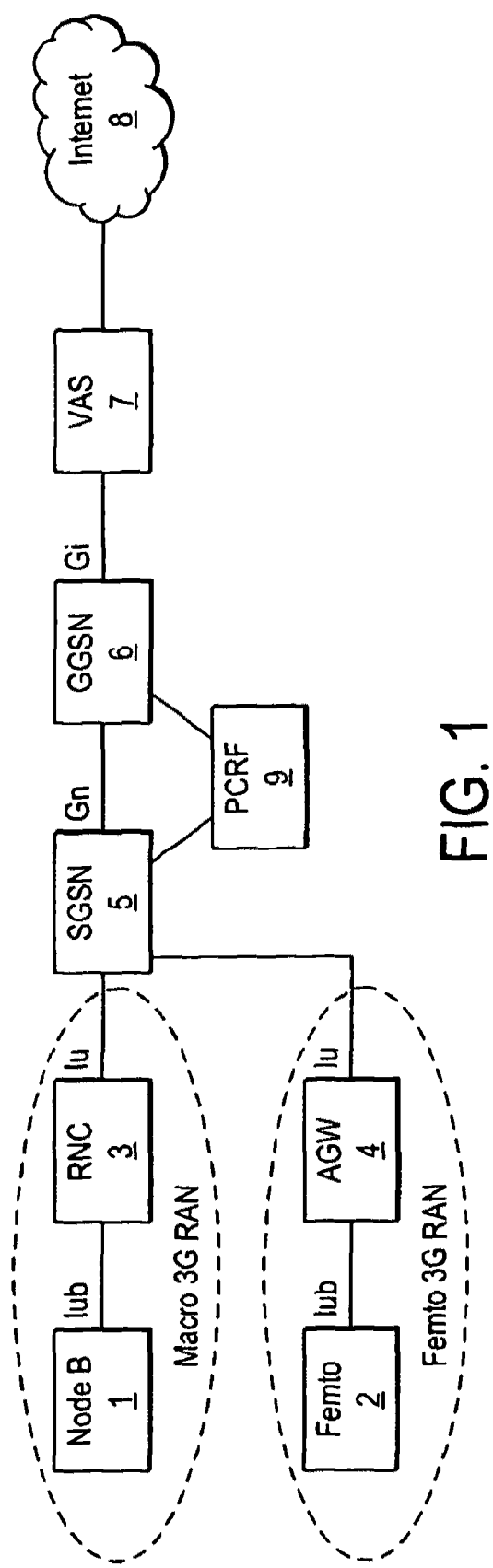
FIG. 1 illustrates a high level packet data network architecture, useful for explaining the prior art and embodiments of the system described herein.

FIG. 1 also illustrates a Femto 3G RAN, with Femto 2 operating as the base station. Femto 2 is connected to an Access Gateway (AGW) (a.k.a Concentrator) 4 via an Iuh interface. Femto is an abbreviation of "femto-cells", and many other different names have been used, including home access points (HAPs), access points (APs) and femto-base stations, but all names refer to the same apparatus.

The radio link between the Femto 2 and the mobile terminal uses the same cellular telecommunication transport protocols as Node B 1 but with a smaller range—for example 25m. The Femto 2 appears to the mobile terminal as a conventional base station, so no modification to the mobile terminal is required for it to operate with the Femto 2. The Femto 2 performs a role corresponding to that of Node B 1 in the macro 3G RAN.

The Femto 2 would typically be configured to serve a Wireless Local Area Network (WLAN) located in a home or office, in addition to GSM/UMTS/LTE networks. The WLAN could belong to the subscriber of the mobile terminal, or be an independently operated WLAN. The owner of Femto 2 can prescribe whether it is open or closed, whereby an open AP is able to carry communications from any mobile device in the GSM/UMTS/LTE network, and a closed AP is only able to carry communications from specific pre-assigned mobile devices.

Conventionally, in a 3G network (macro or Femto), the RANs are controlled by a mobile switching centre (MSC) and an SGSN (Serving GPRS Support Node) 5 of the core network. The MSC supports communications in the circuit switched domain, whilst the SGSN 5 supports communications in the packet switched domain—such as GPRS data transmissions. The SGSN is responsible for the delivery of data packets from and to the mobile terminals within its geographical service area. It performs packet routing and transfer, mobility management (attach/detach and location management), logical link management, and authentication and charging functions. A location register of the SGSN stores location information (e.g., current cell, current VLR) and user profiles (e.g., IMSI, address(es) used in the packet data network) of all mobile terminals registered with this SGSN. In FIG. 1, since the embodiment is concerned with data transmission, only the SGSN is illustrated as being in communication with RNC 3 and AGW 4, across the Iu interface. The RNC 3 typically has a dedicated (not shared) connection to its SGSN 5, such as a cable connection.

Communications between the AGW 4 and the SGSN 5 are preferably IP based communications, and may be, for example, transmitted over a broadband IP network. Further, the connection between the Femto and the AGW 4 may use the PSTN (Public Switched Telephone Network). Typically a DSL cable connects the AGW to the PSTN, and data is transmitted there-between by IP transport/DSL transport. The Femto or AGW converts the cellular telecommunications transport protocols used between the mobile terminal and the Femto 2 to the appropriate IP based signalling.

The femto 2 may be connected to the AGW by means other than a DSL cable and the PSTN network. For example, the femto 2 may be connected to the AGW by a dedicated cable connection that is independent of the PSTN, or by a satellite connection.

The SGSN 5 is in communication with the GGSN 6 (Gateway GPRS Support Node) across the Gn interface. The GGSN is responsible for the interworking between the GPRS network and external packet switched networks, e.g., the Internet. The GGSN enables the mobility of mobile terminals in the networks. It maintains routing necessary to tunnel the Protocol Data Units (PDUs) to the SGSN that service a particular mobile terminal. The GGSN converts the GPRS packets coming from the SGSN into the appropriate packet data protocol (PDP) format (e.g., IP or X.25) and sends them out on the corresponding packet data network. In the other direction, PDP addresses of incoming data packets are converted to the mobile network address of the destination user. The readdressed packets are sent to the responsible SGSN. For this purpose, the GGSN stores the current SGSN address of the user and their profile in its location register. The GGSN is responsible for IP address assignment and is the default router for the connected mobile terminal. The GGSN also performs authentication and charging functions. Other functions include IP Pool management and address mapping, QoS and PDP context enforcement.

In turn the GGSN 6 may route data via any applicable Value Added Service (VAS) equipment 7, before data is forwarded towards its intended destination via the Internet 8. As an example of the functionality of the VAS equipment, the traffic may be inspected for adult content before reaching the end-user if this user is under 18 years of age.

For billing purposes in particular, a PCRF (Policy and Charging Rules Function) apparatus 9 is also provided, in communication with both the SGSN 5 and the GGSN 6.

The SGSN 5, GGSN 6, VAS 7 and PCRF apparatus 9 comprise the core network of the mobile telecommunications network.

Mobile telecommunications networks have an active state of communication with their mobile terminals and an inactive/idle state of communication with their terminals. When in the active state, as the mobile terminals move between different cells of the network, the communication session is maintained by performing a "handover" operation between the cells. In the inactive/idle state, as a mobile terminal moves between different cells of the network the mobile terminal performs "cell reselection" to select the most appropriate cell on which to "camp" in order that the mobile terminal can be paged by the network when mobile terminating data is destined for that mobile terminal.

Conventionally, the mobile terminal or network determines whether a handover/cell reselection procedure should be triggered in dependence upon measurements of the radio signals of the cells in the region of the mobile terminal. A filter is applied to the signals (either by the network or by the mobile terminal) which calculates an average (e.g., arithmetical mean) value of these signals over a particular time period. This filtered/average values of the cells are then compared with each other or with a threshold value. In dependence upon these comparisons, cell reselection/handover related procedures are triggered. This cell reselection/handover process generally comprises taking radio signal measurements of neighbouring cells and comparing these to each other and to the radio signal of the current cell to determine which cell provides the best signal strength/quality. Handover/reselection to the best cell can then occur.

Generally calculations to determine whether to perform a handover from one base station to another base station are performed by the network, whereas calculations whether to perform cell reselection are performed by the mobile terminal.

Data in a mobile telecommunications network can be considered to be separated into "control plane" and "user plane". The control plane performs the required signalling, and includes the relevant application protocol and signalling bearer, for transporting the application protocol messages. Among other things, the application protocol is used for setting up the radio access bearer and the radio network layer. The user plane transmits data traffic and includes data streams and data bearers for the data streams. The data streams are characterised by one or more frame protocols specific for a particular interface. Generally speaking, the user plane carries data for use by a receiving terminal—such as data that allow a voice or picture to be reproduced—and the control plane controls how data are transmitted.

In addition to the elements and functions described above, mobile telecommunications networks also include facilities for transmitting SMS messages. SMS messages are transmitted over the control plane only (and not the user plane).

This architecture is what currently is being used to carry all packet data to and from mobile terminals. That is, in today's implementation of the Packet data architecture, user plane traffic traverses across all the network elements shown between the Node B or Femto on which the user is camped and the internet. That is, all data is directed from the applicable RAN through the core network components SGSN, GGSN and VAS before reaching the internet. All PS traffic accordingly follows the same path and therefore has the same network costs. All applications are processed on the client (on the mobile device) or on the server (which is connected to the internet), and the network core therefore acts like a bit-pipe in the current architecture. For data, where the mobile network operator cannot add any value by carrying it on its own backhaul transport, core transport or cellular core infrastructure (the core network), such as data destined for the public internet without required intervention from the core network, there is no benefit to routing this data via the core network.

However, a large percentage of this traffic can be handled in a more intelligent manner for example through content optimisation (Video & Web), content caching, or locally routed or directly routing content to the public Internet. All these techniques reduce the investment required by a mobile operator to carry the data on its own backhaul and core transport or cellular core infrastructure.

In order to offer low cost packet data, to support new services and to manage customer expectation, a step-change reduction in the end-to-end cost per bit is required.

Mobile operators want to reduce their packet data handling costs through alternate network architectures based on commoditised IT platforms, breaking away from the traditional architecture based on their voice legacy. These new network architectures overcome the Access architecture issues of today In order to successfully offer cheap packet data and be able to compete with the fixed broadband offers (flat fee) a solution is proposed which focuses on the reduction of the end-to-end cost per bit, especially for Internet access service.

This enables mobile operators to reduce packet data handling costs by means of an alternative network cost model architecture, which breaks out of the traditional network architecture and nodes and utilises lower cost transport networks to optimise the data flow.

Figure 2:
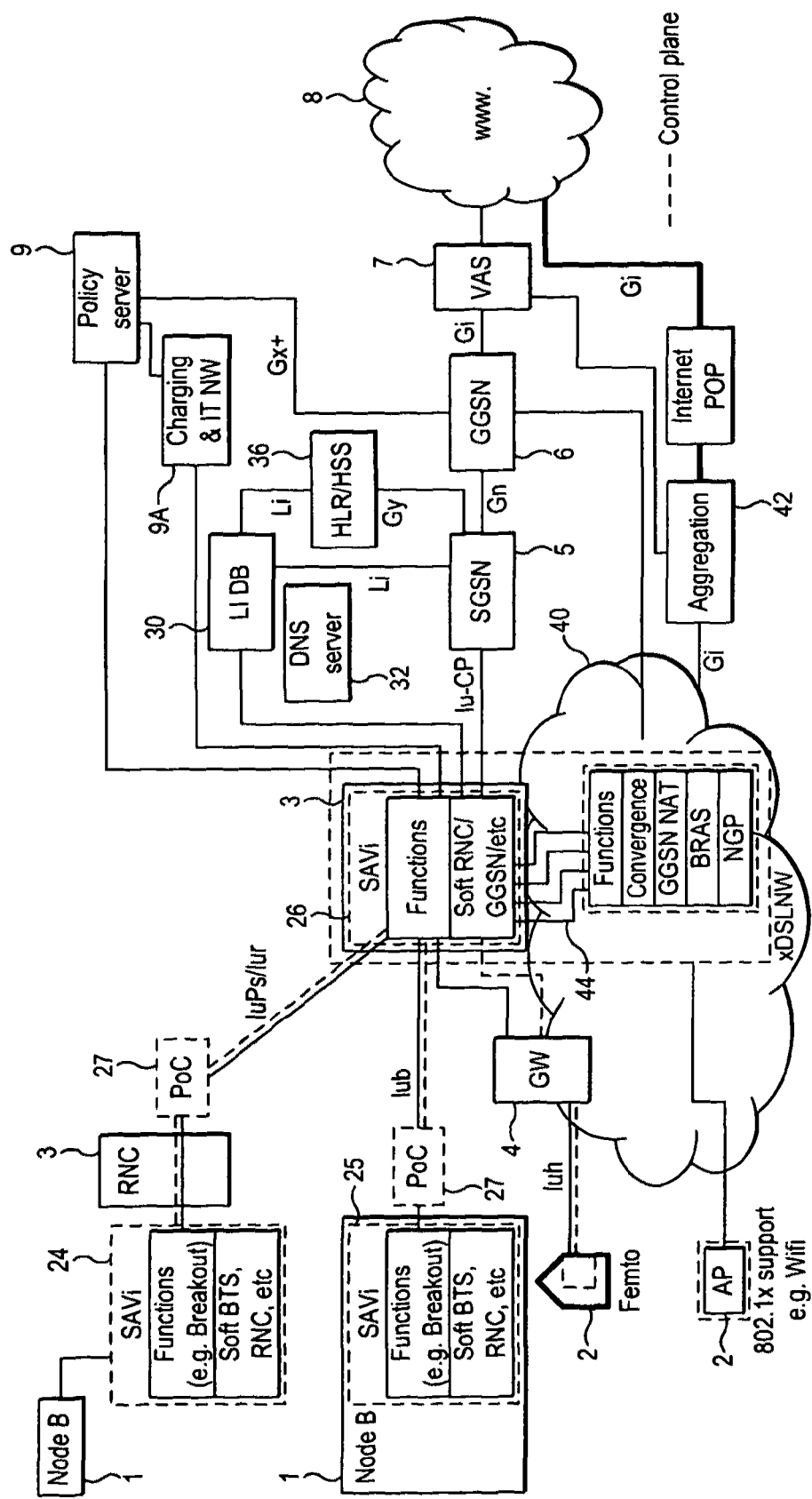
FIG. 2 illustrates the introduction of a new functional "platform" in a 3G network according to an embodiment of the system described herein.

In this regard, FIG. 2 shows a high level description of the architecture that may be adopted to deploy this on a 3G network.

According to this arrangement, novel "platforms" 24, 25, 26 for performing functions such as caching, routing, optimisation and offload/return decision functionality are integrated into the network. This decision functionality may be incorporated in the radio architecture. In this regard, the platforms 24, 25, 26 may be incorporated into the NodeBs 1 (25), RNCs 3 (26) or exist as separate physical entities (24). It is these platforms 24, 25, 26 that, for example, determine the path of communications originating from the mobile terminals.

The exact placement of the platform 24, 25, 26 is not essential, and, for a macro 3G network, it can be placed at or between the Node Bs and the RNCs, and also between the RNCs and the SGSNs (or any combination thereof). It would also be possible to place the platform 24, 25, 26 at the GGSN (although not the SGSN as this does not control user data, only control data).

In the 3G Macro network, the aim is to offload a high percentage of the macro network traffic from the core and transport (IuPS, Gn, etc) by diverting specific traffic type for certain user(s) class directly to the Internet.

Where the platform 24, 25 is located in the Node Bs (or on the Iub interface), it may be possible to redirect the data from all the remaining mobile network elements (e.g., the RNC, SGSN, GGSN and VAS for macro 3G), and sending the data directly to the Internet 8. In a similar manner, where the platform 26 is located at the RNC (or on the Iu interface), it becomes possible to redirect the data from the SGSN 5, GGSN 6 and the VAS 7. The alternative data route is preferably a DSL using ADSL.

It is also preferable to aggregate the alternative data routes for each cell, where applicable. In this regard, each cell may have at least one RNC 3 and a plurality of Node Bs, so where the decision blocks are situated at or in the vicinity of the Node Bs, for instance, there may be a plurality of links which should ideally be aggregated before being passed to the Internet 8. At the point of this aggregation 42, there is preferably a further decision block which enables data to be returned to the legacy route. For instance, a new policy rule may have been implemented, which requires or enables previously offloaded data to be returned to the core network route. This new policy rule may be communicated to the return decision module by the core network policy module. In FIG. 2, this returning of data is only shown to the VAS 7, but the data may be returned to one or more of the other core network elements.

Each of the NodeBs 1 is connected to the mobile network core through a Point of Concentration (PoC) 27. All traffic from the NodeBs 1 which is to be routed through the core mobile network is routed to the PoC 27. This includes both user plane and control plane data. On the control plane level, the PoC 27 routes data to and from the SGSN 5 and the GGSN 6. Control data is also sent to and from other core network components, including the Lawful Interception Database (LI DB) 30, DNS Server 32, Policy Server 9 (including Charging rules and IT Network 9A) and Home Location Register/Home Subscriber Server (HLR/HSS) 36 (which contains subscriber and device profile and state information).

User plane data is transmitted by the PoC 27 to the SGSN 5 and the GGSN 6. From the GGSN 6, data is routed across a VAS 7 node to the Internet 8. In 3G this is the standard data path from the mobile terminals to the Internet.

To implement an advantageous feature, an alternative path on which to re-route certain data to the internet 8 is provided, whereby, each NodeB 1 and Femto 2 may be connected to a fixed line connection 40 (e.g., xDSL) which is directly connected to the internet 8. These xDSL connections may be made directly to the NodeB and/or Femto or made to the NodeB/Femto via other components, such as the PoC 27. In FIG. 2, the xDSL Network 40 may be a third party network or may be a network owned or controlled by the owner of the mobile telecommunications network. By using such an alternative path, radio capacity, backhaul transport resource, core transport resource, cellular core network resources can be saved as well as improving performance and enhancing revenue for the mobile network operator.

As each Node B 1 and/or PoC 27 is associated with a platform 24, 25, 26, for each data packet request originating from a mobile terminal, a decision at the platform 24, 25, 26 is made as to whether the traffic may bypass the core mobile network entirely or may be passed into the core mobile network. The location at which the traffic is routed towards the internet is preferably at the platform 24, 25, 26; however, it may alternatively be routed out from the core network towards the internet at a different component. Traffic offloaded from the macro network is routed by the platform 26 to the xDSL network 40 by link 44 (the decision to offload this traffic may have been made at platform 24, 25 or 26—although the decision is implemented at platform 26)

Figure 3:
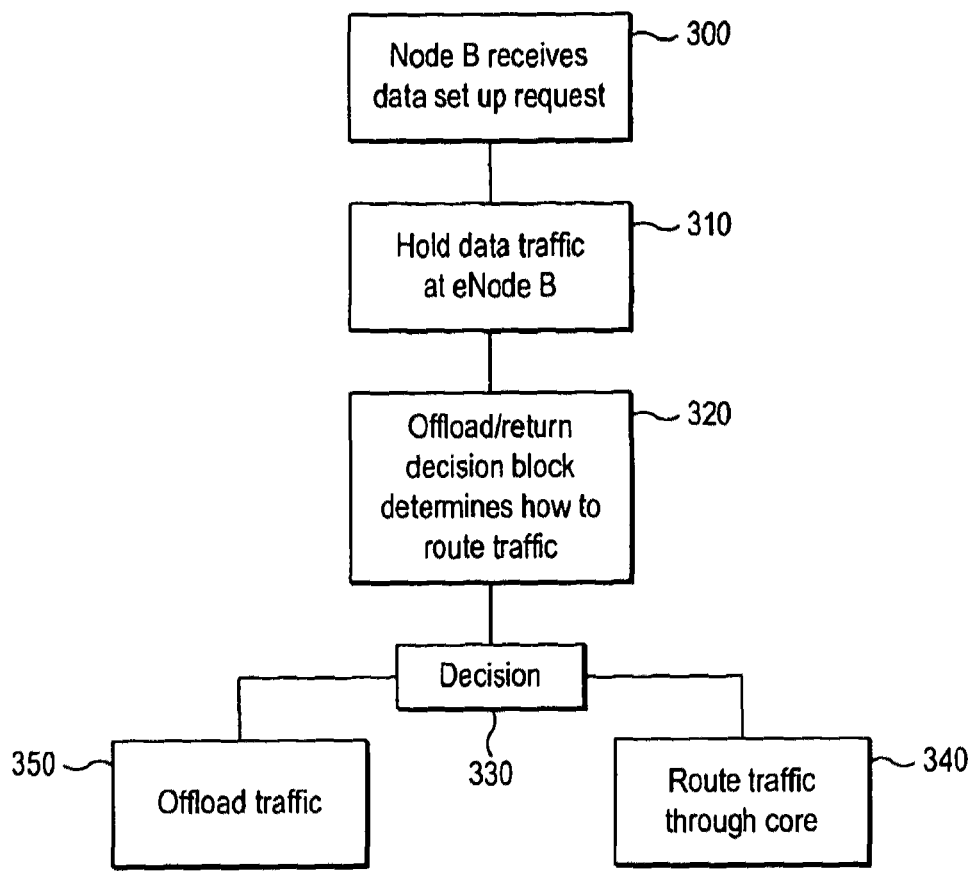
FIG. 3 illustrates a flow chart of an example offload decision process as implemented in the 3G network of FIG. 2 according to an embodiment of the system described herein.

Preferably the Offload/Return decision is dependent upon the type of data or user. To exemplify this feature of the embodiment, FIG. 3 is a flow diagram showing the steps taken when deciding how to route the traffic in the architecture of FIG. 2. For instance, consider an NodeB receives a request to set up a data call from a user device which is camped on the NodeB at 300. Once the NodeB has identified the request as a data call and the type of traffic/user, rather than automatically routing the data traffic to the core network, the data request is held at the NodeB at 310 until a decision has been made as to how to route the data, in particular whether to offload the traffic directly to the internet or whether to return the data through the core mobile network. Typically, the signalling (control plane) for the connection may continue through the normal route but the user data traffic may be held at the NodeB, this is possible by virtue of the separate user and control planes, as shown in FIG. 2.

The decision as to whether or not to use the Core mobile Network to route the data traffic can be based on various aspects, particularly relating to the properties of the data being routed and/or status of the user routing the data.

The Mobile Network may add value to traffic by providing a number of services, such as compressing the user data to speed-up the data transfer while downloading (if this functionality is not already supported by the platforms 24, 25, 26). These different services can be broken up into groups and provided by different entities (e.g., this enables greater flexibility in the provision of the services, such as the mandated Internet Watch Foundation—IWF—requirement, which can only be supported by the mobile operator). The platforms 24, 25, 26 therefore make a decision on whether to service the data locally through caching, fetch the data from other node or from the internet via offload functionally or whether to route the traffic through the core network, based on the applicability of one or more of the services to the traffic. That is, platform 24, 25, 26 decides when data traffic requires one or more of the services and when it can do without them.

It should also be noted that these services are ones that could be provided without using the core network. These are services that add value to the customer, and which subscribers may pay for (explicitly or implicitly).

Referring again to FIG. 3, the platform 24, 25, 26 decides at 320 what to do with the traffic (from coming for the network/internet or orientated by the device). This decision may be made by interrogating certain servers or databases stored centrally within the core network which can compare the type of service, type of user etc with criteria which identifies the type of action shall be considered, e.g., whether the traffic is suitable for offloading directly to the internet (at 330) from the NodeB or whether the traffic should be routed through the core (at 340). Examples of some of the considerations used in influencing the decision of whether to offload the traffic are discussed below in more detail. The implementation of this data offload technique needs to be carefully considered, as it places additional constraints on the network design.

The following is a non-exhaustive list of examples of challenges that have to be considered when implementing the data offload technique:

a) maintaining Customer Services provided by the core network or otherwise;
b) maintaining Network Services (e.g., Charging Rate Limiting/application control); and
c) maintaining Regulatory Services (e.g., to enable Lawful Interception and Regulatory Content Filtering).

Some specific examples of Customer Services that can be taken into account by the offload decision module include:

i) Parental Control: A service which customers subscribe to that filters content in order to shield children from unwanted websites and programs. Whether traffic from a given user needs to be filtered can be determined by a Common User Repository (CUR) lookup, where the CUR stores user profile information, such as whether the user is an adult or a child etc. If traffic needs to be filtered, then either the traffic cannot be offloaded or it needs to be filtered somewhere other than the core network.
ii) Traffic Optimisation: Optimisation is only required for low bandwidth connections (2G). By looking at the Radio Access Type (RAT) and the International Mobile Equipment Identity (IMEI) it can be determined whether or not a subscriber needs these services. Where traffic optimisation is not required, the traffic can be offloaded
iii) Marketing Proposition: The mobile network is typically setup to provide full mobility with acceptable Quality of Service (QoS). A further option could be to offer best effort QoS without guaranteed full mobility. As an example, for when a heavy user has exceeded their fair usage limit, their traffic could be designated as low priority traffic and offloaded.

The Network Services that can be taken into account by the offload decision module are typically those that the network operator needs to manage its network. Some examples include:

i) Charging: The charging plan that a user subscribes to can be used to determine whether or not to offload that user's data. For instance, it is most easily avoided when the customer has a flat rate plan. That is, users on flat rate plans do not need their usage tracked for charging purposes in real time and so can be offloaded onto the alternative route. For users who are roaming or whose charging plan depends upon usage, then, the operator/supplier needs to track their total usage in real-time, and so their data needs to be maintained on the core network route so that rate-limits and data usage can be accurately tracked and alarms/alerts activated when usage exceeds allowances. This is because, if this is not avoidable then Call Data Records (CDRs) need to be generated by the module for the real time charging.
ii) Rate-limiting/application control: This is currently used to manage the traffic flow according to a certain usage policy. Excessive bandwidth usage or controlling P2P applications are common reasons to rate limit users. Therefore, where a user transmitting data is determined to be under a rate restriction (i.e. throttling) or the data they are transmitting has an application restriction (i.e. the application is blocked), then that data can be offloaded. This exceeded allowance information would typically be communicated to the decision module (24, 25, 26) by the HLR/HSS. This traffic management enables the total traffic volume to be reduced and is typically fully managed by the network operator.

iii) QoS: The network uses QoS to manage traffic during high load situations and to support marketing propositions. To enable QoS considerations to be enforced by the offload decision module, a connection is established between the offload module and the Policy and Charging Rules Function (PCRF) entity. This enables decision criteria to be dynamically fed to the offload module, for instance to maintain high priority users on the core network path and/or high priority application types, such as VoIP. It is to be appreciated that the connection to the PCRF is not essential, and alternatively, static or semi-static rules, pre-stored with the offload module, can be considered.
iv) Mobility: Mobility, such as cell handover, is an issue that needs to be managed by the core network. Therefore, terminals that are in motion should not be offloaded. The mobility of a mobile terminal could be determined by querying the Node B. Some users could be provided with a contract that allows only fixed or limited mobility use, so that the service provided was equivalent to a fixed broadband package. Different charging tariffs could be applied depending on whether a user was at a fixed location or mobile. Two ways the offload decision module can handle a mobile terminal's mobility are as follows:

1. The offload decision module can have the capability to characterise the radio link between the device and the network by monitoring the number of handovers implemented for the mobile terminal. If a certain number of handovers occur over a fixed duration, the mobile terminal can be classified as in motion, and any data from the mobile terminal can thereafter be routed back into the core network to avoid any further packet data delay. This of course assumes that the mobile terminal had been designated for data offload on the bypass link.
2. The offload decision module is situated on the IuPS for the 3G network (i.e. between the RNC and the SGSN) or S1 for the LTE (i.e. between the eNode B and the PoC), and checks the Iur or X2 signalling information (i.e. between a set of RNCs controlled by a given 3G SGSN and between a corresponding set of eNode Bs for LTE). If this monitoring shows that a mobile terminal is hopping between cells one of which is not connected to (and therefore managed by) the offload decision module, any data from the mobile terminal can thereafter be routed back to the legacy path through the core network.

Regulatory Services are services that are mandated by legislation, and are typically provided to all traffic. Some specific examples of Regulatory Services that can be taken into consideration by the offload decision module include:

i) Lawful Interception (LI): The ability to provide Lawful interception may be maintained in any offload or local breakout plans. The options for offload are:

Maintain the evaluation of LI in the core network, and not offload users whose traffic needs to be intercepted (e.g., where the user has been tagged by the police for communication interception). Since the LI functionality is handled by the core network, the core network accordingly cannot be bypassed;

Add LI capability to the offload decision module, which may require a local LI interface with a dedicated database identifying the users to be intercepted. With this option, upon identifying traffic from a user on the list, a copy of the data can be made at the local LI interface and the traffic offloaded. The copied data can then be reported to the appropriate authorities; or Alternatively, LI may be performed at the Internet Service Provider (ISP). With this option, since LI is considered at the ISP it is not a consideration at the offload decision engine, and so the data may be offloaded, where possible. However, to effect this option, a Service Level Agreement (SLA) with relevant ISP providers may need to be amended in order to include the support of LI in the ISP network rather than in the mobile network infrastructure.

ii) Regulatory Content Filtering (e.g., for Internet Watch Foundation (IWF)): This required functionality blocks illegal websites. This functionality could easily be added to the offload decision module as it is not processor intensive. An http proxy server, for instance, could be used to support this functionality. Otherwise, the traffic may be returned back to a dedicated core node(s).

A further criterion that the platform (24, 25, 26) module may consider is the priority of the customer. In this regard, a network operator may wish to prioritise traffic across its network based on the priority level of the customer. For example, a high value customer (e.g., a corporate customer or a subscriber with on a high tariff contract) may be given priority over a low value customer. In this situation, a network may decide to offload lower value customers directly to the internet. This is related to the QoS criterion mentioned above, although the QoS criterion is generally linked to traffic management to maintain a balanced network, whereas the priority referred to can be used to ensure subscribers get a level of service commensurate with their service agreement.

The embodiment of FIG. 2 is in relation to a 3G network. Embodiments of the system described herein are equally applicable to 4G (LTE/SAE) networks.

The LTE/SAE macro network includes eNode Bs which make up the RAN. The eNode Bs effectively combine the functionality of the node B and the RNC of the 3G network. These eNodeBs are the network components which communicate with the mobile communication devices. It is envisaged that the eNodeBs may be arranged in groups and each group controlled by a Mobility Management Entity (MME) and a User Plane Entity (UPE).

The MME performs many of the mobility functions traditionally provided by the SGSN. The MME terminates the control plane with the mobile device. It is responsible for terminating NAS (Non Access Stratum) Signalling such as MM (Mobility Management) and SM (Session Management) information as well as coordinating Idle Mode procedures. Other responsibilities of the MME include gateway selection inter MME Mobility and authentication of the mobile device.

The UPE manages protocols on the user plane such as, storing mobile terminal contexts, terminating the Idle Mode on the user plane, and PDP context encryption.

The platforms would operate in the same manner as described in relation to the 3G network. The platforms may be located at many different locations in the 4G network.

Figure 4:
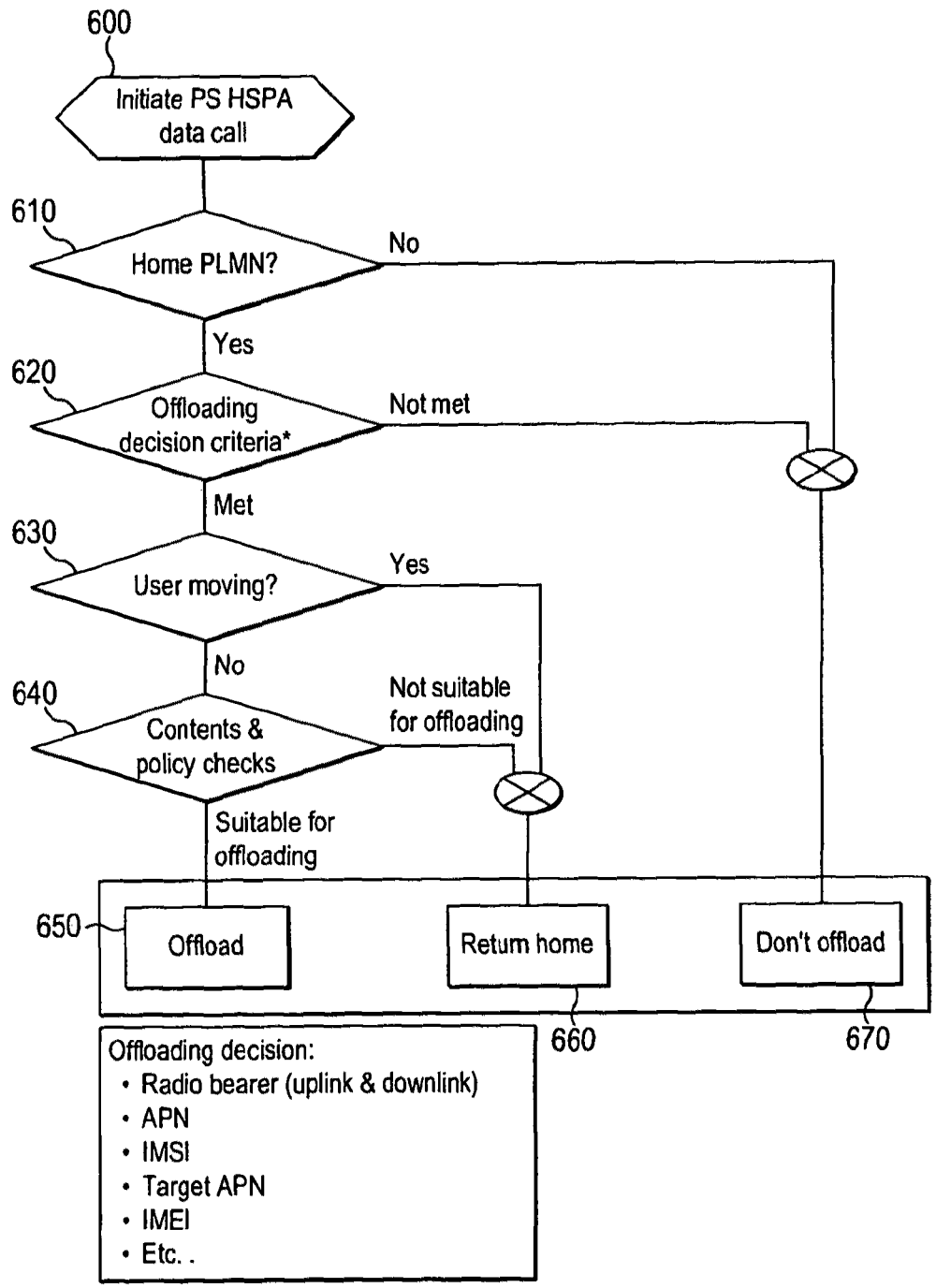
FIG. 4 illustrates a flow chart of an example offload decision making process that may be implemented by a redirection module according to an embodiment of the system described herein.

A more specific example of how the platform 24, 25, 26 may be implemented is described in relation to FIG. 4. FIG. 4 is a flow diagram illustrating a preferred method for deciding whether to offload data traffic to the interne. The decision structure is composed in a hierarchical form in order that certain types of user or data are always directed through the core network. The example of FIG. 4 is described for a 3G network but it will be clear to those skilled in the art that these decisions could be applied to any type of radio access technology.

Once a PS HSPA data call (or other connection) is made and received at the Node B at 600, a primary consideration by the platform 24, 25, 26 at 610 is whether the device is operating on its home network or whether it is roaming. If the device is roaming then all traffic is automatically routed through the core network. The reason for this is that the home network would want to guarantee the security and accurate billing (due to different charging principle between home and visited operator) of the user's traffic. The platform 24, 25, 26 at 610 may also consider other factors, such as what application types running on the mobile terminal require connections. If the mobile device is operating on its home network at 610, or if the applications do not require a connection to the core network, the platform 24, 25, 26 considers secondary offloading criteria at 620. Examples of secondary criteria may include the functions required by the device, the radio bearer currently used by the device, the APN, or the priority level of the customer identified, for example, through IMSI, IMEI or the target subscriber. If the offloading criteria are met at 620, the decision moves to the tertiary criteria, otherwise, the traffic is not offloaded.

At 630, the system checks the mobility of the user. If the user is moving, he is considered not suitable for offload due to an expected interruption delay of the user data when moving between source and target cell.

Finally, at 640 the system conducts a contents and policy check to confirm whether the user is suitable for offload. If it is determined that the user is suitable for offload to the internet, the eNodeB offloads the traffic to the internet at 650. If it is determined that the user is not suitable for offloading to the internet at 640 then the procedure returns "home" at 660. A connection is provided by a network core in a conventional way and the tests of the flowchart shown in FIG. 4 are repeated periodically to determine whether offloading directly to the internet becomes possible subsequently.

If the device is determined to be roaming at step 610, then the device is not offloaded directly to the internet, but remains connected via the network core in a conventional way at 670. Similarly, if the offloading criteria are not met at steps 620, the mobile device remains communicating via the network core in the conventional way, again at 670.

The hierarchical decision method is useful because it reduces the number of challenges across the network. It will be evident to those skilled in the art that different hierarchical structures may be appropriate for different networks, different conditions etc and that the example of FIG. 4 is just one way the decision could be made.

For instance, whilst arrangements have chiefly been described in relation to transmitting data traffic from a mobile terminal to a data network, the principles may also be applied to transmissions from a data network towards a mobile terminal.

In the arrangements described above the decision regarding the route is the to be made at call set-up. However, it should be appreciated that a decision to change the routing of data may be made at the beginning of a communication session (for example establishment of a PDP context), or during a communication session. The routing of data may change several times during a single communication session. For example, when a communication session is initiated it may be detected that the user is not moving, in which case a decision may be made to offload the data over the alternative data route. Subsequently it may be detected that the user is moving, and at this point a decision may be made to beginning routing data for the communication session via the mobile network. During the communication session, the mobile terminal may become stationary for a prolonged period of time again, and at this time a further decision may be made to send subsequent data during the communication session via the alternative data route. Subsequently again, the user may then attempt to access age-restricted content, and it may be detected that parental control is required. In response for the requirement for parental control, a decision may be made to redirect subsequent data during the Communication session via the core network so that core network parental controls can be applied.

It is to be appreciated that the present embodiments of the system described herein are to be distinguished from HSDPA offload, a technique used on the Iub interface between the Node B and the RNC. HSDPA offload which serves to separate data traffic from voice traffic, so that non-real time data traffic is sent down a less expensive backhaul to complement or replace the expensive E1/T1 TDM backhaul link between the two. Once this diverted traffic reaches the RNC, however, it is returned to the cellular and transport core networks and there is no differentiation made based upon data traffic type.

In the arrangement described above the platform 24, 25, 26 primarily handles data offload decisions. As will be described below, the platform can perform may other functions.

Embodiments of the system described herein in which the Radio Access Network controls the use of resources by mobile terminals will now be described.

Platform Architecture

Figure 5:
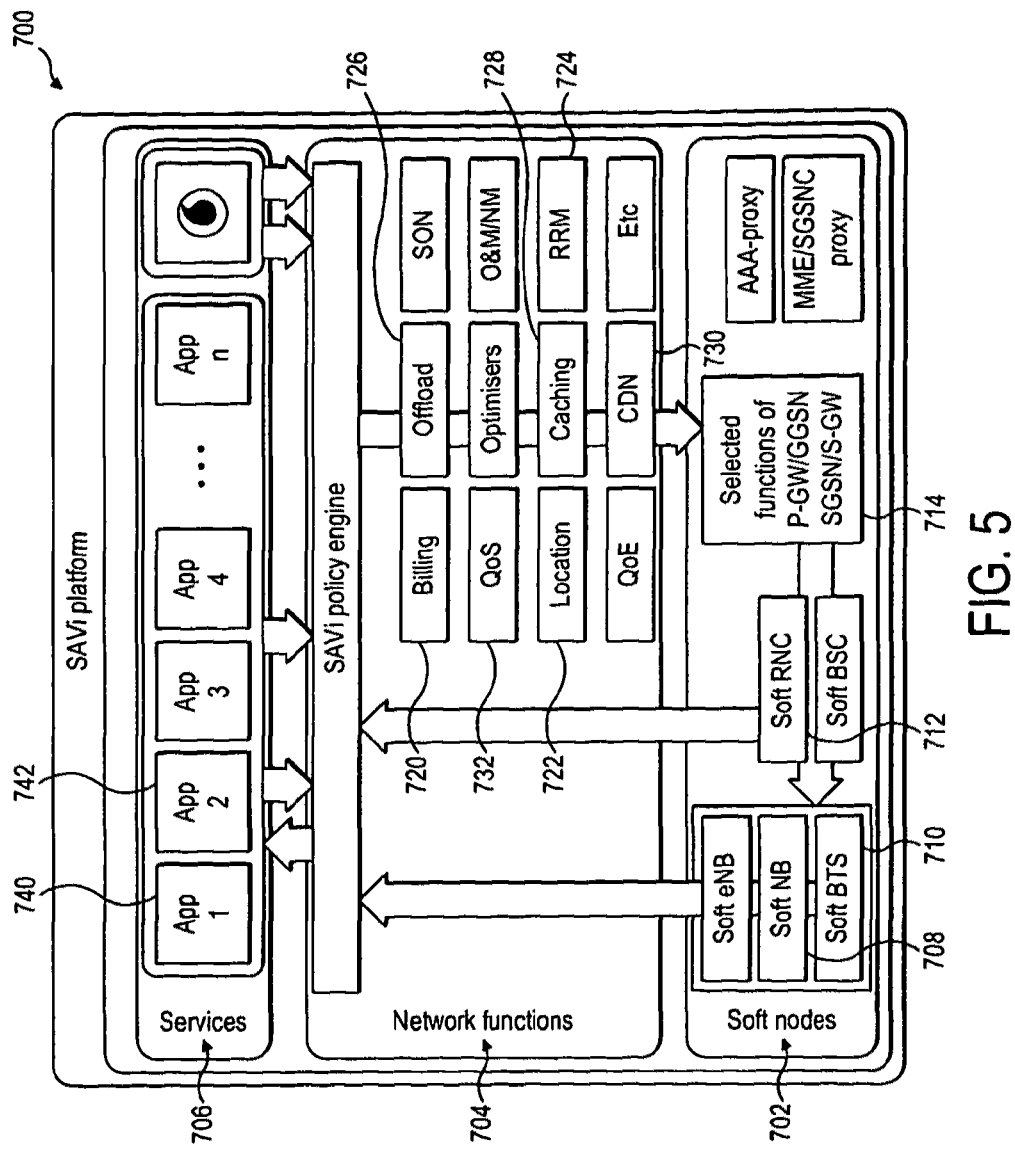
FIG. 5 shows the novel "platform" in more detail provided in the Radio Access Network according to an embodiment of the system described herein.

As discussed above, a mobile telecommunication network is modified by the introduction of a "platform" 24,25,26. Such a platform is shown in more detail at 700 FIG. 5 and which includes three principal parts: soft nodes 702 (physical/transport layer), network functions 704 and services 706 (application layer).

The platform 700 communicates with the radio frequency (RF) part of a base station, such as a NodeB 1. The soft nodes 702 of the platform 700 comprise components such as a soft NodeB 708, soft BTS 710, soft eNodeB 711 and soft RNC 712 and soft SGSN/GGSN 714. The soft nodeB 708 provides functions equivalent to the baseband part of a conventional NodeB in a 3G telecommunications network. The soft BTS 710 provides baseband functions equivalent to the baseband functions of a BTS in a conventional 2G mobile telecommunications network. The soft enodeB 711 provides baseband functions equivalent to the baseband functions provided by a conventional enodeB in a 4G mobile telecommunications network. The platform 700 may therefore communicate with the radio frequency part of a 2G, 3G or 4G base station and provide appropriate baseband services for 2G, 3G or 4G technologies (or indeed for other technologies). A 3G mobile terminal that wishes to obtain telecommunication services from the mobile telecommunications networks connects wirelessly to the radio frequency part of a NodeB. Baseband functions may be provided either by a baseband part of the conventional NodeB or by the soft NodeB 708 forming an element of the soft node part of the platform 700. For example, the soft NodeB 708 may receive radio measurements from the radio frequency part of the NodeB to which it is connected, and may provide these radio measurements to other elements of the platform 700.

The network functions part 704 of the platform 700 includes modules for performing functions similar to those performed by the core network of a mobile telecommunications network, such as billing 720, location tracking 722 and the radio resource management (RRM) 724. The network functions may further comprise an offload decision module 726 that performs a function similar to the offload decision modules 24, 25 and 26 described above. The network functions part 704 may further comprise a caching function 728 and Content Delivery Network function 730.

The network functions parts 704 of the platform 700 provides an Application Programming Interface (API) framework to the services part 706 of the platform 700. The services part 706 of the platform supports a plurality of applications 740, 742 etc.

The network functions fall into three main categories, those that enable the network operation (e.g., charging, O&M), those that support service operation (e.g., Location) and those that optimise the usage of the network by certain applications and services (e.g., Caching, Video Optimisation).

The applications supported on the Platform 700 are the entities that supply or demand the flow of data on the network, akin to a server on the interne, e.g., gaming server, navigation server.

The API is implemented by a software program running on the network function part 704 which presents a novel standardised interface for the applications 740, 742 etc of the services part 706. The novel standardised API provides a consistent interface, defining communication protocols, ports etc. Full details of the API may be published to allow a multiplicity of applications to be developed for the platform 700 by multiple developers. This should be contrasted with prior art arrangements where each component of a mobile telecommunications network (such as BTS, BSC/RNC, SGSN etc) is proprietary and tends to have a unique interface, meaning that a different application must be written for each node of a conventional network.

The applications 740, 742 etc may provide services to users of the telecommunications network by co-operating with other parts of the platform 700.

The details of the use of each application used by the a user of the mobile telecommunications network is stored in an application context/container. The Application context contains application names, protocol used to carry such application, their characteristics that are measured/reported over period of time and some statistical information about these applications (volume, number of users using these applications, etc.).

Figure 6:
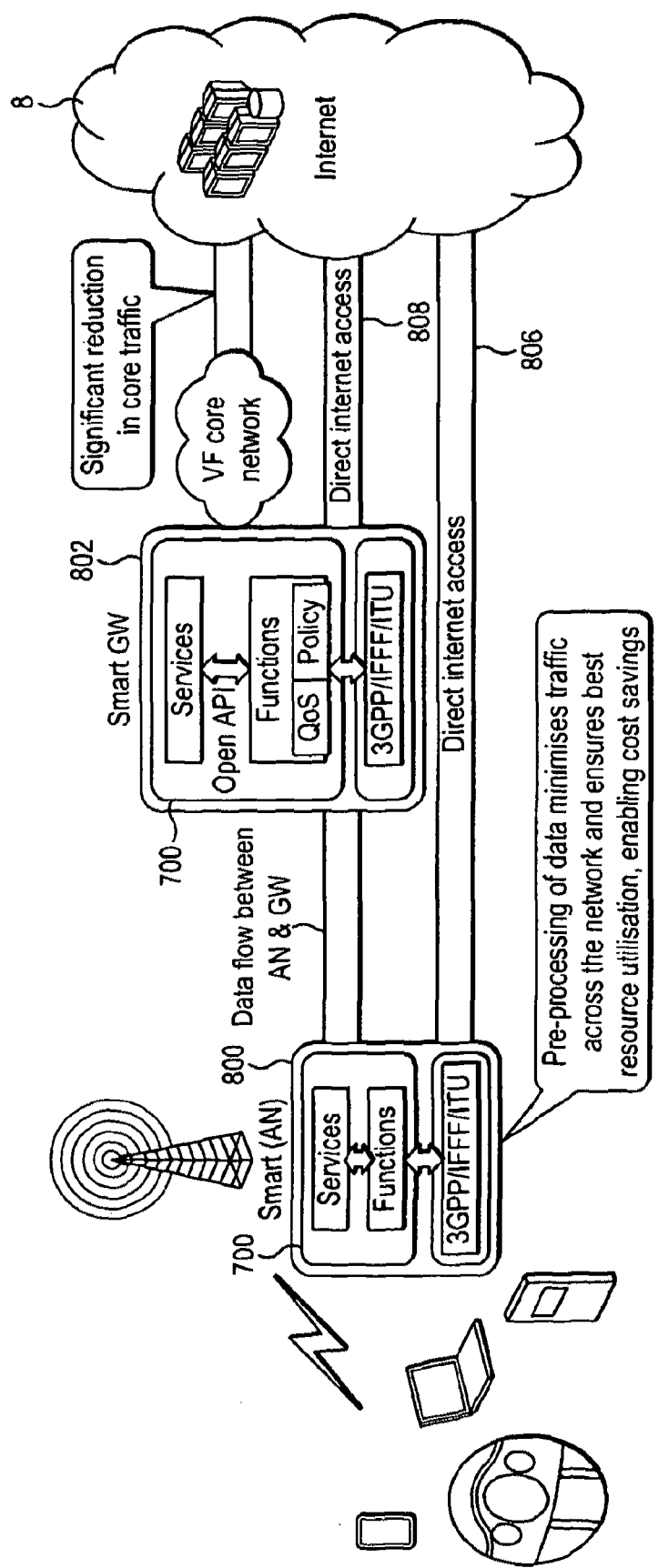
FIG. 6 shows possible locations of the platform within a mobile telecommunications network according to an embodiment of the system described herein.

As shown in FIG. 6, a platform 700 may be provided at each base station of the mobile network (where it is connected to the radio frequency part of the base station—NodeB 1 in FIG. 2), forming an access node 800. Platform 700 may also be provided at the RNC (item 3 in FIG. 2) where it forms a gateway 802. The access node 800 and the gateway 802 are both configured to communicate directly with the network core 804 (for example, comprising the SGSN 5, GGSN 6 and VAS 7 (as shown in FIG. 4)). The access node 800 and gateway 802 may also be connected to the internet 8 for direct internet access via direct links 806 and 808, respectively, such that at least a portion of the core network 804 is bypassed in the manner described above.

Figure 7:
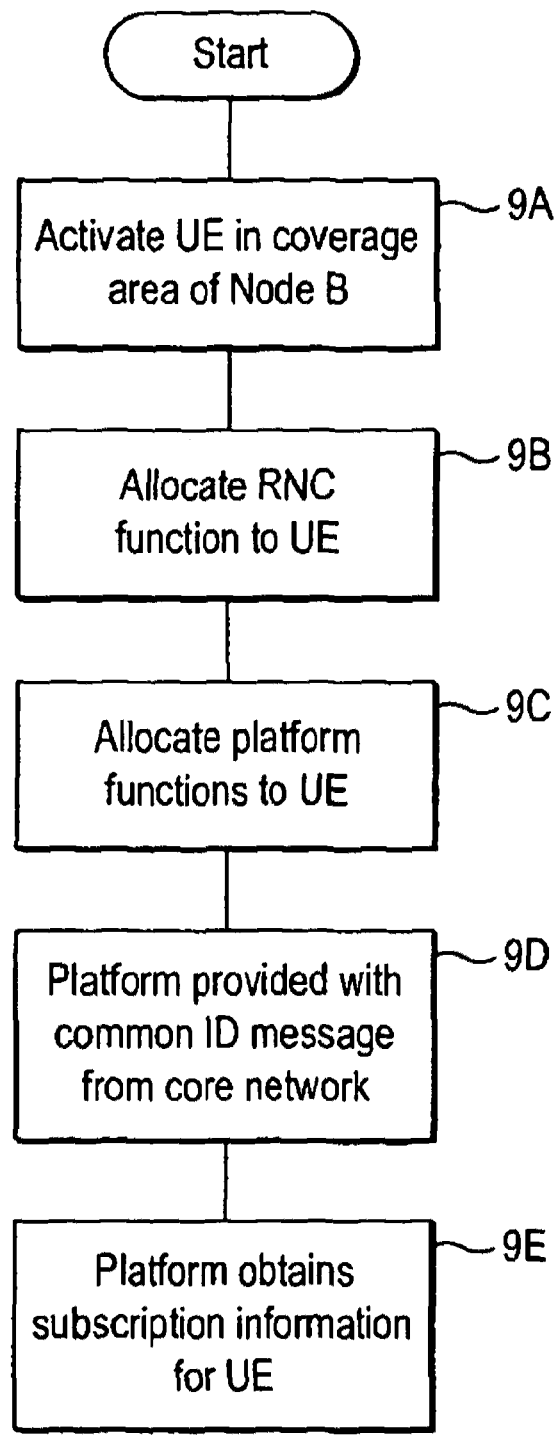
FIG. 7 is a flow chart showing the steps performed when a mobile terminal is activated according to an embodiment of the system described herein.

The following are examples of access technologies that can be provided within the access node 700:
3GPP: GSM/GPRS, UMTS/HSPA & LTE
IEEE: 802.11 family & 802.16 family
ITU: DSL, ADSL, VDSL, VDSL2
Allocation of Functions to Platforms The steps performed when a mobile terminal is activated at a NodeB, at the Femto or at the Access Point (AP) of the network which includes the novel platform 700 may now be described with reference to FIG. 7. At step 9A the mobile terminal (UE) is activated within the coverage area of a particular NodeB, at the Femto or at the AP. The access part of the NodeB, at the Femto or at the AP communicates information from the mobile terminal to the platform 700 associated with the NodeB, at the Femto or at the AP. At step 9B the platform 700 then allocates the baseband NodeB, at the Femto or at the AP function and the RNC or BRAS (Broadband Remote Access Server) function either at access node 800 at the NodeB at the Femto or at the AP site or at the gateway 802 at the RNC or BRAS site of the network or even from neighbouring nodes that have spare resources to pull. The decision as to whether the RNC or BRAS function is allocated at the platform 700 of access node 800 or the gateway node 802 may be made depending on various criteria, including:

The device type—for example this decision can be based on the radio access capabilities that the mobile terminal indicates upon activation, such as whether it is operating in the circuit switched or packet switched domains.

The location of the mobile terminal. If the mobile terminal is near the edge of the cell (which can be determined by network power measurements or neighbour cell measurements from the mobile terminal, within a plus or minus 3 dB range for the RACH).

The establishment cause of the connection request: such that the NodeB can filter the unnecessary signalling information from the mobile terminal which is not critical—for example periodic routing area update messages.

Upon allocating the baseband NodeB at the Femto or at the AP and the RNC or BRAS function, the NodeB at the Femto or at the AP may allocate the mobile terminal to a particular carrier dedicated to the RNC or BRAS function.

Once the RNC or BRAS function is allocated to either the access node 800 or the gateway 802 at step 9C, other functions performed by the platform 700 at the access node 800 (or other access node) and the gateway 802 (or other gateway) are allocated to the mobile device. All other platform functions may be provided by the platform where the RNC or BRAS function is allocated to the mobile terminal. However, a platform at a different location to that which provides the RNC or BRAS function to the mobile terminal may provide some or all other functions.

At step 9D the platform which is allocated the RNC or BRAS function is provided with a Common ID message from the core network 804.

At step 9E, this message is used by the platform 700 to look up the complete subscription information for the mobile terminal, as well as the resource requirements (QoS) of the services required and negotiated PDP context, this information being provided by the core network 804.

The subscription information relating to the device that is obtained from the central nodes (e.g, core network) 804 is used to allocate the other functions at access node 800 and/or the gateway 802 in dependence upon various factors, including:

Detailed information regarding the mobile terminal type obtained from the core network.

The subscription characteristics of the mobile terminal.

The applications previously used most frequently by the mobile terminal.

The characteristics of the applications previously used by the mobile device and the performance requirements thereof.

The historic mobility of the mobile terminal (speed, connection, distance travelled etc).

The location of the mobile terminal and the likely destination of traffic from the mobile terminal based on historic usage patterns.

The load of the NodeB providing RF services to the mobile terminal, and the historic traffic trends at that NodeB at Femto or at AP.

The characteristics of the NodeB at the Femto or at the AP providing RF services (for example, the location, what other devices are connected through the NodeB at the Femto or at the AP, the number of machine to machine devices being attached and served by the NodeB, etc).

As mentioned above, a single mobile terminal may have platform functions/applications allocated on a plurality of platforms. Generally, when a mobile terminal is near-stationary it is most efficient for its functions/applications to be served from an access node 800 (i.e. distributed), whereas mobile terminals with greater mobility (or lower anticipated cell hold times) may be most efficiently served by having fewer or no functions/applications served from the access Node 800, and more or all functions/applications served from a gateway 802 (i.e. centralised). The assignment of functions/applications to a mobile terminal between an access node 800 and a gateway 802 may also depend upon the characteristics of the service type provided by the application (for example, the average IP session duration, the popularity of the particular application, the average mobility of mobile terminal using the service provided by the application etc).

Traffic management may be performed at the access node 800, where there is access to real-time radio information from the radio frequency part of the NodeB, the Femto or the AP serving the mobile device.

Centralised Radio Resource Management (RRM) may be provided at the gateway 802, and maintains performance across different access modes 800, which may have different radio access technologies, frequency bands, coverage etc. The RRM function 724 of the platform 700 of the gateway 802 may obtain information regarding radio traffic management from each access node 800 to dynamically position subscribers to particular radio technology. This technique may be used to allocate network resources based on the resource availability, application used and user mobility, For example, the traffic management information may be provided by the soft NodeB 708, Femto or AP of the platform 700 at the access node 800. This soft NodeB 708 obtains radio information relating to the mobile terminal from the radio frequency part of the NodeB to which the mobile terminal is wirelessly connected.

For a particular mobile terminal, functions provided by an access node 800 and gateway 802 may be coordinated to work together in an advantageous manner (i.e. a hybrid or distributed arrangement). For example, the gateway 802 may set operating limits or ranges within which functions performed by the access node 800 may be performed, without reference to the gateway 802. When the functions move outside the ranges set, control of those functions may be passed to the gateway 802.

Further, the access node 800 and the gateway 802 may cooperate to advantageously optimise content delivery to a mobile terminal.

Figure 8:
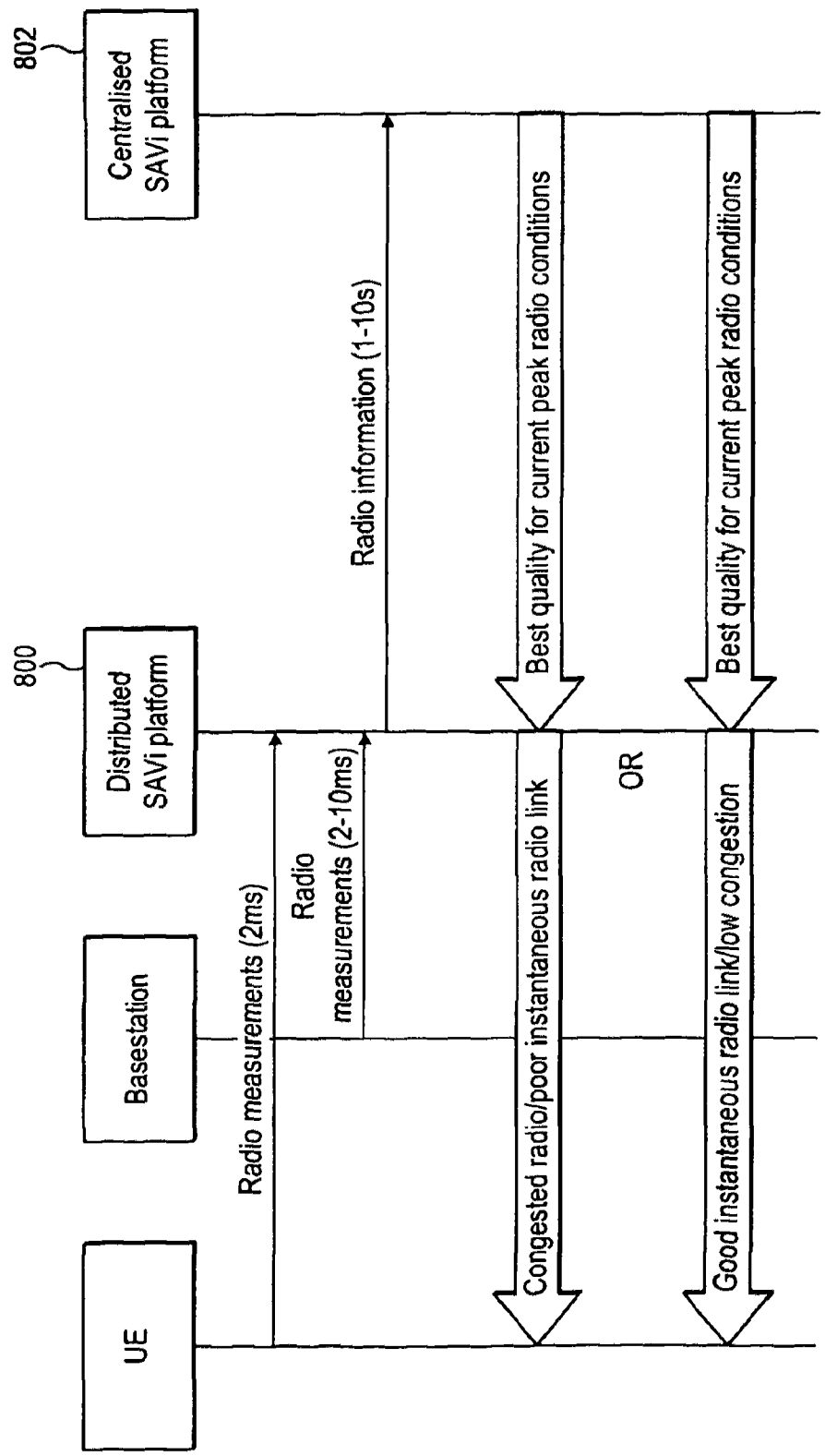
FIG. 8 shows the optimisation of content delivery to a mobile terminal according to an embodiment of the system described herein.

The optimisation of content delivery will now be described with reference to FIG. 8 of the drawings. Content may be optimised at gateway 802 and at an access node 800. The gateway 802 may serve multiple access nodes 800, and my distribute content to those multiple access nodes 800, for onward transmissions from each of those access nodes 800 to a mobile terminal via the radio frequency part of NodeB, the Femto or the AP serving that node. Radio quality measurements are reported by the mobile terminal to the access node 800 at regular intervals, such as 2 millisecond intervals. Radio quality measurement relating to that mobile terminal are transmitted between the radio frequency part of the NodeB, the Femto or the AP serving the mobile terminal to the access node 800 at regular intervals, such as between 2 and 10 millisecond intervals. These radio measurements are received at the soft nodes 702 and are passed to functions 704 (e.g., to QoS function 732 for analysis). These radio frequency measurements from the mobile terminal and the NodeB are reported by the access node 800 to the gateway 802 (e.g., to QoS function 732 of the gateway 802 for analysis) at regular intervals, such as intervals of between 1 and 10 seconds. The gateway 802 may receive radio information from multiple access nodes 800. The radio measurements received by the gateway 802 may be analysed over a relatively long period, such as between 1 and 2 minutes. The radio quality measurements may be averaged (for example, the arithmetical mean of the radio quality maybe determined) over this time period. The transmission of content from the gateway 802 may then be optimised according to this calculation. Where the content is distributed by the gateway 802 to a plurality of access nodes 800, the content distribution may be based on the analysis of the radio quality indicators from all of the access nodes 800. The analysis may consider the maximum or peak radio performance over the time period of between 1 and 2 minutes.

When the content is received by each access node 800, the access node 800 then distributes the content to each mobile terminal. This distribution is optimised based on real-time network mode and mobile terminal specific radio link quality, as determined over a period of, for example, between 1 and 10 milliseconds. That is, content delivered to a mobile terminal that has high radio link quality may be optimised in a different manner to a mobile terminal that had poor radio link quality.

Figure 9:
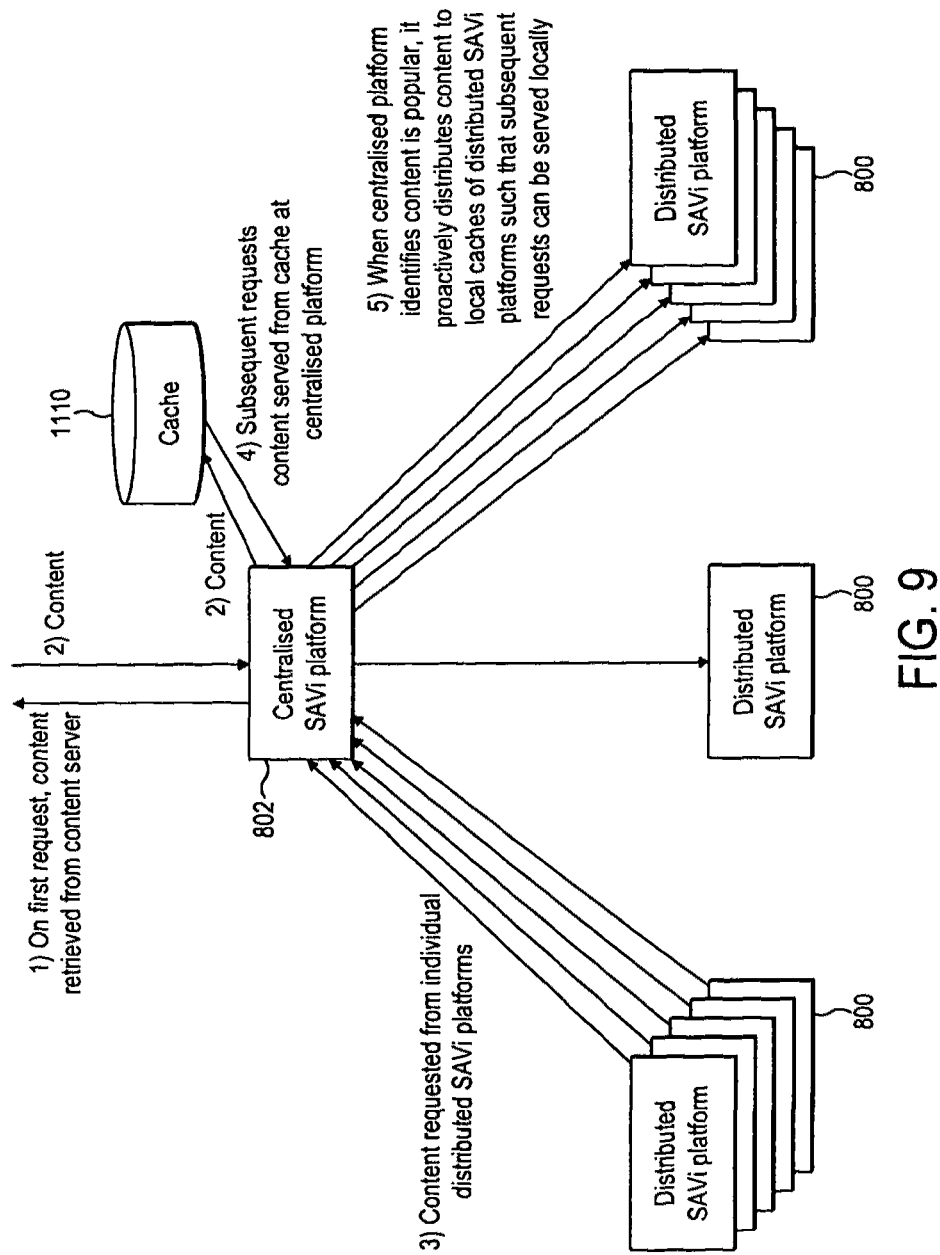
FIG. 9 shows a further optimisation of content delivery to a mobile terminal according to an embodiment of the system described herein.

The co-operation between access nodes 800 and gateways 802 may further enhance the distribution of content in a manner now to be described with reference to FIG. 9.

When a mobile terminal requests a particular content item, this request is transmitted to the access node 800 serving that mobile terminal, assuming that this is the first request for this content item to the access node 800, the access node 800 passes this request to the gateway 802 serving the access node 800. Assuming that this is the first request for this content item from the gateway 802, the gateway 802 retrieves the content from a content server. The content is then provided by the content server to the gateway 802, and from there is distributed to the access node 800, and onwardly to the requesting mobile terminal. Advantageously, the gateway 802 maintains a record of content items that are requested frequently. When a content item is determined by the gateway 802 to be requested frequently, this is stored in a cache 1110 associated with the gateway 802 (which may be the cache 728 of the platform 700). Subsequent requests for that content item from access nodes 800 to the gateway 802 can then be serviced by retrieving the content item from the cache 1110 and distributing the content item to the requesting access node 800, and thus avoiding the need to request the content from the content server.

The gateway 802 may be further configured to identify popular content items that are likely to be requested by a large number of access nodes 800. When it is determined that a content item is popular, the gateway 802 may push these content items to each of the access nodes 800 associated therewith (so that this content is hosted at the access node 800, using Content Delivery Network (CDN) function 730 of the network functions 704 of the gateway 802 and the access node 800). The content is then available at the access node 800 for transmission to any mobile terminal that requests it, without having to retrieve this content from the gateway 802 or the content server. Advantageously, the distribution of such content items is performed in a manner which takes into account the capacity or the congestion of the link between the mobile terminal and the gateway 802 and the nature of the content. For example, typically a link between a mobile terminal and the gateway 802 may experience very little usage and congestion in the early hours of the morning. The content item can be advantageously transmitted in between the gateway 802 and the access node 800 at this time, when there is spare capacity. The gateway 802 may determine whether the content item is suitable for transmission on this basis, for example, by taking into account a number of times that the content item has been requested, the size of the content item and the storage space at the access node 800. If a content item is relatively small and is time-critical, such as news headlines, then such a content item may be distributed frequently throughout the day, as such content is not suitable for transmission once a day at early hours of the morning, as it becomes quickly out of date.

Relocation of Mobile Terminal

Figure 10:
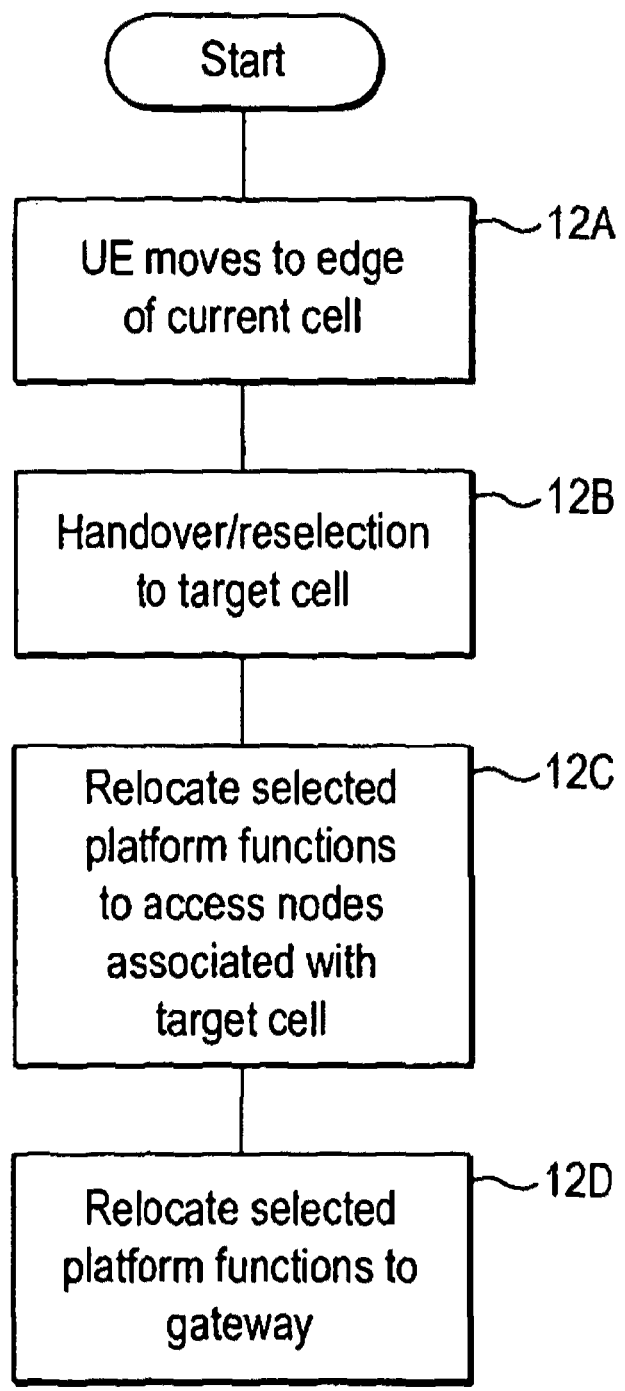
FIG. 10 is a flow chart showing the procedures performed when a mobile terminal moves within the network according to an embodiment of the system described herein.

The procedures performed when a mobile terminal moves between cells in the mobile telecommunications network will now be described with reference to FIG. 10. In the conventional manner at step 12A, when the mobile terminal moves to the edge of its current serving cell, the radio measurements reported from the mobile terminal and the radio frequency part of the NodeB, the Femto or the AP serving that mobile terminal are used by the core network to determine when to perform a handover and to which target cell the handover should be performed. When the best target cell has been identified, handover to that target cell from the serving cell it is performed at 12B in a conventional manner.

At step 12C selected platform functions may be relocated from the source access node (that served the old cell) to the destination access node (that serves the new target cell).

When the source and destination access nodes are served by the same gateway, only base station function (such as soft NodeB functions 708) may be relocated to the destination access node.

The relocation of functions of the access nodes is performed independently to the radio handover, so for some time after the radio handover, the source access node continues to serve content to the mobile terminal through the destination access node. The routing of data packets for the 3G network between the destination and the source access nodes may be performed using an Iu interface between the RNC or BRAS function 712 of the destination access node and the SGSN/GGSN function 714 of the source access node. Alternatively, the routing of data packets between the destination and the source access nodes can be completed by the SGSN/GGSN function 714 of the destination access node connecting directly to functions of the source access node through an IP interface.

After handover has been completed at step 12B, the access node controlling the mobile terminal may be relocated from the source access node to the destination access node in coordination with the gateway. the standardised handover decisions (mainly based on coverage, quality, power, interference, etc.) for 2G, 3G, LTE & fixed network are used to move the mobile from one node or system to another. However, the platform 700 introduces new opportunity to make the handover decision based on type or characteristics of the certain application, type of user and the QoS requirements.

The timing of the relocation of access node functions from the source to destination platform may be dependent on the following:

the duration of the current connection/communication of the mobile terminal the speed of movement of the mobile terminal the characteristics of the applications being used by the mobile device, the quality of service, the predicated type and amounts of transmission ongoing.

The radio resource allocations status at the mobile terminal

The respective node of the source and destination and access nodes.

At step 12D, optionally, some functions may be reallocated from the access nodes to the gateway. For example, if the destination access node is heavily loaded and is congested, or has a lower capability then the source access node, or the mobile terminal is determined to be very mobile, it may be advantageous to transfer functions to the gateway. Functions are reallocated from the access node to the gateway by, for example, a Serving Radio Network Subsystem (SRNS) relocation between the RNC function 712 of the access node and the gateway. Alternatively the functions may be reallocated by performing a radio reconfiguration of user connection to the mobile terminal.

The reallocation of functions from an access node to the gateway may be performed at call/communication sessions set-up. At call/communication session set-up, further subscriber information may be provided, which may be used by the access node or gateway to be determine whether it would be advantageous to reallocate functions from the access node to the gateway. Reallocation of functions from the access node 800 to the gateway 802 may be performed during an active connection when a requirement of the communication sessions has been modified, or where the required resource is not available at the access node 800.

According to the same principles, applications may be (re)located (or distributed) between access nodes 800 and for gateways 802 to provide optimised application delivery/best use of the communication resources.

As mentioned above, information about each application used by the user at the mobile terminal is stored in an application context. The application context is shared between each access node 800 and gateway 802 that control the user connection for that mobile terminal. One of the access nodes 800/gateways 802 may be the "master" for that particular application, and that may also be the master of an application specific record in the application context. The application context is advantageously periodically synchronised between the access node 800 and the gateway 802.

The application information is the application context specific to a particular mobile terminal, and this is passed between access nodes and gateways during reallocation for a mobile terminal, enabling the application to be seamlessly passed access nodes/gateways, avoiding impacts to the user experience.

Figure 11:
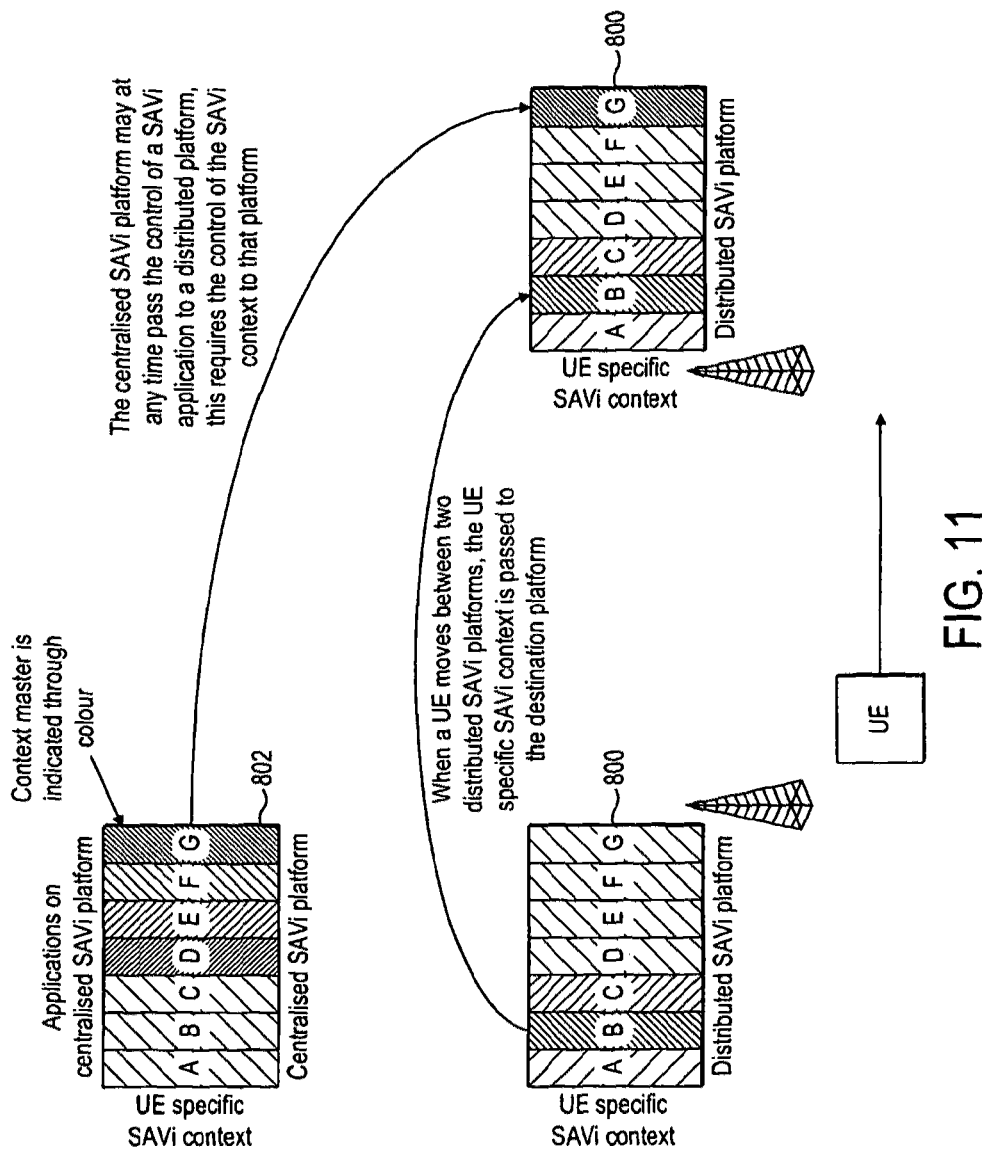
FIG. 11 shows the transfer of information between platforms according to an embodiment of the system described herein.

FIG. 11 shows the transfer of application information between access nodes and gateways.

Tailoring Bandwidth to Application

Radio measurements received from the radio frequency part of the NodeB, the Femto or the AP serving the mobile terminal are passed to the soft nodes 702 of the platform 700 (of the access node 800 or gateway 802 serving the mobile terminal), and are passed to the network functions 704 of the platform 700, which then distributes the measurements to where necessary within the platform 700. The platform 700 has access to the subscriber information from the core network, which allows the network functions 704 to deliver data traffic in a manner that is optimised for radio conditions as indicated by the radio measurements. The data traffic may also be optimised according to the subscription of the user of the mobile terminal available radio resource, mobile terminal capability, and/or for the class of the terminal (e.g., access technologies used). This optimisation allows bandwidth usage to be balanced with customer experience. The subscriber information may include information about the price plan of the user of the mobile terminal. The mobile network operator may track the type of application used by the user, the total data usage of the user, and may differentially target radio resources the highest data value stream of users.

By hosting applications 740, 742 in the services part 706 of the platform the access node 800 (or at least the gateway 802), the point of the network that is aware of the application being used by the user of the mobile terminal closer in the link between the mobile terminal and the core network to the NodeB serving the mobile terminal. This enables the sharing of network resources to the most appropriate data streams, such as the most profitable data streams. Such awareness of the application to which a request for data transmission relates allows the use of low value data streams, such as peer-to-peer file sharing, to be allocated only limited bandwidth, so that remaining bandwidth can be targeted to particular users. In the uplink, transmission of data can be controlled by the access node 800 (or gateway 802) hosting the application to control data flow appropriately before data is onwardly transmitted towards the core of the network (which was not possible with conventional arrangements).

Application Programming Interface (API)

As mentioned above, a novel API is provided which defines the language that each of the software modules 740, 742 of the platform 700 use to communicate to coordinate to optimise application delivery to users. The platform 700 negotiates which each application 740, 742 the specific resource and performance requirements based on the application characteristics, allowing the application to directly communicate the scheduling performance requirements, rather than using a predefined set of quality of service parameters. This negotiation between the platform 700 and the applications 740, 742 is facilitated by the API.

The API may also facilitate the provision of radio link quality information (e.g., from QoS function 732) to applications 740, 742.

The API may further enable the platform 700 to control use of the applications 740, 742—e.g., to allow, disallow or adapt the applications.

By way of example, the application 740 may be a Voice over IP (VoIP) application. The nature of Voice over IP communications is that there is a virtually continuous succession of small data packets in which voice data is communicated. The voice data must be communicated with no or minimal latency in order that a two-way conversation can be performed successfully. The Voice over IP application 740 is able to compress voice data before transmission using a variety of techniques/CODECs. The compression techniques/CODECs may range from a relatively low compression technique, which provides high quality voice reproduction but requires a large bandwidth, to a much higher compression technique which provides reduced voice quality and which requires a much lower bandwidth.

The API is operable to provide details of the application characteristics to the network functions part 704 of the platform 700. This makes the network functions part 704 of the platform aware of the characteristics of the application. In the present example, as the application is a Voice over IP application, the network functions part 704 may be made aware that the application may tend to transmit continuous successions of small data packets that require transmission with no or low latency. The network function 704 may then be configured appropriately.

The API may further be operable to allow the network functions part 704 to communicate radio link quality information to the application 740. For example, when the network functions part 704 received information regarding the application characteristics (via the API), it may allocate radio link resources to that application 740. This allocation of radio link resources may be communicated by the network functions part 704 to the application 740 (via the API). The application 740 may then select an appropriate compression technique/CODEC in dependence upon the radio link quality available. During a Voice over IP call, the available radio link quality may be communicated regularly from the network functions part 704 to the application 740. (via the API) to allow the application 740 to vary the compression technique/CODEC used in accordance with changes to the radio link quality.

The network functions part 704 may control how the applications 740, 742 work (via the API). The network functions part 704 may allow, disallow or adapt the applications 740, 742 hosted in the services part 706 of the platform 700. For example, the network functions part 704 may require the Voice over IP application 740 to use a particular compression technique/CODEC if radio link bandwidth is restricted.

Another example of how the network functions part 704 may advantageously provide radio link quality information to an application (via the API) is when the application 742 is a gaming application used by several users. If the radio link quality information received by the application 742 indicates that bandwidth is restricted, the application 742 may adapt is communications to the users such that latency of the communications is increased uniformly for all of the users (so that they all experience the same delay), in order that each of the users is provided with the same gaming experience.

In the embodiments described, the devices that connect to the platforms 700 are mobile devices that connect to the platforms via the radio access network of a mobile/cellular telecommunications network. It should be appreciated that non-mobile (fixed) devices may be connected to the platforms 700, for example by a wired or cable connection.

Allocation of Services

A controller is responsible for allocating the service instance for each UE, based on the UE locations and the controller capacity, capability and available resources to host another instance of a service.

For certain low popularity services or where the available serving controller capacity or capability is limited, the service can be hosted from a central controller, or from a neighbouring distributed controller.

For some services/functions, where the source and destination client applications are in the same geographical region, being served by the same site (e.g., BTS location) or site cluster (e.g., finite number of sites), the access node 800/gateway 802 ensures that the server for the service is located close to both users, and the traffic is routed between the users within the site.

"Video Buffer Preloading" (P100937-GB-PSP)

Within a cell the cost to carry data between a particular mobile device and the base station depends on many factors. This "cost to carry" data is an indicator of total resources required to convey the data. For example, macro or femto base stations and mobile devices that operate in accordance with cellular telecommunications Standards/transport protocols vary the power of radio transmissions in dependence upon the characteristics of the link between the base station and the device. Power is increased if the distance between the base station and the device is greater, or if the radio conditions are poor (which may be caused by environmental factors or by obstacles, such as buildings) between the base station and the device. Such an increase in power increases interference, and therefore reduces the overall capacity of the base station to convey data between itself and other devices in the cell.

Conventionally, a mobile telecommunications network has no control over when or where data is transmitted between a mobile device and base station or other access point, and may simply enable transmission of the data on demand.

In the current HSPA networks the data bandwidth on the radio provides ample average user rates to support uninterrupted viewing of video content.

The massive growth of data on mobile networks may require high capacity investment to maintain the customer experience; however mobile operators are optimising the usage of the radio resource to manage the investment.

For video applications this currently consists of three techniques:

Scaling the codec rate of the content to provide similar user experience but lower the required user data rate over the network; and Shaping the flow of packets to manage the service impact to the network Managing the buffer of the mobile device to ensure that data is delivered just in time.

The video buffer of the mobile devices may be managed as it was found that many customers often only watch part of a downloaded video clip/film before channel hopping or jumping forward to another part of the video, with the consequence being that much content that has been downloaded and buffered at the device and is discarded without being viewed.

As the mobile devices move around the network the radio conditions vary, which means at some moments in time the data transmission to the device is costly in terms of network resource; and others there it has little cost.

Typically the most costly time is when the device is at the cell edge and is about to perform a handover; but equally there are many other areas where the coverage is degraded, e.g., deep inside buildings.

Figure 12:
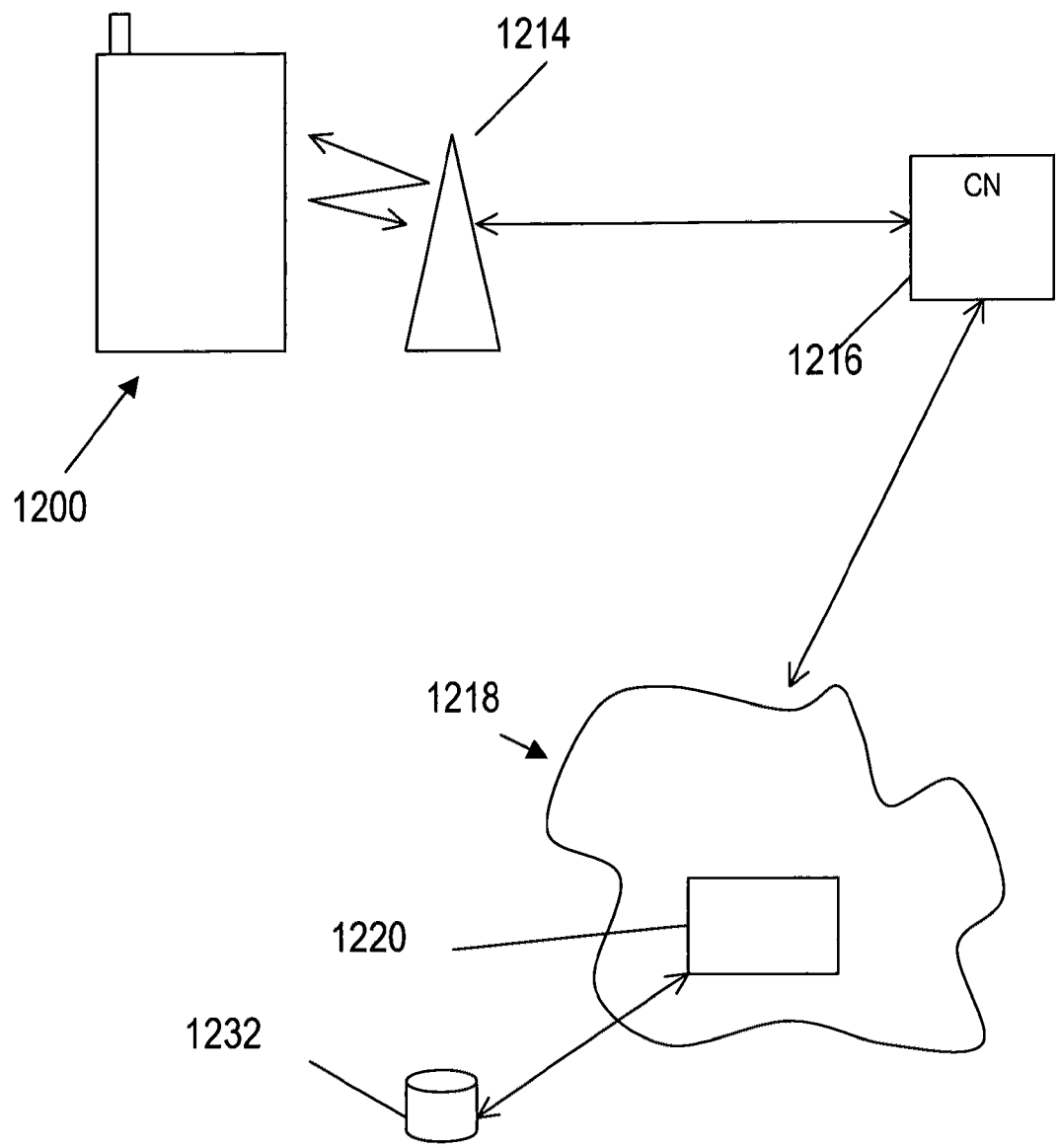
FIG. 12 shows schematically the elements according to an embodiment of the system described herein, including a mobile device having an access control client and a data managing server according to an embodiment of the system described herein.

As shown in FIG. 12, a mobile device 1200 is connected to the core network 1216 via a base station 1214. Currently the video optimisation function 1220 is implemented as part of the service cloud 1218 of the core network 1216 of the operator. The video optimisation function 1220 optimises video content from content server 1232 for transmission over the mobile network. This has the advantage that video optimisation can be implemented in a single location, but has the disadvantage that it does not have any load information about the network or radio quality information about the customer.

The present embodiment seeks to overcome some of the problems associated with conventional mobile telecommunications networks. The embodiment seeks to allow mobile device users to send and receive data at times that are appropriate for the user whilst managing and making best use of the radio capacity of a telecommunications network.

The platform 700 described above allows application environments to move closer to the radio site. This enables more complex functions to be moved closer to the radio site, including video optimisation.

Figure 13:
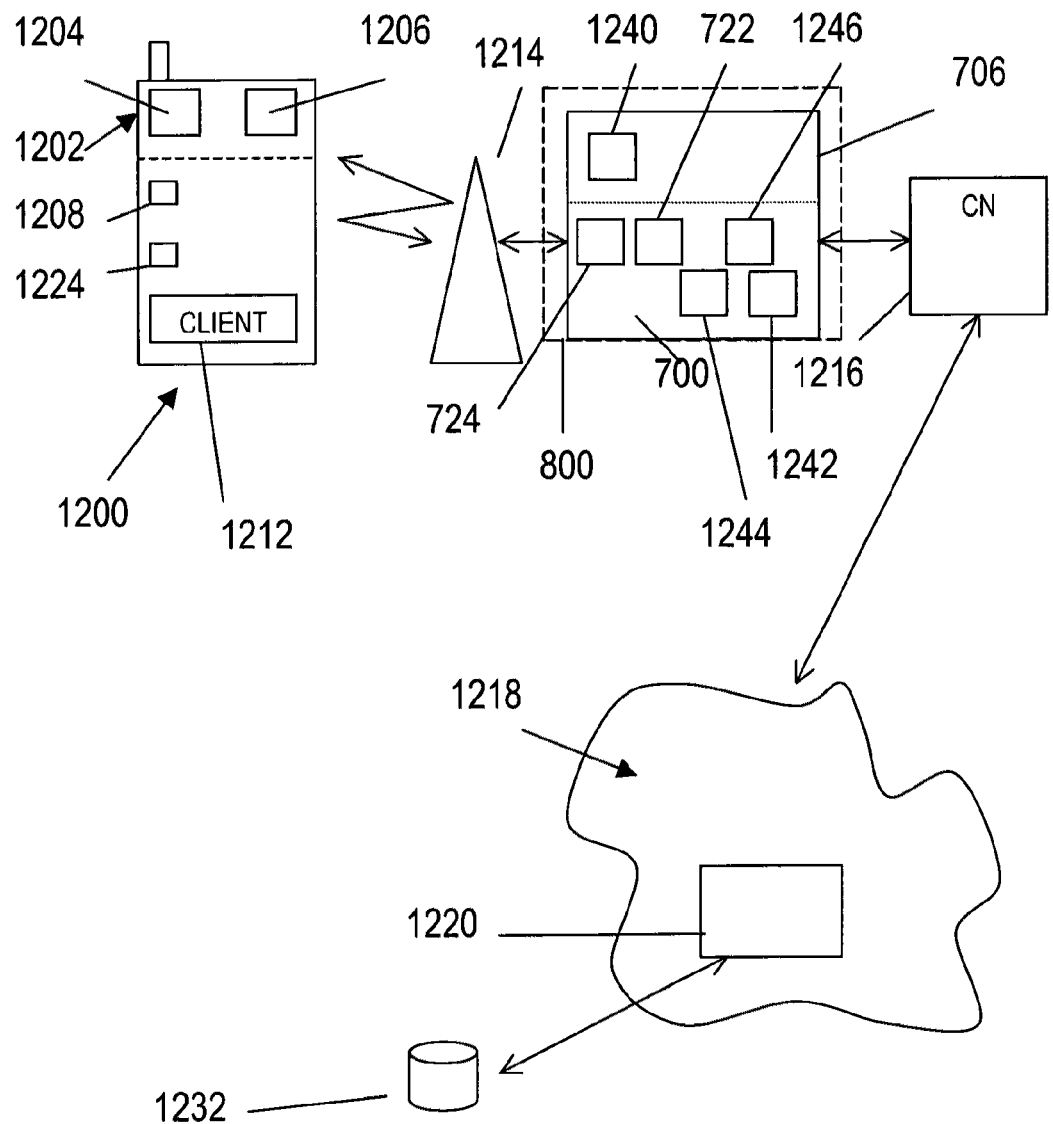
FIG. 13 shows an enhanced architecture according to an embodiment of the system described herein.

FIG. 13 shows an enhanced architecture that allows radio conditions to be gauged and the instantaneous radio load to be taken into account when controlling the radio resources used by applications such as video, in the services part 706 of the platform 700, enabling the network to maximize the user experience and differentially target the radio investment at different applications.

Briefly, the access node 800 hosting the platform 700 can capture performance measurements from the network through:

Analysis of the normal power, timing advance measurement of the serving and neighbour cells it receives from all mobile devices allowing device location to be determined, without the device explicitly being required to provide its location, e.g., through GPS measurements the device Tracking each user device allows measurements of velocity and degradation in radio performance;

Information from the scheduler in the RRM function 724 of the platform 700 allows measurements of quantity of radio resource required to serve each kbps, i.e. the devices radio efficiency.

The new architecture allows this to be completed in real time and allows the access node 800 to build up a map (or other record) of quality across its coverage area, as well as a probability that a device at a location and velocity may experience poor performance in the near future.

The video application includes an optimisation function 1240 in the application/services environment 706 at the access node 800 which uses this information to determine the best time to transmit video content to the device. The video optimisation application 1240 then uses this prediction of the future radio quality of the mobile device to determine whether the network should increase the quantity of the video buffered at the device—e.g., when the device is likely to move into the handover region; or reduce the quantity of the video buffered at the device when the predictions suggest the device is likely to move to better radio conditions.

This approach increases the efficiency of the radio whilst maintaining the user experience of the video service; the increase in efficiency allows the network operator to manage investment in radio resources.

A detailed embodiment that manages the delivery of data to users will now be described with reference to FIGS. 13 to 15B of the drawings.

Referring initially to FIG. 13, the mobile device 1200 includes a service part 1202 (application layer) which hosts video application 1204. A buffer 1208 is associated with the application 1204. The application 1204 requires the periodic reception of data.

The radio access network of the telecommunications network includes a plurality of base stations, of which one base station 1214 is shown. Here, the term "base station" should be interpreted in its broader sense. The base station may be a cellular communications base station, such as a 2G, 2.5G, 3G or 4G "macro" base station. Alternatively, the base station may be a femto cell or may be an access point of a WiFi or other type of radio access network.

The network further comprises a network core 1216. The network may be provided with platforms 700 of the type described above, and a platform 700 may be associated with the base station 1214, for example to form an access node 800 (see FIG. 6). The video optimisation function 1220 of the service cloud 1218 is linked to the core network 1216. A local video optimisation function 1240 is provided on the platform 700.

Figure 14:
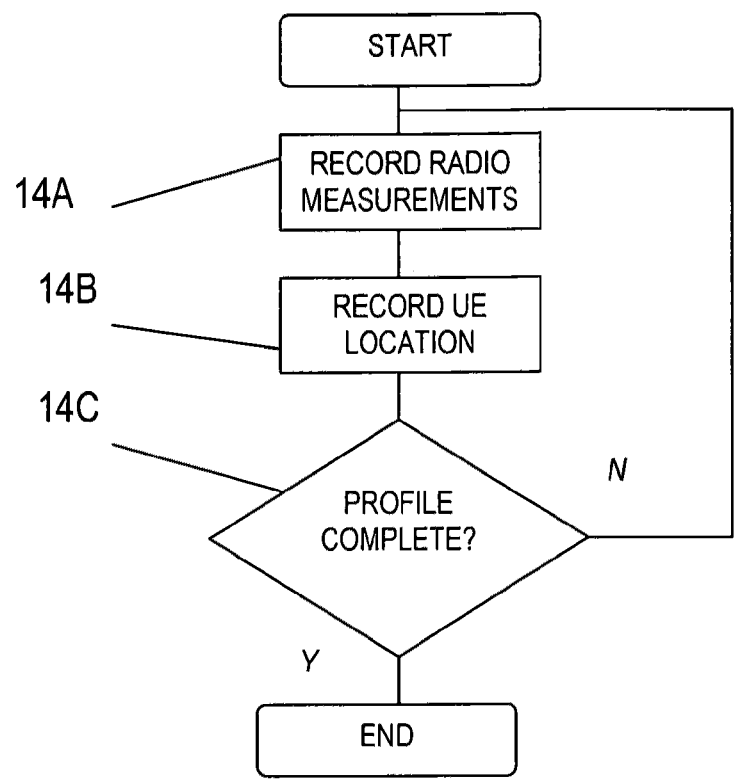
FIG. 14 shows a flowchart of data collection operations to generate a radio conditions map of a cell according to an embodiment of the system described herein.

Data collection operations to generate a radio conditions map (or other record) of the cell associated with the base station 1214 may now be described with reference to the flow chart of FIG. 14.

As described above, the mobile terminal 1200 measures the radio conditions of the cell on which it is registered and the neighbouring cells. These measurements are conventionally used, for example, for determining when to perform handover or cell reselection. According to this embodiment of the system described herein, at step 14A, the mobile terminal 1200 records the signal measurement data from the current cell and neighbouring cells and reports these to the scheduler/RRM function 724 of the platform 700.

The scheduler/RRM function 724 of the platform 700 may also record measurements of radio conditions made by the base station 1214 relating to radio communications with the mobile terminal 1200. Radio conditions information for the mobile terminal 1200 and from the base station 1214 provides an indication of the radio quality within the cell at the location of the mobile terminal 1200. Thus, the platform gauges (assesses) the radio conditions available to mobile telecommunications in the cell. If the radio quality at the location is high, then the amount of radio resource required to send data between the base station 1214 and the mobile terminal 1200 may be small, whereas if the radio quality at the location of mobile terminal is poor, relatively more radio resources may be required to transmit the same quantity of data. The radio conditions measurements recorded may include any or all of:

Channel quality indicator (CQI), which is a measurement of communication quality of the communication channel between the mobile terminal 1200 and the base station 1214, for example, based on signal-to-noise ratio, signal-to-interference plus noise ratio (SINR), signal-to-noise plus distortion ratio (SNDR). Then you receive signal strength.

Received signal strength

Transmit power level

Neighbour cell measurements

ACK/NACK ratio: the ratio of acknowledgements of successfully delivered data packets to the ratio of unsuccessfully delivered data packets.

Block error rate (BLER): the ratio of the number of the blocks containing errors to the total number of blocks received.

Frame error rate (FER): an indicator of the proportion of frames transmitted that are received with errors.

Bit error rate (BER): the ratio of received bits that contain errors to the total number of received bits.

Relative signal strength indicator. (RSSI): the measurement of strength of radio signals at the point at which they are received.

Received signal code power (RSCP): the power measured by a receiver on a particular physical communication channel, and which can be used to calculate path loss.

Call Admission Control Parameters.

Call load/congestion parameters.

Qqual: Measurement of downlink quality parameters, e.g., downlink transport block error rate.

At step 14B the location of the device 1200 at which the ratio conditions measurements are made is determined by location tracking function 722 of the platform 700. The location may be determined by GPS, cell triangulation or any other method. Preferably, the access node 800 hosting the platform 700 determines the location of a mobile terminal by analysing the received signal power from that terminal and the timing advance measurement for that terminal, and does not require explicit location information to be provided, such as GPS measurements.

This data is stored in a profile store 1242 in the platform 700.

At step 14C it is determined whether the map of the cell served by the access node 800 is complete. If the profile is complete, then the procedure of FIG. 14 may be terminated for a predetermined time period; however, the procedure may be reactivated periodically in order to update the profile.

On the other hand, if it is determined at step 14C that the profile of the store 1242 of the platform 700 is incomplete then the procedure returns to step 14A and radio data continues to be recorded by the terminal 1200 and reported to the platform 700.

The map may reflect radio conditions provided by a multiplicity of mobile devices in the cell.

When the profile of the cell is complete a logical or virtual map of radio conditions across the coverage area of the cell is created. This map provides an indication of the radio resources required to transmit data at any particular location within the cell, in both the downlink and the uplink. For example, locations at the edge of the cell may generally require use of greater amount of radio resources to transmit data than a location at the centre of the cell, adjacent to the base station 1214 (that is the uplink and downlink bandwidth efficiency is lower at the edge of the cell than at the centre of the cell). Also, areas within a cell that are shielded by obstructions may require greater radio resources to transmit a given amount of data. This information is reflected in the map.

The cell profile data in the profile store 1242 may be used to identify parts of the coverage area of the cell where high quality radio resources are available for advantageously performing data communication with the device 1200—typically, when the device is in a part of the cell which has good radio conditions and therefore low "cost to carry" data.

Optionally, the platform 700 modifies the radio measurement control parameters for the mobile terminal 1200 (and other mobile devices in the cell) so that the terminal 1200 (and other devices) measure radio conditions with greater resolutions and frequency. The more detailed radio conditions information is reported to the RRM function 724 of the platform 700 and enables the generation of a more accurate cell map/profile.

When the profile in the profile store 1242 is complete the profile store 1242 contains a logical map of the radio conditions within the cell served by the base station 1214. The "cost to carry" data within the cell at each location can be determined from the information in the profile store 1242. Using the data in the profile store 1242, a prediction processor 1244 of the platform is able to predict at a particular location in the cell whether the mobile terminal 1200 may be in radio coverage in the cell which has a low cost to deliver data or a high cost to deliver data (that is, a high bandwidth efficiency or a lower bandwidth efficiency). The predictions of the radio conditions are based on the data collected in the procedure described in relation to the flow chart of FIG. 14. However, as the radio conditions within the cell change infrequently, the prediction is generally likely to be accurate. As mentioned above, the profile/map stored in the profile store 1242 may be updated at regular intervals so that changes to the radio conditions within the cell are reflected by the information stored in the profile store 1242.

A process for providing improved delivery of data to mobile terminals will now be described with reference to the flow charts of FIGS. 15A and 15B.

At step 15A the video application 1204 on mobile terminal 1200 issues a request for the data. This request is transmitted wirelessly to the base station 1214 and onwardly to the platform 700. This request is received by the prediction processor 1244.

At step 15B the current radio condition measurements on the mobile terminal 1200, are gauged by reporting them to the RRM function 724 by the mobile terminal 1200 for assessment. These radio condition measurements are then passed to the prediction processor 1244. Optionally, the RRM function 724 of the platform 700 modifies the radio measurement control parameters of the mobile terminal 1200 so that the terminal 1200 measures radio conditions with greater resolution frequency then it does conventionally. A more detailed radio condition information is reported to the RRM function 724 of the platform 700 and provides more accurate cell information to the prediction processor 1244.

At step 15C the prediction processor 1244 uses the radio condition measurements received from the RRM function 724 to calculate the location of the mobile terminal 1200. The radio conditions information may include the transmission power, timing advance measurement for the device, such that this allows the location of the device to be determined without the device explicitly being required to provide its location. Alternatively, the mobile device 1200 may explicitly indicate its location in by transmitting GPS measurements from the mobile terminal 1200 to the prediction processor 1244.

At step 15D the radio conditions measurements are further analysed by the prediction processor 1244 to estimate the velocity of the mobile terminal 1200—that is, the speed and direction of a mobile terminal 1200.

At step 15E the prediction processor 1244 calculates the load of the cell served by the base station 1214. That is, the processor 1244 calculates the proportion of total cell capacity that is currently being used by all the mobile devices served by the cell. The prediction processor 1244 makes this calculation using information received from the RRM function 724.

At step 15F the prediction processor 1244 identifies that the application is a source of the request for data in step 15A. In this example, the application is video application 1204 of mobile terminal 1200. Information about the application may also be obtained, such as the video playback rate, session duration and volume of data transmitted by the session.

In this example, the prediction processor 1244 then determines, at step 15G, the status of any buffer associated with the application. In this example, the video application 1204 is associated with buffer 1208 of the mobile terminal 1200. A value indicative of the amount of data in the buffer is retrieved and analysed by the processor 1244.

The buffer 1208 operates in association with the video application 1204 in the generally conventional manner so that, when video data is streamed to the mobile terminal 1200 a portion of advance video data is held in the buffer. For example, the buffer 1208 may seek to generally store 20 seconds of video data in advance of the video currently being displayed by the user of the mobile terminal 1200. In this manner, should there be a temporary interruption of transmission of video data to the mobile terminal 1200, the user can continue viewing the content uninterrupted for up to 20 seconds until the content of the buffer is exhausted. Generally, once consumed, the content stored in the buffer is discarded. In this step, the prediction processor 1244 receives the current status of the buffer 1208. For example, if the buffer has 30 seconds of advance video content store, this information is passed processor 1244.

The base station 1214 also includes a downlink buffer, and the occupancy of this buffer may also be reported to the prediction processor 1244.

As mentioned above, the service cloud 1218 conventionally includes video optimisation function 1220 for optimising video content for transmission over a mobile telecommunications network. Alternatively or additionally a video optimisation function 1240 may be provided in the services part 706 of a platform 700. If the video optimisation function 1240 is provided instead of the video optimisation function 1220, then the video optimisation function 1240 may perform the functions that would otherwise be performed by the video optimisation function 1220 (i.e. optimising video content for general transmission over a mobile telecommunications network). Video optimisation function 1240 may also perform the function of optimising video content so that it is adjusted for maximum efficiency of transmission within the particular cell served by the platform 700. For example, video optimisation function 1240 may take into account cell load information provided by the RRM function 724 and may vary the CODEC used to transmit the data in dependence upon the load conditions. If the cell is heavily loaded, then a CODEC may be used that performs a greater amount of compression, whereas if the cell load is light, then the CODEC used may perform less compression in order to provide a higher quality image.

The video optimisation function 1240 has associated with it a video buffer 1246. This buffer 1246 stores video content received from the service cloud 1218 so that it is ready for onward transmission to mobile terminals within the cell served by the platform 700 when required.

At step 15H the status of the buffer 1246 is determined by the processor 1244. The processor 1244 determines how much advance data is present in the buffer 1246 which relates to the content being consumed by the mobile terminal 1200 (the buffer may include many different types of content).

At step 15I the processor 1244 predicts the location of mobile terminal 1200 when the next video content data may be received from the video optimisation function 1240 by the mobile terminal 1200. That is, the current location and current velocity information calculated at steps 15C and 15D is used to predict the future location of the mobile terminal at a time when video content may next be transmitted. For example, if the position of mobile terminal in latitude and longitude is calculated at step 15C and it is known that the terminal is travelling at five mph in an easterly direction, then the position of mobile terminal one minute later can be predicted.

At step 15J the cell map/profile from the store 1242 is consulted by the processor 1244 to retrieve data relating to the predicted future location of the mobile terminal.

At step 15K a decision is made whether to transmit video content data to the mobile terminal 1200. The processor 1244 makes this decision by evaluating the nature of the application requesting data (from step 15F), the mobile terminal 1200 buffer 1208 status (from step 15G), the status of the video content buffer 1246 of the platform 700 (from step 15H), the radio measurements at the current position of the mobile device (from step 15B), and the estimated radio conditions at the predicted location of the mobile terminal 1200 (from step 15J). If the radio conditions are good at the current location and are estimated to be poor (e.g., below a quality threshold) at the predicted location of the mobile terminal 1200 this may be considered by the processor 1244 as a factor in favour of transmitting a large amount of video content data to the video buffer 1208 of the mobile terminal 1200 when at the current location. This is because, when the radio conditions are favourable at a particular location, the "cost to carry" the video content data may be relatively low. Transmitting the video content data at such a time may make efficient use of radio resources. If the radio conditions are estimated to be favourable, the status of the buffers 1208 and 1246 are still taken into account. For example, if the buffer 1208 is full or nearly full, then it may be determined by a processor 1244 that content should not be transmitted. Also, if it is determined by the processor 1244 that the video content buffer 1246 of the platform 700 is empty or almost empty of content relating to the video content required by the video application 1204, then the processor 1244 may prevent the content for being transmitted (at is unlikely to be available from the buffer 1246).

On the other hand, if it is determined at step 15B that the radio conditions at the current location are poor and is estimated at step 15K that radio conditions at the predicted location of the mobile terminal 1200 are good (e.g., above a quality threshold), so that there may be a high "cost to carry" data at the current location, then this may be a factor taken into account by the processor 1244 against transmitting content at the current location of the mobile terminal 1200. For example, if the determined that radio conditions at the current location of the mobile terminal 1200 are poor, then the transmission of video content data may consume a large amount of resources of the cell and may make inefficient use of the available resources of the cell. Instead, the transmission of data is delayed until the mobile terminal moves to the future location, where radio conditions are good. However, the processor 1244 may not make a decision as to whether or not to transmit the video content data based solely on the assessed radio conditions at step 15B and the estimated radio conditions at step 15K. The processor 1244 may take into account the status of the buffers 1208 and 1246. For example, if the buffer 1208 of the mobile terminal 1200 is empty or nearly empty, and the nature of the application consuming the content is one that requires continuous delivery of content (such as video streaming), then a decision may be made to transmit video content data even though the radio conditions are poor. The processor 1244 takes into account the nature of the application requesting the data. In this example the application is a video application 1204. To provide video streaming the video application 1204 must have access to a continuous supply of video content data. However, if the request for content is from an application 1206 which does not require a continuous stream of data, such as a web browser application, the processor 1244 may determine that it is acceptable for there to be an interruption of delivery of content from the application 1206.

In summary, the information obtained in steps 15B, F, G, H, I and J are used to determine at step 15K whether to allow the video optimisation function 1240 to transmit any (or how much) data to the mobile terminal 1200 at the current location. If the processor 1244 decides not to transmit data for the current location of mobile terminal 1200, then the process returns to step 15B. On the other hand, if it is determined at step 15K to transmit data to the mobile terminal 1200, then the process continues to step 15L.

At step 15L the processor 1244 optimises video content data for a mobile terminal 1200. The processor 1244 may determine an amount of content data to transmit. For example, if the radio conditions are assessed to be poor at step 15B, then a small amount of content data may be transmitted, whereas if the estimated radio conditions at step 15B are good, then a larger amount of video content data may be transmitted. At step 15L the content data may be further optimised by compression data using an appropriate CODEC. In this regard, the processor 1244 issues an instruction to the video optimisation function 1240 of the platform 700 to use a particular CODEC. For example, if radio conditions are good at the current location of the mobile terminal 1200 then the processor 1244 may instruct the video optimisation function 1240 to use a CODEC with a lower compression than if the radio conditions are estimated to be poor. The CODEC used by the video optimisation function 1240 may also take into account the overall radio load on the cell as mentioned above, and as determined at step 15E.

At step 15M the video optimisation function 1240 transmits data to the mobile terminal in an amount and in a format as determined at step 15L. Video content data is transmitted by the base station 1214 over the radio access network to the mobile terminal 1200 where it is received by the video buffer

1208 and made available for use by the video application 1204 for displaying streaming with video content to the user of mobile terminal 1200.

Figure 15A:
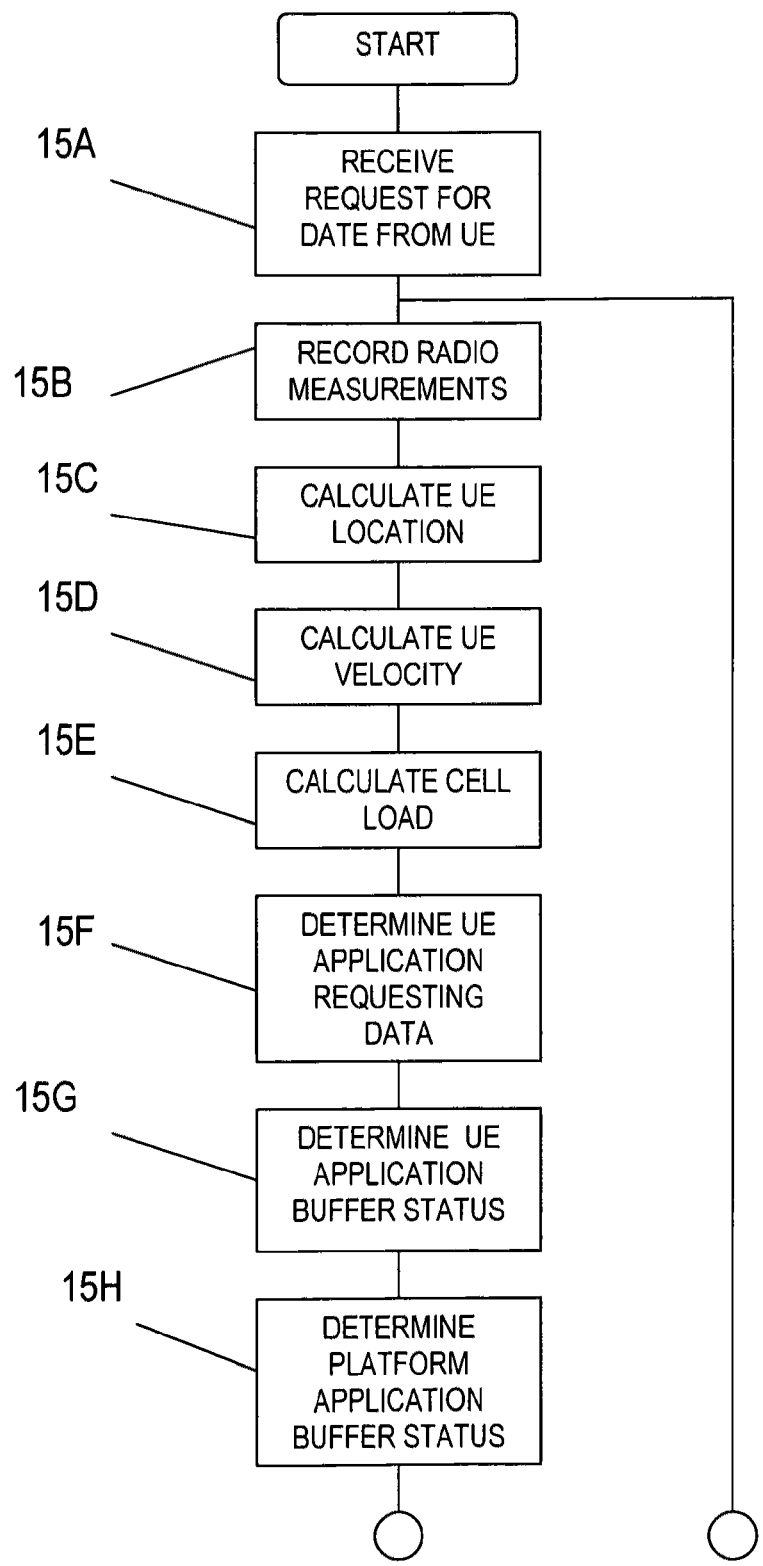
FIGS. 15A and 15B are a flowchart showing a process for providing improved delivery of data between mobile terminals and the radio access network according to an embodiment of the system described herein.
Figure 15B:
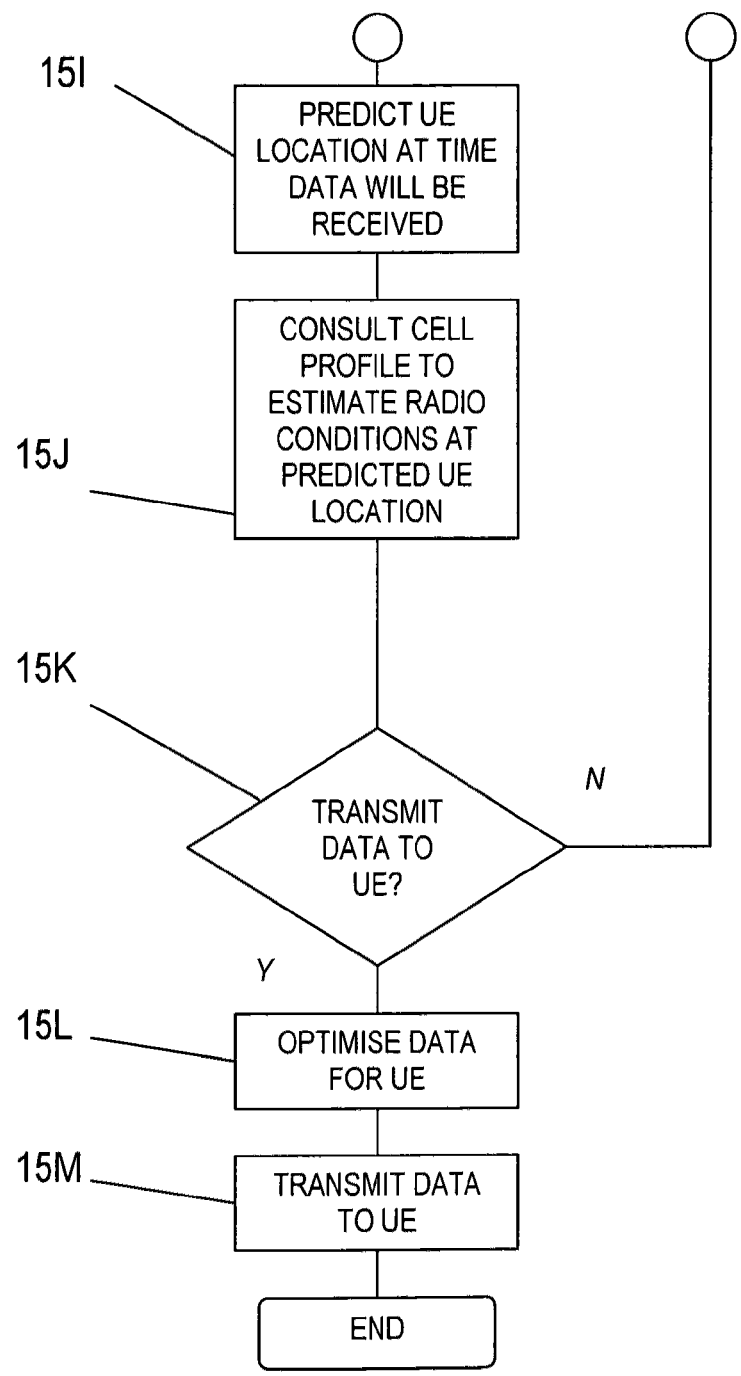

The effect of the procedure of the flow chart of FIGS. 15A and 15B is to ensure that the applications which require data on mobile terminal served by the cell for which the platform 700 is provided receive content in the most efficient manner in terms of radio resources. For example, when the application is a video application 1204, the platform 700 may vary the amount of data stored in the video buffer 1208 on the mobile terminal 1200 as the mobile terminal 1200 moves around the cell. When the mobile terminal 1200 is in an area of the cell where there are good radio conditions, a large amount of video content data may be transmitted and stored on the video buffer 1208 in preparation for use by the video application 1204. In contrast, when the mobile terminal 1200 moves to an area of the cell there are poor radio conditions data may not be transmitted and the amount of data in the buffer may be allowed to be decreased to a minimum amount (for example 3 seconds of advance video content). In this way, video content data is transmitted generally when radio conditions are good, so that the event radio resources of the cell are used most efficiently.

Data Flow Management

As mentioned above, the type of application requiring the data may be taken into account. For applications such as web browsing or operating system updates interrupting the delivery of data is acceptable, so that no content data may be transmitted by the platform 700 when the mobile terminal 1200 is in an area of the cell where there are poor radio conditions. On the other hand, applications such as video applications 1204 must provide the user with continuous content.

The processor 1244 may initialise applications, suspend applications, or terminate applications in dependence upon the estimated radio conditions or the predicted radio conditions of one or more mobile terminals. The applications may be hosted on the platform 700 or on the mobile terminal 1200. An API may be used to control state of the application.

The processor 1244 may initialise, suspend, or terminate data flow associated with applications in dependence upon the estimated radio conditions or the predicted radio conditions of one or more terminals.

The terminals may be a source or destination of the traffic associated with the application, or a terminal or application competing for radio resource with the higher priority application.

The processor 1244 may initialise applications, suspend applications, or terminate applications in dependence upon the estimated backhaul transmission conditions or the predicted future backhaul capacity available to an application being provided to one or more mobile terminals. The applications may be hosted on the platform 700 or on the mobile terminal 1200. An API may be used to control state of the application.

The processor 1244 may initialise, suspend, or terminate data flow associated with applications in dependence upon the estimated backhaul capacity or the predicted backhaul capacity available for the application being provided to one or more terminals.

The predicted backhaul capacity available to the application may be based on measurements of the traffic flowing from the site, including:

Number of active customers sharing for resources
Number of application instances running in the Platform or running through the platform % of applications being high capacity applications (e.g., Video, or connections to specific URLs/IP addresses/domains)

The number of connection request, DNS requests or content and application requests flowing through platform in the previous seconds The % recent connection, content, application requests being for high capacity applications or services Historic usage pattern trends seen over previous hours, days at same time, previous weeks at same time of day and weekday The example discussed above is primarily concerned with transmitting video data in the downlink. The map represents the cost to carry data in the cell in both the uplink and the downlink. The procedure of FIGS. 15A and 15B may be used to predict the location of the mobile terminal 1200 and to allocate network resources to the mobile terminal for transmitting data in the uplink in dependence upon the estimated radio conditions at the predicted location.

The radio conditions predictions may be used to trigger optimisations and RRM decisions in other cells hosted by the platform 700 or another platform.

A differential charging structure may be applied to data downloaded in the background to the buffer 1208 in accordance with this embodiment. For example, the user may not be charged for such background downloading of data but may only be charged when the data is actually consumed.

Application Aware Edge (P100971-GB-PSP)

As discussed above, the platform 700 allows application environments to move closer to the radio site. This enables more complex functions to be moved to the Radio Access Network and for them to be hosted on the platform 700. That is, the services part 706 of the platform 700 may host applications (e.g., 740 and 742). The applications may be hosted by a platform 700 at access node 800 at the NodeB at the Femto or at the AP site or at the gateway 802 at the RNC or BRAS site of the network Also, as devices such as telephones and laptops become increasingly more advanced, additional functionality can be implemented in the application and operating system environment of these devices, allowing the devices to play a greater role in the end-to-end data pipe.

Figure 16:
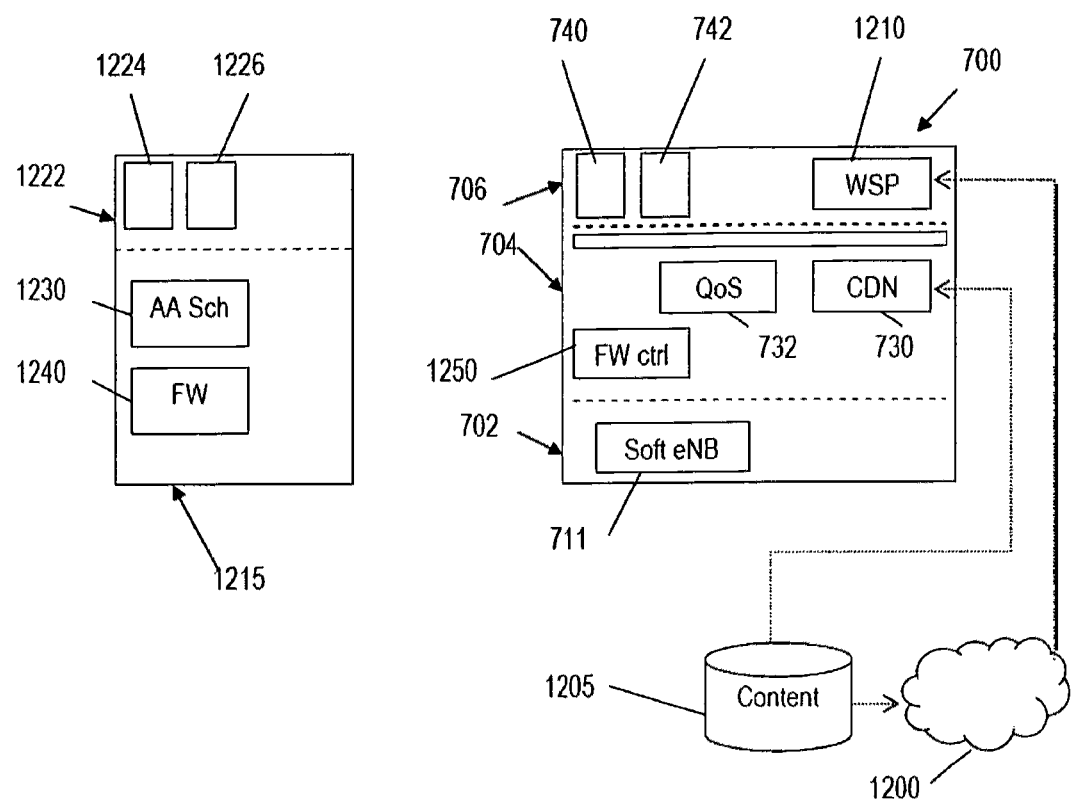
FIG. 16 shows a mobile terminal and platform which host applications, and relates to an embodiment of the system described herein in which the transmission of data is adjusted in dependence upon the application using the data.

As shown in FIG. 16, web service providers can host applications on the platform 700, in the services part 706. For example, web service provider 1200 provides content 1205 to mobile users via agent 1210 hosted on the services part 706 of the platform 700. Alternatively, the content 1205 is provided directly to the platform 700 through Content Distribution Node (CDN) 722 in the network functions part 704 of the platform 700. The content source (agent 1210 or CDN 722) for a receiving device 1215, is closer to the end-user, more responsive, and may optimise content to maximum user experience.

The platform 700:
Makes measurements of the radio load;
Identifies the frequency and technology layer the subscriber is currently using;
Makes measurements of 2G/3G/4G user coverage/distance from the site per technology, and the overlapped coverage areas;
Makes measurements of Quality of the radio link to the subscriber;
Identifies the device type used by the subscriber/client;
Assesses the properties of that technology/frequency in a specific cell/location.

These measurements may be received at the soft nodes 702 (e.g., eNodeB 711) and passed to functions part 704 (e.g., QoS function 732).

The functions part 704 (e.g., QoS function 732) may then pass this information to the agent 1210 or CDN 722 hosted on the platform 700. Alternatively, the functions part 704 may processes this information in conjunction with information about the requirements of the agent 1210 or CDN 722 to understand the application characteristics. As results of these analyses, the platform 700 may take appropriate action to maximise receiving device 1215 user experience.

For instance, if the receiving device 1215 is on an LTE network and is currently on a lower bandwidth coverage layer, the platform 700 may suggest a large web page format for displaying content; whereas if the receiving device is on a higher bandwidth LTE capacity layer then the platform 700 may suggest a high-definition web page format for displaying content. By way of another example, applications may be optimised based on the perceived user connection coverage/quality, that is based on the measured user throughput and/or receiving device 1215 measurements.

The agent 1210 or CDN 722 uses this information to build a web page (or other content form) specifically for the receiving device 1215 user at current present time on the current connection; to maximise the user perception of the service. Examples of this are:

The scaling of the advertising video based on the available bandwidth;

Scaling the number of objects on the webpage (e.g., the number of stories);

Scaling of the font size of text, depending on known device specifications;

Enabling or disabling auto-lookup functions embedded within web pages based on the latency of the network.

The mobile device 1215 may include services part 1222 (application layer) which hosts applications 1224 and 1226. In the uplink, the packet data are scheduled based on the cell load, and device buffer occupancy. The network is not unaware of the type of the application transmitted by the device until this application gets received and then characterised.

It is therefore proposed to provide the mobile device 1215 with an application aware scheduler 1230 that operable to prioritise data relating to applications 1224 and 1226 during network load based on the application characteristics.

Applications whose performance is impacted by data delay (latency) may be prioritised over other application regardless of the user-type/class. This is implemented by the application aware scheduler 1230.

It is also possible to push certain applications to a specific technology/network layer based on the user location/mobility and application characteristics. Applications that are characterised as high bandwidth that are running on stationary devices may be pushed to a different network or difference layer (e.g., Femto layer). This is implemented by the application aware scheduler 1230.

As discussed above, the platform 700 functions introduced into the radio access network monitor the usage and the associated characteristics of the data bearer by each application 1224 and 1226 on the device 1215.

In the downlink the use of the network resources can be directly controlled within the network, whereas in the uplink the traffic can only be assessed by the network once it has been passed over the most expensive part of the system, the radio.

It is therefore proposed that to introduce a client 1240 on the mobile device with firewall capabilities. The platform 700 includes a firewall controller 1250 that monitors the data activity of the device 1215 and updates the firewall rules on client 1240 of the device 1215 in real time, depending on the application usage and the current performance of the radio link between the device 1215 and the network.

The firewall client 1240 may control:

Maximum throughput for a connection/application/port number;

Maximum number of simultaneous connections or max of a certain application/port number;

Maximum rate of new connections to any address; e.g., controlling the interval that a device checks for new emails on an email server, avoiding the device moving back into active state two frequently, or impacting the control load on the network;

Blocking access to certain IP address ranges;

Controlling the use of certain network protocols, e.g., Netbios, SNMP, which have no/limited value on an IP connection.

For instance, if the platform 700 detects application usage by a device 1215 in poor radio conditions, or on a loaded cell, the firewall controller 1250 of the platform 700 downloads firewall rules to client 1240 to control the throughput of specific applications on that specific IP connection (e.g., source/destination IP address/Port Number, and associated maximum throughput).

When radio conditions change the firewall controller 1250 of the platform 700 can update the firewall rules defined on the client 1240 on each of the devices. The network may also configure each of the clients 1240 of the devices with different sets of firewall configurations. The firewall controller 1250 of the platform 700 may control en mass which profiles the devices use through cell broadcast messaging, removing the need for the firewall controller 1250 of the platform 700 to update the client 1240 of each device individually.

The firewall controller 1250 of the platform 700 may switch the general profiles implemented by the client 1240 depending on the cell load, or time of day, etc. Alternatively, the firewall controller 1250 of the platform 700 can transmit a scaling factor on the cell broadcast which the clients 1240 of the devices use to scale the throughput constraints it uses certain firewall rules.

The platform 700 continues to monitor the data sessions of the device to ensure the device is adhering to the firewall rules the platform 700 has defined, and controls (discards/delays) any packets transmitted that are not within the rules so that there is no benefit for the misbehaving device.

The firewall client 1240 on the device can operate at a layer above any VPN client running on the device, allowing the applications to be controlled, even though the platform 700 cannot directly analyse the content of packets.

The firewall controller 1250 and he client 1240 may be provided in a mobile terminal that may or may not also include the application aware scheduler 1230.

Optimised Content Upload (P100935-GB-PSP)

When data is transferred from a device to the internet, the great distance and many interfaces/mediums the content has to pass over limit the upload speed of the radio technology and therefore the time it takes to deliver the content.

The delay that a customer experiences when uploading content or files to the internet has a direct correlation to customer perception of network quality. User experience can be improved if the time taken to delivery the content can be reduced.

Figure 17:
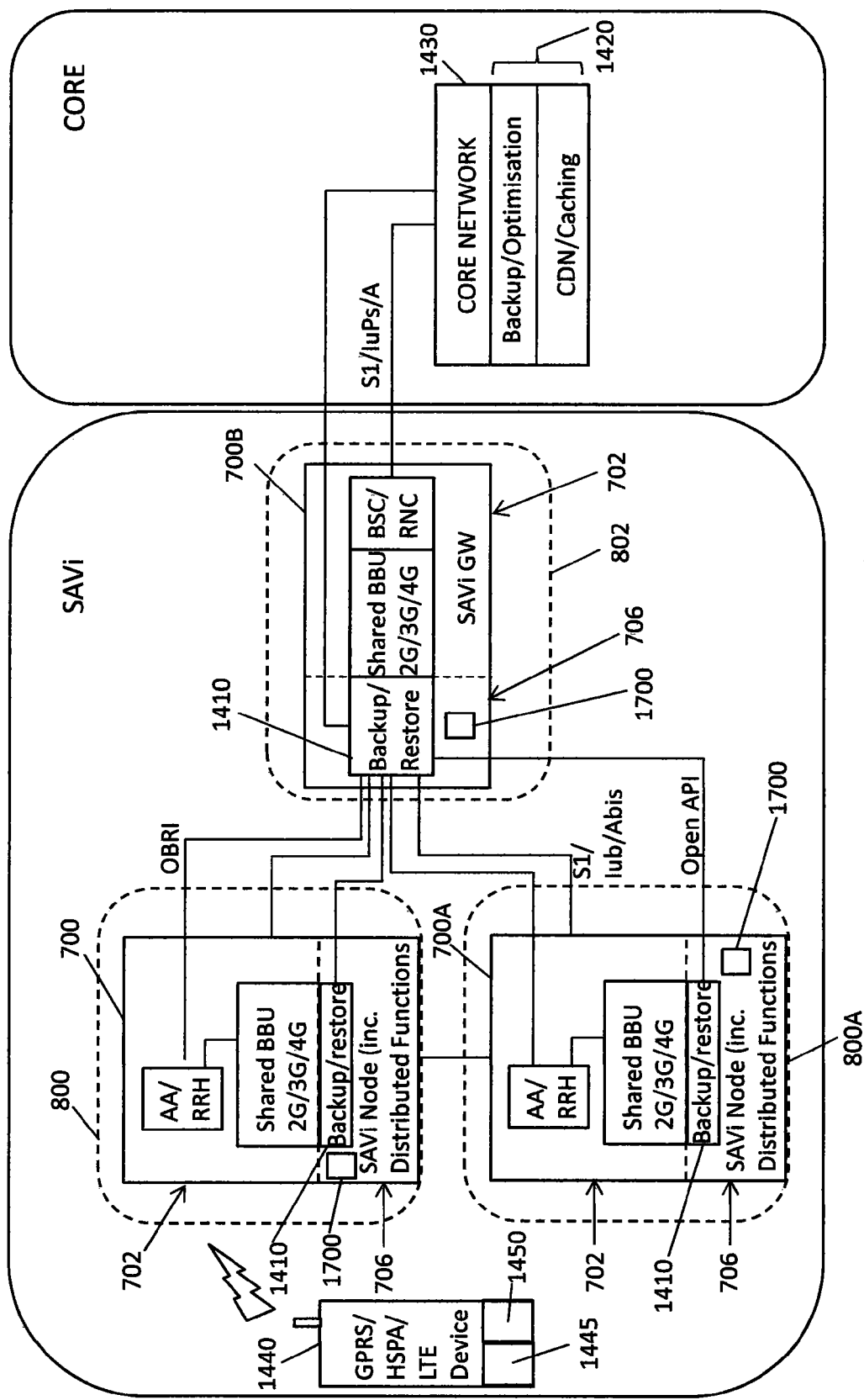
FIG. 17 shows the architecture for performing backup according to an embodiment of the system described herein.

As discussed above, the platform 700 allows application environments to move closer to the radio site. This enables more complex functions to be moved to the Radio Access Network and for them to be hosted on the platform 700. That is, the services part 706 of the platform 700 may host applications. The applications may be hosted by a platform 700 at access node 800 at the NodeB or at the Femto, or at the AP site or at the gateway 802 at the RNC or BRAS site of the network The platform 700, in the services part 706, hosts an uplink application 1700 (FIG. 17). The uplink optimisation application 1700 may have an associated electronic store. The uplink application 1700 may control the uplink transmission of content from the terminal to central data stores—for example a data store located in the core network 1430, or a $3^{rd}$ party web page/storage cloud.

When an uplink starts, the uplink Application 1700 estimates the likely difference in user experience for the customer in providing a direct upload, or an upload to the data store located at the radio site.

The uplink application 1700 may decide whether to temporarily store content at the radio site (e.g., in the store associated with the uplink application 1700), or to allow direct transmission to the core, web service, or cloud storage. The decision may be dependent on available radio resources, the customer type, the device capability and the available backhaul transmission resources as well as the assessed User Experience.

The uplink application 1700 may decide when to upload the data at the radio data associated with the uplink application 1700 store to a central location based on the transmission network load, customer type and historic movement patterns and an understanding of the application of the associated data stored.

Optimised Incremental Device Backup, Restore and Automatic Content Distribution

Smartphone devices are becoming increasing popular and within a couple of years these may represent the majority of personal mobile devices present on the mobile network. These devices have large amounts of storage capacity which may consist of personal data such as address book and calendars etc, together with media such as music and digital photographs. In addition the operating system data, user preferences may be present on the device. All together this data could represent anything from several Megabytes to many Gigabytes of data, if this data was lost or became corrupted it could be a considerable inconvenience to the user, it is therefore desirable to backup some or all of the data on the device.

One option is to perform the backup over the mobile network to store the data on a server which could be outside of the radio access network, situated either in the network operator's core network or in the interne. Transferring this data could put considerable load on the air interface (the interface between the user's device and the base station radio site) and the backhaul (the interface between the radio site and the core network) and onwards towards the backup server and provide poor user experience. Building capacity in these interfaces represent a considerable investment for the network operator, in particularly building radio sites, installing the air interface capacity and provisioning the backhaul capacity (e.g., through fibre optic cables) require large amounts of investment, on top of this are the costs associate with operating such as site rentals and electricity.

There is therefore a need to perform the backup and upload functions in the most efficient manner possible to reduce these investments but at the same time delivering an excellent back up and restore service for the customer.

As discussed above, the platform 700 allows application environments to move closer to the radio site. This enables more complex functions to be moved to the Radio Access Network and for them to be hosted on the platform 700. That is, the services part 706 of the platform 700 may host applications. The applications may be hosted by a platform 700 at access node 800 at the NodeB or at the Femto, or at the AP site or at the gateway 802 at the RNC or BRAS site of the network Also, as devices such as telephones and laptops become increasingly more advanced, additional functionality can be implemented in the application and operating system environment of these devices, allowing the devices to play a greater role in the end-to-end data pipe.

The platform 700, in the services part 706, hosts a backup application 1410. The backup application 1410 may have an associated electronic store. The backup application 1410 may also forward data to a central backup store 1420—for example located in the core network, or accessible via the core network.

The platform 700:
Makes measurements of the radio load;
Identifies the frequency and technology layer the subscriber is currently using;
Makes measurements of 2G/3G/4G user coverage/distance from the site per technology, and the overlapped coverage areas;
Makes measurements of Quality of the radio link to the subscriber;
Identifies the device type used by the subscriber/client;
Assesses the properties of that technology/frequency in a specific cell/location.

These measurements may be received at the soft nodes 702 (e.g., eNodeB 711) and passed to functions part 704 (e.g., QoS function 732).

The functions part 704 (e.g., QoS function 732) may then pass all or selected parts of this information to the backup application 1410 hosted on the platform 700.

In accordance with this embodiment, the platform 700 is modified to introduce functionality which enables the radio resources and backhaul resources to be used more effectively. The backup application 1410 is provided in the services part 706 of the platform 700, as shown in FIG. 17. This backup application 1410 is, for example, responsible for detecting the load on the air interface and to begin the backup operation at times of suitable (low) load; this could be during off peak times such as during the dark hours. The backup application 1410 may be configurable to allow the user to set their preferences such as which data to backup and how often to perform the backup. The backup application 1410 may also be configured by the network operator in the same way in order to allow the operator to select which elements of the device data could be backed up. The backup application 1410 may be provided at an access node 800 and/or at a gateway 802.

The backup copy of the device can be performed in two main ways:

Periodic: The backup copy of the device data stored on the platform 700 may be transferred to a central backup server 1420 periodically; the frequency of this operation may be configured by the network operator or the backup application 1410 could manage this function again using load information from the backhaul network or information collected from other nodes in the network; the backup application 1410 is able to receive load and scheduling information from any other node in the network. This allows the network operator to transfer data to the central backup server 1420 in the most efficient manner, typically during off peak times where there are low traffic levels.

Event based: For event based backup, data backup can happen when the memory capacity of the platform 700 or the network load exceeds (or is below) a certain utilisation threshold.

During mobility or for specific device types, it is possible to backup to the radio site (the platform 700 at the access node 800 where the call is originated) and co-ordinate the backup with a central backup server 1420.

In case of the soft/softer handover for a 3G network, the serving base-station may be the serving node and the remaining base station(s) may act as drift node (s). The data is then combined in the platform 700 at the access node 800 from where it originated.

Content Caching (Transparent Caching)

The backup application 1410 allows elements of the uploaded data to be distributed to alternative destinations (other than the main backup server 1420), for example photographic media could be automatically distributed to a photo sharing site, the address book data could sent or synchronised with the user's internet email account. Again transmission of this data may be scheduled by the backup application 1410 in order to take advantage of the network load.

Incremental Backup (Data Synchronisation)

The backup application 1410 may typically perform an incremental backup function thereby eliminating the need to backup data which has been previously backed up. Control of this function is by the backup application 1410 and implementation of this reduces the load on the air interface.

Restore

Upon loss of data the user or network operator may choose to perform an immediate restore, this may be done regardless of network load. Alternatively a background restore may be scheduled by either the user or network operator; in this case it could be done using the load information available from the backup application 1410.

Charging

Charging is avoided when the customer has a flat rate plan. In this case, the operator/supplier tracks total usage and alarms/rate-limits after that. If charging is not avoidable then CDRs may be generated by the central backup server node 1420.

How "the Backup and Restore" Might Work in Practice

As described above, the backup and restore decision may be based on the policy role enforced by the operator and/or user in a static or dynamic configuration using the exiting or newly introduced network element(s).

The embodiment will now be described in more detail.

Returning to FIG. 17, the network architecture may now be described in more detail. As mentioned above, a central backup server node 1420 is provided in the core network 1430 (but may be located elsewhere and be accessible by the core network 1430, e.g., via the internet). As also mentioned above, a platform 700 of the type described earlier in detail, and including a backup application 1410 provided in the services part 706, may be provided at one or more locations in the radio access network. In FIG. 17 a first platform 700 is provided at a first access node 800, and a second platform 700A is provided at a second access node 800A. A third platform 700B is provided at a gateway node 802. The gateway node 802 is connected to the first access node 800 and the second access node 800A. The first access node 800 and the second access node 800A are able to communicate directly by a wireless communication with a mobile terminal 1440, whereas the gateway node 802 communications with mobile terminals, such as mobile terminal 1440, via one or more of the access nodes 800,800A. The access nodes 800, 800A communicate with the core network 1430 via the gateway node 802. The access nodes 800, 800A and the gateway node 802 may also communication with the internet directly if a decision is made to offload data traffic directly to the internet and bypass the core in the manner described earlier.

In practice there may be a multiplicity of access nodes and gateway nodes in the network.

Communications between the access nodes 800, 800A and the gateway nodes 802 may be by a wireless or fixed (cable) connection. Communications between the gateway nodes 802 and the core network 1430 may also be by a wireless or fixed (cable) connection.

Each of the backup applications 1410 has a local store (memory) associated therewith. This memory may be provided on the same platform 700 as the backup application 1410. The store may additionally, or alternatively, be provided elsewhere, and the backup application 1410 is configured to communicate with that store via the platform 700 using a wireless or fixed connection. The communication between the backup application 1410 and the separate store may be via the internet.

The core network 1430 may be connected to various data stores, for example via the internet, such as email servers and content sharing servers.

As discussed above, the user's mobile terminal 1440 may store various data, such as personal data (address book, calendar etc), content such as music and digital photographs, operating system data specific to the user and user preferences for the operation of the device and interaction with the network. This data may be stored in a store 1445 of the terminal 1440 (although in practice it may be stored in a plurality of separate stores).

A feature of the present embodiment is to facilitate the backing up of such data on the terminal 1440 so that the data can be restored to the terminal 1440 (or to another terminal), in the event that the data on the device becomes lost or the device 1440 itself is damaged or lost. The data from the store 1445 of the terminal 1440 is transmitted wirelessly by the radio access network of the cellular network to the base station with which the terminal 1440 is registered. The base station has associated with it a relevant access node (access node 800 in the example of FIG. 17). The platform 700 of the access node 800 receives the data at the soft node part 702 of the platform, and passes this to the services part 706 of the platform. In the services part 706 of the platform 700 the backup application 1410 receives the data.

Data may be transmitted between the mobile terminal 1440 and the base station with which it is registered as the data are generated and stored on the store 1445. Alternatively, the data may be transmitted in dependence upon one or more criteria. The data may be transmitted at predetermined time intervals, when there is a predetermined amount of data to be transmitted, or in dependence upon other criteria. The criteria may be defined by the network operator and include (but not limited to): network load (or predicted network load), time of day, user's subscription type, priority of data, measured location of the terminal 1440 (or predicted location of the terminal 1440), mobility state of the mobile terminal 1440, available storage on the mobile terminal 1440, available storage for the backup application 1410 (on the platform 700 or in the local store), available storage in the backup server node 1420, the radio access technology through which the terminal 1440 is connected to the base station (e.g., 2G, 3G, 4G etc), the data communication rate available to the mobile terminal 1440 (or predicted data communication rate available to the mobile terminal 1440) and other functions simultaneously being performed by the terminal 1440.

The transmission of the data between the terminal 1440 and the base station may be dependent upon user defined criteria which include (but are not limited to): the priority of data, the storage capacity of the terminal 1440 (particularly the store 1445), the applications to which the data relates, the source of the data, the time of day, the terminal 1440 location, the cost to transmit the data, the data rate available for communication between the terminal 1440 and the base station, the remaining battery power of the mobile terminal and specific services.

If the data are transmitted in dependence upon particular criteria, a data transmission application 1450 may be provided on the terminal for controlling the transmission of data. The application 1450 may be configurable by the user to transmit data in accordance with the user defined criteria. If the network operator wishes to define the criteria for transmission of the data, then relevant criteria are transmitted in a message from the core network 1430 to the application 1450 on the mobile terminal via an appropriate access node 800. Backup application 1410 may also define criteria for the transmission of data from the mobile terminal, and may configure the terminal application 1450 accordingly.

When data from the mobile terminal 1440 are received by the backup application 1410 on the access node 800, the backup application 1410 stores the data in the local store. The application 1410 then determines whether the data should be sent to a different location. Often, the most appropriate action may be for the data to be forwarded, via the gateway 802, to the central backup server node 1420 in the core network 1430. The central backup server node 1430 is a secure storage location and is readily accessible by access nodes 800 and gateways 802 throughout the network. Such an arrangement is particularly advantageous when the terminal 1440 is highly mobile, and it moves extensively around the geographical area served by the cellular network (it has a high mobility state).

However, some terminals may be fixed in position, or may move within a limited and predictable geographical area (they have a low mobility state). The backup application 1410 is operable to calculate the mobility status of the terminal or to communicate with the core network 1430 to obtain information about the mobility status of the terminal from which data are received and includes data processing capability to determine the most appropriate location for storage of the data. For example, if the core network 1430 indicates that the terminal 1440 is fixed, the backup application 1410 may decide to store the data locally. Therefore, in the event that it is required to provide the data back to the terminal 1440 (i.e. perform a data restore), the data can be transmitted efficiently to the terminal 1440 without consuming the capacity in the backhaul links between the access node 800, gateway 802 and core network 1430.

If it is indicated that the terminal 1440 moves within a small geographical area, the information provided by the core network 1430 may be used by the backup application 1410 to calculate which access nodes serve the terminal 1440 during its limited geographical movement. The backup application 1410 may then make available a copy of the data to the respective backup application 1410 (and associated local store) at each relevant access node. The entire data may be copied or a portion of the data copied.

The physical location in which the data are stored may be selected in dependence upon the registered billing address of the user of the terminal 1440, the available storage resource at each storage location, the typical usage patterns and movement patterns of the mobile terminal 1440.

Any data held by the backup application 1410 of an access node 800 may also be copied to the backup application 1410 of a gateway node 802 and/or the central backup server node 1420 in the core network 1430. Therefore, in the event of a failure of the access node 800, the data may be retrieved from the gateway node 802 or the central backup server node 1420 (albeit at the cost of consuming backhaul data transmission resources).

The data provided by the mobile terminal 1440 and stored by the backup application 1410 at its local store and/or the central backup server node 1420 may subsequently be provided to the terminal 1440 in order to restore that data to the terminal 1440 in the even that the data becomes lost or the terminal 1440 itself is damaged or lost.

The backup application 1410 may select which data are stored in local storage and which data are stored in the central backup server node 1420. For example, data more likely to be required frequently by the terminal 1440 may be stored locally, whereas data that is unlikely to be required frequently may be stored in the central backup server node 1420.

Data that is backed up from the mobile terminal 1440 may be retained in the mobile terminal (in the store 1445) or may then be deleted from the terminal 1440 in order to free up storage space. The user may determine which data are retained on the terminal 1440 and which data are deleted. Alternatively, this decision may be made automatically by the application 1450 in dependence upon criteria set by the user and/or the network.

Each user has a user specific context associated therewith. The user specific context includes a list of locations at which the user's data are stored and any security credentials for each of the storage locations where the content is stored, and security credentials for the user's mobile terminal 1440. The user specific context may further include a list of file names and content descriptions relating to the data. The user specific context allows any backup application 1410 to determine the location or locations at which any user's data are stored, and provides sufficient information to allow the retrieval of that data. The user specific contexts are accessible to the backup applications 1410 and the central backup server node 1420. The user specific contexts may be stored in the core network 1430 or at any other suitable location. The information in the user specific contexts in maintained and updated by the relevant backup application(s) 1410 and/or the central backup server node 1420.

In the event that the mobile terminal 1440 requires data to be restored thereto, an appropriate request is sent via the base station with which the terminal 1440 is registered. This request is passed to the backup application 1410 of the access node 800 associated with the base station. The backup application 1410 initially determines whether the data are available in its local store. If the data are not available in the local store, then the user specific context is obtained. This provides the relevant location, security credentials, file name and content descriptions that allows the data to be retrieved by the backup application 1410 and restored to the terminal 1440.

Data may be transmitted directly between access nodes 800 either wirelessly or by a fixed (cable) link, or may be transmitted via one or more gateway nodes 802 and/or the core network 1430.

Because the access node associated with the base station with which the terminal 1440 is registered is in the radio access network close to the terminal 1440, the backup application 1410 is able to receive from soft nodes 702 and network functions 704 parts of the platform 700 information relating to the radio conditions and terminal 1440 location. The location data may be calculated from GPS data provided by the terminal 1440, and may be calculated by another suitable mechanism, such as cell triangulation or calculating the time that it takes for a transmitted data packet to be acknowledged by the terminal 1440. Various other location determining the arrangements are known to those skilled in the art that may be suitable for implementation by the backup application 1410.

Data relating to the movement of mobile terminals 1440 may be provided to the core network 1430. This data may be used by the central backup server node 1420 to predict the future locations of mobile terminals. This prediction information may be used to control in which local stores data relating to that terminal 1440 are stored. Data may be provided to an appropriate local store based on the prediction of the terminal 1440 being served by the access node 800 with which that local store is associated, so that the backup application 1410 of that store is able to provide that data efficiently to the mobile terminal when it reaches the predicted location.

Data transmitted between the access nodes 800/gateway nodes 802 and central backup server node 1420 may be transmitted at the times selected by the backup application 1410 and/or the central backup server node 1420. The times may depend upon the measured or predicted availability or communication capacity between those nodes. For example, the data may be transmitted in the early hours of the morning when there is significant spare communication capacity. Advantageously, this means that during peak times, the communication capacity is available for other types of communication.

Preferably, data from the terminal 1440 is backed up incrementally. That is, only when there are changes or additions to the data are those changes/additions provided to the backup application 1410. This is in contrast to backing up the whole of the data, including those parts which are unchanged. This makes more efficient use of the available communication resources. Similarly, when data are restored to the terminal 1440, only those parts of the data that are required are restored, rather than the entire data associated with the terminal 1440. In some circumstances it may be desirable to backup and/or restore the entire data for the user, and this is also possible.

The user of the terminal 1440 and/or the backup application 1410 may select only certain data that is required to be backed up. For example, some data may be selected as not sufficiently important to require backing up.

The user of the terminal 1440 and/or the backup application 1410 may prioritise data requiring backup. For example, data regarded as most important (such as contact information) may be backed preferentially to other less important data if there are limited communication resources or storage resources allowing backup of data. Also, higher priority data may be backed up more frequently than lower priority data.

The local store associated with a backup application 1410 may be regarded as a temporary store in some situations, where data are temporarily held before transmission to the central backup server node 1420. On the other hand, where it is determined that the data should be held on the local store, the data may be retained at the local store in long term or permanent storage.

In event that it is required to restore data to the terminal 1440, the backup application 1410 of the access node 800 serving the terminal 1440 may determine the most appropriate time to transmit that data. This may depend on the criteria mentioned above. Higher priority data may be restored earlier than lower priority data. The local store associated with the backup application 1410 temporally stores data destined for the terminal 1440 prior to transmission to the terminal 1440. For example, backup data obtained from the central backup server node 1420 may be held in the local store until the backup application 1410 determines that it is appropriate to transmit this to the terminal 1440.

The backup application 1410 or central backup server node 1420 may consolidate data relating to a particular user that is distributed over a plurality of local stores and the central backup server node 1420 into a single store—either a single local store or the central backup server node 1420. Also, the application 1410 or central backup server node 1420 may move data relating to a particular user from one storage location to another storage location, in dependence upon the circumstances. For example, if a user changes their billing address or movement patterns, the storage location may be changed so that it is at a geographical location likely to be closer to the user. The data may also be moved in dependence upon the type of access technology used to access the data.

Although the data stored in the stores are referred to as backup data, it should be understood that the data in the stores may be accessed, consumed and manipulated directly other than by using the terminal 1440. For example, the data may be accessed by a user using their personal computer and accessing the data via the interne.

According to the embodiment, data may be synchronised between a mobile terminal 1440 and a backup store. In this way, the same data may be present on both the mobile terminal 1440 and on one or more backup stores. If the data are changed on the mobile terminal 1440 or on the backup store, then the change may automatically be made to the other of the mobile terminal 1440 and the backup store in order to keep the data identical. The data may be changed to the backup store, for example, by the user accessing this data not via their terminal 1440 but via a different mechanism, such as a personal computer connected to the interne.

The backup data that are transmitted while the terminal 1440 is moving around the radio access network may be received by different base stations, associated with different access nodes 800, as the terminal 1440 is handed over between base stations. The backup application 1410 of a selected access node 800 (for example the access node 800 on which the backup session was initiated) is operable to retrieve the data transmitted to other access nodes (by direct communication between the access nodes 800 or by the data being sent via one or more gateway nodes 802 and/or the core network 1430. This controlling backup application 1410 is operable to assemble the backup data and to then determine whether it should be stored locally in the store associated with the controlling backup application 1410 or whether it should be stored at another local store associated with another access node or in the central backup server 1420.

Figure 18:
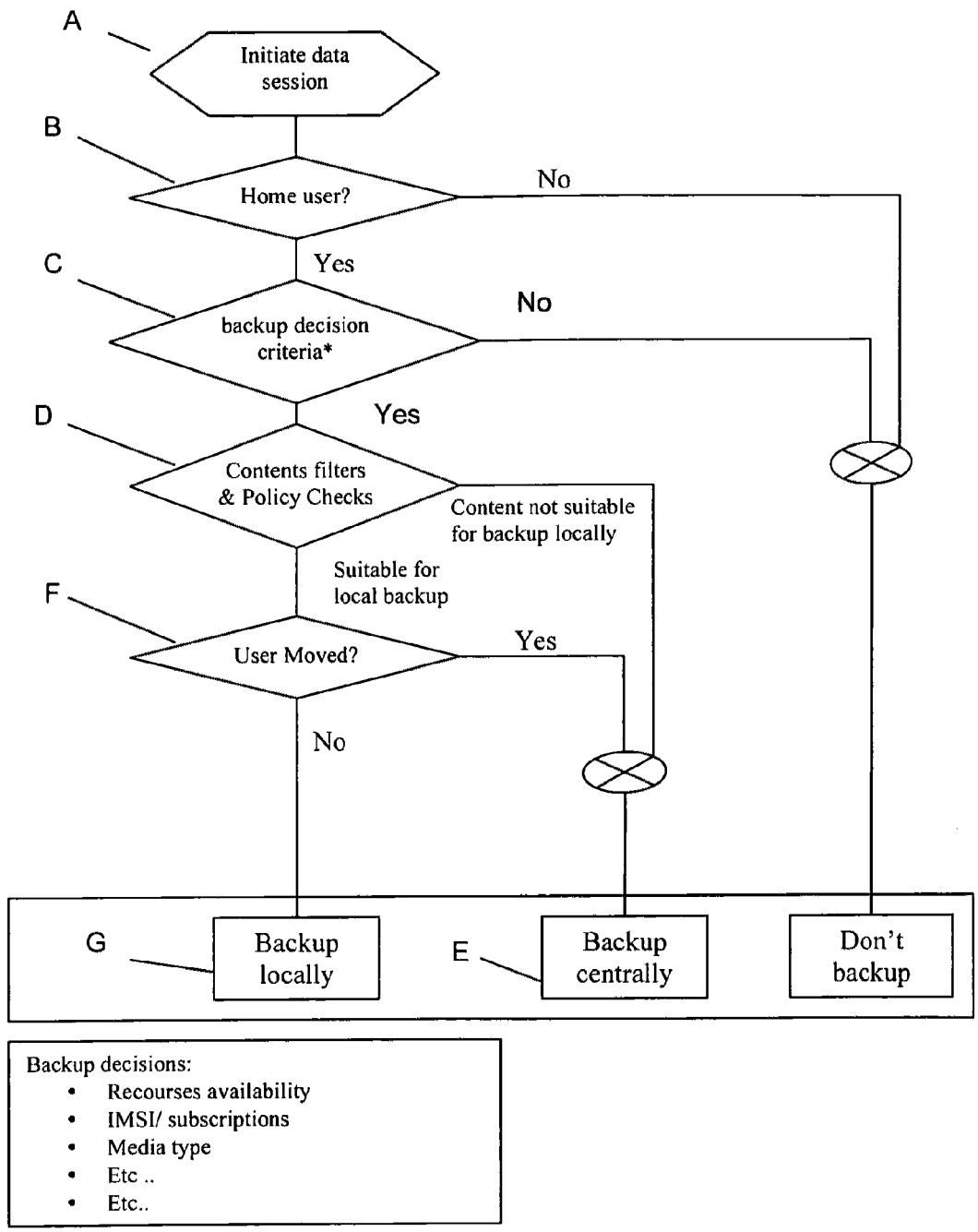
FIG. 18 is a flow chart showing the decision steps to perform backup according to an embodiment of the system described herein.

An example of the process for backing up data of a mobile terminal 1440 will now be described with reference to the flowchart of FIG. 18.

At step A a data communication session is initiated between the terminal 1440 and the base station associated with the relevant access node 800.

At step B the access node 800 determines whether the terminal 1440 is operated in its home network or whether it is roaming. If it is determined that the terminal 1440 is roaming, the backup of data is not performed.

On the other hand, if it is determined at step B that the terminal 1440 is in its home network, then at step C it is determined whether backup decision criteria are met. The criteria may include, for example, the availability of communication or storage resources to receive and store the data for backup. The criteria may also include the type of user—the type of subscription that the user has with a cellular network—and identified by the IMSI. Any other decision criteria may also be applied, such as the type of data requiring backup. For example, if the communication capacity available is limited, then the backup or large items, such as video files, may not be permitted.

If at step C the backup decision criteria are met, then content filters and policy checks are applied at step D to determine whether the content is in principle suitable for backup locally. For example, the historical movement patterns of the device 1440 may be reviewed to determine whether local backup is appropriate. Also, whether local backup is appropriate may depend upon the type of content.

If at step D it is determined that local backup is not appropriate, then backup is performed at the central backup node 1420 (step E). That is, the backup data may be received by the backup application 1410 and passed to the central backup server node 1420 (after optionally being stored temporally on the local store).

On the other hand, if it is determined at step D that the content is in principle suitable for local backup, it is then determined at step F whether the terminal 1440 has moved. If it is determined that the terminal 1440 has moved, then the data are backed up centrally at step E.

On the other hand, if the terminal 1440 has not moved, then the data are backed up locally (step G).

Billing (P100943-GB-PSP)

Within current telecoms networks the generation of charging information, data counters and voice traffic is completed in a centralised location (in the network core), for Voice (circuit switched communications) at the MSC-S, and for Data at the GGSN 6 (packet switched communications).

The charging/accounting records for data traffic consist of the time, duration, destinations, type of connection and volume (for packet sessions) sent for the data stream.

Conventionally all data traffic is transmitted with best effort QoS parameters, which implies that all delivered data has the same value/cost.

There is functionality for the Core Network to define a minimum QoS requirement for each data stream for a user, within predefined constraints. The core network counts the volume of data that is passed down the stream, and/or the time the stream is active, with the possibility for this to be charged in a differential fashion.

Packets which do not meet the minimum QoS requirements associated, with that stream (e.g., because they are excessively delayed) continue to be delivered or are discarded; either way these packets have been counted/charged at the core network.

Alternatively, there may be other cases where the experience perceived by the User may have a minimum quality requirement, and a preferred quality requirement, each of which have a different value to the user.

Under the current arrangement the packet can only be charged at a single rate.

The above capabilities are performed currently in the core function/nodes (GGSN 6). As described in relation to FIG. 2 above, the GGSN 6 performs charging functions. These charging functions are performed via a connection with policy server 9 and charging rules and IT network 9 A.

According to this embodiment (illustrated in FIG. 19) some charging functions are performed within the platform 700.

The platform 700 is connected to SGSN 5 which is in turn connected to GGSN 6. The GGSN 6 is connected to the policy server 9, which in turn is connected to the charging and IT network 9A, both of which are also connected to the platform 700.

As discussed above, the platform 700 allows application environments and network functions to move closer to the radio site. This enables more complex functions to be moved to the radio access network and for them to be hosted on the platform 700. That is, the services part 706 of the platform 700 may host applications, and the network functions part 704 of the platform 700 may perform network functions that were previously hosted on/performed by the core network. Platform 700 may be provided at an access node 800 at the node B or at the Femto/AP site, or at the gateway 802 at the RNC or BRAS site of the network.

Figure 19:
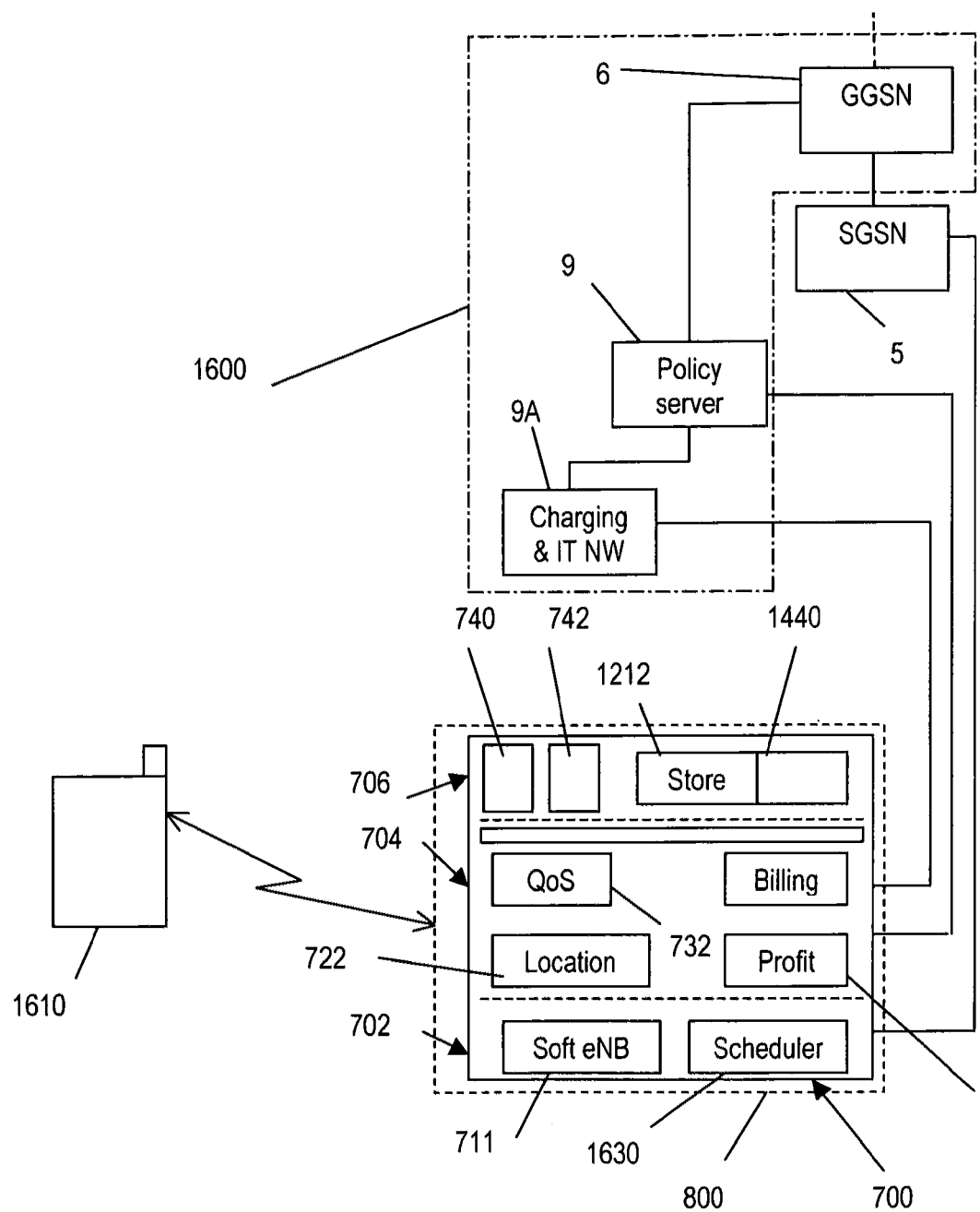
FIG. 19 shows the network elements used for an improved charging arrangement according to an embodiment of the system described herein.

The GGSN 6, policy server 9 and charging and IT network 9A are collectively referred to as the charging/accounting function of 1600 of the network, and are shown in FIG. 19. The charging/accounting function 1600 acuminates all the necessary data to charge each subscriber for use of the network.

The platform 700:
makes measurements of the radio load;
identifies the frequency and technology layer the subscriber is currently using;
makes measurements of 2G, 3G, 4G user coverage/distance from the site per technology, and overlapped coverage areas;
makes measurements of the quality of the radio link to the subscriber; identifies the terminal type used by the subscriber/client;
assess the properties of that technology/frequency in a specific cell/location.

These measurements (and other information) may be received at the soft nodes 702 (e.g., eNodeB 711) and passed to functions part 704 (e.g., QoS function 732).

The network functions part 704 (e.g., QoS function 732) may then pass all or selected parts of this information to other entities within the platform 700, such as the billing function 720 and the application 740, 742.

Because the access node 800 associated with the base station with which the terminal 1610 is registered in the radio access network is close to the terminal 1610, the network functions part of the platform 700 is able to receive from soft nodes 702 information relating to the radio conditions (to perform QoS function 732), and also terminal 1610 location (to perform location function 722). The location data may be calculated from GPS data provided by the terminal 1610, or may be calculated by another suitable mechanism such as cell triangulation or calculating the time that it takes for a transmitted data packet to be acknowledged by the terminal 1610. Various other location determining arrangements are known to those skilled in the art that may be suitable for implementation by the location functions 722.

The following proposals use this new billing framework in the access node 800 to enable more enhanced accounting and charging functions to be performed, including:
1. Real-time performance charging;
2. Scheduling based of relative profitability of packets;
3. Providing cost quotes for data services prior to data delivery;
4. User location aware charging (micro-zone charging); and
5. Charging based on application characteristics Part 1: Real-Time Performance Charging The billing function 720 introduces a new reporting functionality in the platform 700 which enables the radio functions to report to the charging/accounting function 1600 the quality at which the data was actually delivered to the subscriber.

One implementation involves the charging/accounting function 1600 providing a set of performance criteria within traffic flow. For enterprise customers, the performance criteria could be set per APN (Access Point Name). The performance criteria are extracted from the traffic flow by the billing function 720 and are provided to the soft nodes 702.

As the soft node 702 radio functions deliver the packets for the traffic flow, the radio functions classify the delivery performance for each packet against the criteria, and report the traffic volume for each criteria in the set to the billing function 720. This set of traffic volumes/performance criteria are then used to differentially charge the packets based on the delivered performance by the billing function 720 providing the traffic volume/performance criteria to the charging/accounting function 1600.

This functionality allows packets not meeting the minimum defined performance criteria to be delivered to the user, but the user not being charged. The delivery performance is measured by the soft node 702 throughout an active session with the terminal 1610, and the traffic volume for each performance criteria is then reported to the billing function 720 for the subsequent transmission to the charging/accounting function 1600 of the network core.

The performance criteria define parameters that allow the soft node 702 to classify whether each data packet is transmitted to a particular standard, for example to an "excellent" standard or a "poor" standard. This information is reported to the billing function 720, and is in turn provided to the charging/accounting functions 1600 for charging the user of the terminal 1610. For example, for data packets transmitted to the "excellent" standard, the user of terminal 1610 may be charged at the normal rate, whereas for data packets transmitted to the "poor" standard only, the user of the terminal 1610 may be charged at a lower rate or may not be charged at all.

Part 2: Scheduling Based of Relative Profitability of Packets

A new interface 1620 is introduced in the platform 700 from the Charging/Accounting functionality 1600 to the radio functions of the soft nodes 702, and this interface is used to pass information on the profitability or yield of data from a particular data flow of the subscriber using terminal 1610.

This (revenue or yield per MB) information is used by the scheduler 1630 in the platform 700 to allow differential treatment of data, maximizing the profitability of the data service.

One implementation is for the Charging/Accounting functionality 1600 to pass two profitability parameters for each data flow to the radio functions of the soft nodes 702 (via the interface 1620), one profitability parameter for the throughput up to a minimum data rate; and one profitability parameter for the throughput between the minimum and the maximum data rates for that flow. The profitability parameters for each data flow are then used by the scheduling algorithm 1620 to target the cell resources to the most profitable data flows.

The profitability parameter may be used to provide a high data rate/throughput for data where providing that high data rate/throughput may generate increased profit. For data where the profitability is the same irrespective of the data rate/throughput, such data may be given a lower priority (and is therefore likely to be transmitted at a lower data rate if the radio resources can be used to generate more profitable data transmissions).

Part 3: Providing Cost Quotes for Data Services Prior to Data Delivery

When the charging awareness and application hosting is moved to the access node 800, the radio soft nodes 702 and network functions 704 of the platform 700 are operable to negotiate with a hosted application (e.g., 740, 742) in the services part 706 for the current rate to deliver a service based on the current load/radio conditions of the client (at the user's terminal 1610).

This may be performed by the application 740, 742 requesting to the network functions part 704 for a file to delivered to a mobile device 1610, and the soft nodes 702 polling the device 1610 to determine the current radio quality and device capability; assessing the current network load and accessing historic load trends for the cell; and providing a set of quotes to the application 740, 742. The quote depends on the file size and the urgency; for instance delivery in real-time costs the most, delivery within x minutes costs less, delivery within x hours costs less again.

The quotes may be communicated to the application 740, 742 via the open API of the platform 700.

The quotes may be generated by the billing function 720, which may obtain quality of service data from the QoS function 732 (both real time and historical data, if appropriate). The quotes generated by the billing function 720 are then communicated to the application 740, 742. The application 740, 742 may be configured to automatically select a quote, and respond by identifying the selected quote to the billing function 720, which in turn communicates to the soft nodes part 702 of the platform 700 an indication of the rate at which the data relating to the application 740, 742 should be transmitted to the terminal 1610 in order to comply with the conditions of the quote. As an alternative to the quotes being reviewed and approved automatically, the quotes may be approved manually. For example, the application 740, 742 may communicate the quotes to the end user of the application, which may be the user of mobile terminal 1610. For example, the applications 740, 742 may cause the graphical user interface of the terminal 1610 to display the various quotes and enable the user of a terminal 1610 to select an appropriate quote. The selected quote may be communicated back to the application 740, 742, and from there communicated to the billing function 720. The communications to/from the applications 740, 742 are sent via radio access network to/from the platform 700 and the terminal 1610.

As indicated above, quotes may be provided for transmitting the data at different rates, and these depend upon the radio conditions at the end user mobile device 1610 and overall system load (such as the load within the cell served by the platform 700 access node 800). The measurements of the radio conditions and system load may be performed in real time. Alternatively, the measurements may not be real time measurements but may instead be based on statistical or historical information. For example, the statistical or historical information may be accumulated in the QoS function 732 of the platform 700 over a period of time and may be provided to the billing function 720 on request. This statistical or historical information may indicate the typical radio conditions and/or system load at the particular location of the user terminal 1610 (based on location information from the location function 722), and on the statistical/historical information relevant to the time of day/date that the data is to be delivered. In this way, the quote may reflect the radio conditions at a particular location within the cell served by the platform and may also reflect the variation in radio conditions and load at different times of day/different dates.

The quote or quotes provided by the billing function 720 may include a set of variable performances, such as throughput, delay, percent of dropped packets and their associated costs, and enabling the application 740, 742 (or the user requesting the data) to select an appropriate level of performance.

In an alternative arrangement, when an application 740, 742 wishes to arrange for data to be transmitted, that application may provide to the billing function 720 an indication of the cost (for example maximum cost) that can be incurred in delivering that data. The billing function 720 then assess the radio conditions and/or system load (and any other relevant factors), and then provides to the application 740, 742 a delivery quote indicating the delivery performance that is available at the cost requested. For example, the delivery quote may indicate the data rate that the data would be transmitted at the cost indicated by the application 740, 742.

Part 4: User Location Aware Charging (Micro-Zone Charging)

When the charging awareness and application hosting is moved to the node 800, the radio and network functions of the platform 700 can adjust the charging rate of radio usage and content dependent on the specific location of the subscriber device 1610 based on radio measurements of location, and signal strength. In this scenario, home-zone charging may have different rate than other zone.

The location information may be obtained by the billing function 720 from the location function 722 in the network functions part of the platform 700. As discussed above, the location information in the location function 722 may be obtained by any suitable mechanism. For example, the location may be measured by the platform 700 through radio parameters, such as path loss, received power and neighbouring cell measurements.

The charge made for transmitting data may be dependent upon the geographical location of the user terminal 1610 or may be dependent upon the radio performance at that geographical location. In a former case, the geographic location may be a home address of the user, so that the user receives a preferential rate for data transmitted at that home location. In the latter arrangement, the charge may be based on the radio quality at the location of the user terminal 1610, with a higher charge being made for locations where the radio quality is worse.

Part 5: Charging Based on Application Characteristics

When the charging awareness of certain applications (e.g., 740, 742) is moved to the access node 800 it enables the charging based on the application characteristics.

Traffic with different characteristics may have very different costs from a network capacity perspective.

Paging—when service is bursty, but has a large inter-arrival time between bursts; paging, control channel and packet buffering resources are used more
  Scheduling Resources—Large packet sizes are much more efficient for scheduling resources, allowing greater utilisation of the access resources; as well as applications that have a constant packet arrival rate (e.g., voice)
  Radio frame inefficiency with small packet sizes The network functions 704 characterise each traffic flow, to determine to which application set it belongs, with each application set having a separate charging policy. For example, non-realtime applications, with large packet sizes, and very bursty profiles are charged at a low rate; whereas applications with small packet sizes, but less bursty (constant throughput) are charged at a higher rate.

Thus, a user may be charged in dependence upon the characteristics of the data that they have transmitted. For example, the billing function 720 may characterise the data transmitted by a particular application 740,742 by the impact they have on the network capacity. Applications which have a greater impact or network capacity may be charged at a higher rate, when used by the user, than applications that have a lower impact on the network capacity, when used by the user. Additionally, applications with guaranteed data rate may be charged higher than application with best effort data rate The charge may be dependent upon how frequent the transmission of the data requires the user terminal 1610 to transition between the idle and active states. The charge be dependent upon the number of handovers performed during a data session. The charge may vary in dependence upon the distance travelled during an active session during which the data are transmitted. The charge may be in dependence upon whether the data transmitted (e.g., content) is provided from a cache or from the internet (or elsewhere). If the data is provided from a cache located on the platform 700 (or near to the platform 700), then the overhead incurred in transmitting the data is lower and if the data has to be retrieved from elsewhere, such as via the core network and the internet. The charge for transmitting data that is available from the cache of the platform may therefore be lower.

The charge may vary in dependence upon the quantity of resources utilised in the platform 700, such as the amount of processing power or storage capacity used.

The charging awareness may also be performed by the gateway 802.

Application and User Aware SON (P100942-GB-PSP)

Self-Organising Networks

Figure 20:
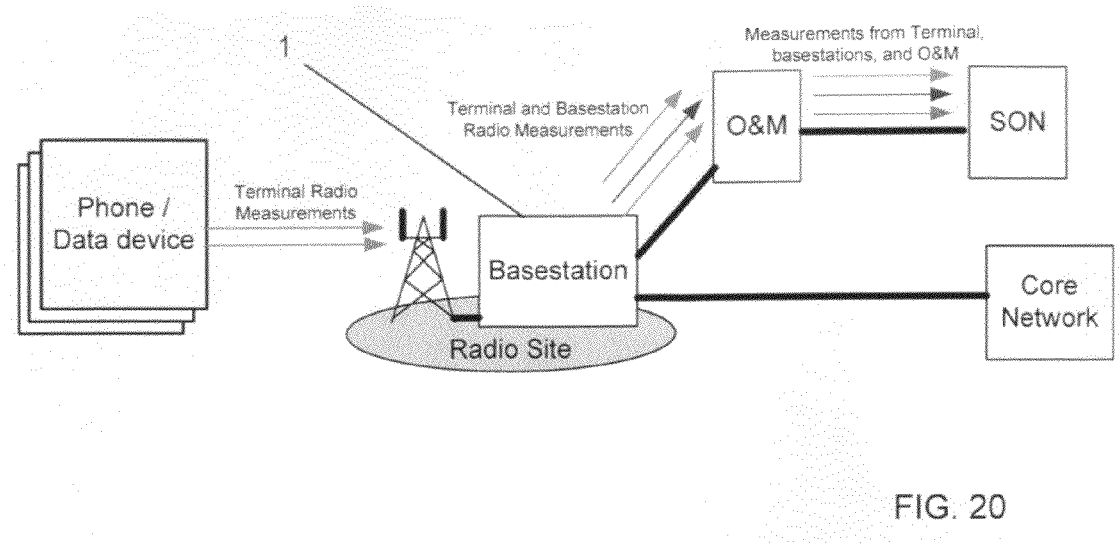
FIG. 20 shows a known Self Organising Network (SON) arrangement according to an embodiment of the system described herein.

FIG. 20 shows a known network arrangement. Great emphasis has been made in recent years on the development of Self-organising networks (SONs) 1410. These networks introduce smart functions within the Network Management domain 1420 of the network allowing tasks to be automated.

The radio measurements performed by the base station 1 and the terminal are used to build an underlying trend of data performance such that non-real time optimisation tasks can be performed by the SON 1410 to target network errors and increase the underlying data performance.

These tasks typically include the determining of neighbour cell relationships, and configuring the cell parameters to perform general optimisation of the radio environment.

Figure 21:
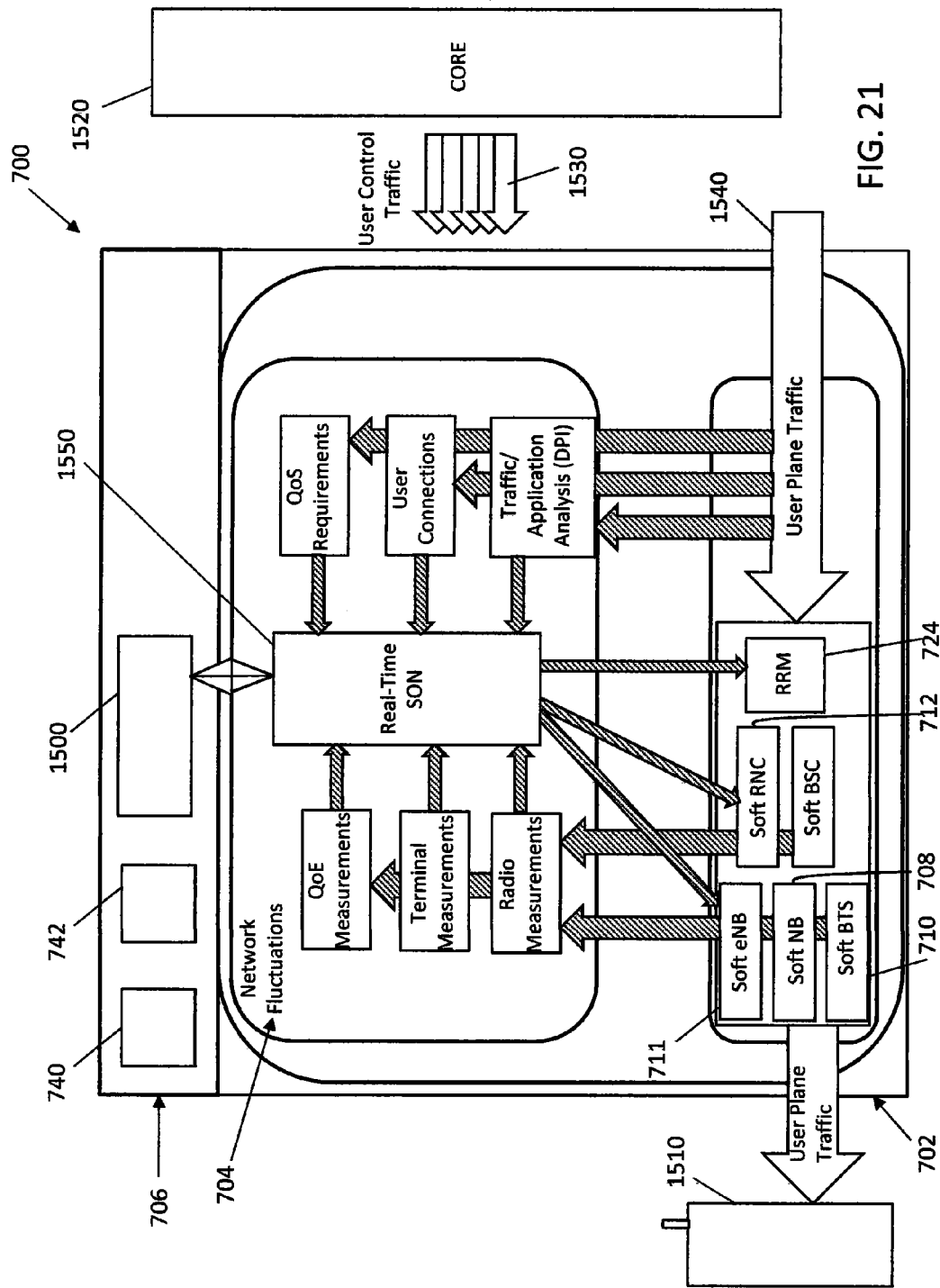
FIG. 21 shows an improved SON arrangement in according to an embodiment of the system described herein.

According to an embodiment of the system described herein, as shown in FIG. 21, it is proposed to introduce functionality (SON entity 1500) into the services/application/network environment 706 of platforms 700, to monitor simultaneously device type, customer types and application combinations.

The attained information is used by the new entity in real time to modify the radio specific parameters, the traffic handling algorithms and the ring-fenced processor capacity of the soft network functions 704.

The type of scheduling algorithm used and its configuration provide a different balance between the cell edge performance and cell capacity. These algorithms are typically statically configured for the cell; however, according to the embodiment, by introducing traffic analysis at the platform 700 this can be used to modify the algorithm in real-time.

Also modification of the control channel overhead/quantity may be based on the number of users or the application that may be scheduled. The radio resource allocation may be defined for a type of application or user—the pre-allocated resource blocks or Codes, or Timeslots.

As discussed in detail above, the platform 700 includes a soft nodes part 702, a network functions part 704 and a services part 706. The soft nodes part 702 controls the physical/transport layer. The network functions part 704 controls the network functions layer. The physical/transport layer and network functions layers are defined in the relevant mobile telecommunications Standards (e.g., 3GPP TS 25.401, 25.420 which are incorporated herein by reference). The services part 706 controls the application layer.

The services part 706 hosts applications 704 and 702 which provide services to terminal 1510 that is served by the platform 700 (which terminal 1510 communicates with the platform 700 via the radio frequency part of an appropriate base station).

The platform 700 is connected to the core network 1520 via an appropriate backhaul connection. User control traffic 1530 passes between the core network 1520 and the platform 700. User plane traffic 1540 passes between the core network 1520, the platform 700 and the terminal 1510.

The terminal 1510 may be a mobile terminal that is connected to the radio frequency part of the base station associated with the platform 700 by a cellular/wireless/radio connection. The terminal 1510 may also be a fixed terminal that is connected either by a wireless or a wired/cable connection.

The platform 700 is also operable to receive information from the core network 1520 such as information relating to the customer type and device type of any terminal registered therewith and any policy associated with them. For example, when the terminal 1510 registers with the platform 700 it may provide the platform 700 its IMEI and its IMSI. The platform 700 may pass the IMEI/IMSI to the core network 1520. The core network 1520 consults a register (such as a Home Location Register, HLR) to determine the type of device corresponding to the IMEI and the user corresponding to the IMSI. This device and user information is then passed back to the platform 700, and may be used by the platform 700 to control how the platform 700 interacts with the terminal 1510.

The platform 700 may be located at an access node (800), corresponding to a base station, or at a gateway node (802) or physically split between access node and the gateway node but logically contained.

In practice, the radio access network of the mobile telecommunications network comprises a plurality of base stations, access node 800 platforms 700 and gateway node 802 platforms 700 to facilitate communication between mobile terminals, such as terminal 1510, and the core network 1520. Selectively, communications may bypass the core network 1520 when it is deemed appropriate in the manner described above to offload traffic.

In accordance with this embodiment, the services part 706 of the platform 700 includes SON entity 1500, which is operable to perform self organising network functions. The SON entity 1500 communicates with the network functions part 704 of the platform 700 by SON module 1550.

For each terminal registered with the platform 700, such as terminal 1510, the SON entity 1500 receives from the network functions part 704 of the platform 700 information relating to the device type of the terminal 1510, the customer type of the user of the terminal 1510 and any of the applications 740, 742 hosted or served by the platform 700 that are used by the terminal 1510. The device type and customer information may be obtained using the IMEI/IMSI, following consultation with the core network 1520 in the manner described above. The platform 700 may be aware of the application 740, 742 used by the terminal 1510 as it hosts those applications and controls the interactions between the terminal 1510 and the application 740,742.

The SON entity 1500 monitors the network performance and the performance provided in relation to the application or applications 740, 742 hosted by the platform 700. This application performance data may relate to the general performance provided by the application 740, 742 or may relate to the performance of that application specific to a particular terminal 1510 or device type.

Advantageously, due to the open API between the services part 706 and the network part 704 of the platform 700, performance data obtained by the SON entity 1500 may be communicated via the API to the network functions part 702 and the soft nodes part 702 of the platform 700 (between entities at the application layer, the network layer and the physical/transport layer).

The platform 700 may use this performance data relating to application or applications 740, 742 to make modifications to the platform 700 interacts with the terminal 1510 that is using the applications (and other terminals using the applications as well, if appropriate). For example, the platform 700 may in real time modify specific parameters of the physical/transport layer of the network. the parameters may include radio resource allocated per application (e.g., time slots in GPRS, codes in WCDMA or Resource Blocks in LTE). The platform 700 may also in real time modify functionality within the network layer. Such functionality may include LTE or HSPA Scheduler.

The platform 700 may in real time modify hardware resource allocation of the platform 700. For example, the platform 700 may modify the size of the cache provided for each application 740, 742 and/or the quantity of resources used by each application 740, 742 from the resource pool available to platform 700 (for example, the proportion of the communication capacity of the platform 700).

The platform 700 may in real time modify parameters that control the operation of the applications 740, 742 hosted in the services part 706 of the platform 700. For example, the modification of video codec The control of the platform 700 of the physical/transport layer parameters, network layer functionality, hardware resource allocation and/or application parameters may be performed by the SON entity 1500 by the soft nodes part 702 and the network functions part 704 providing relevant information thereto via the open API. The SON entity 1500 is then able to modify the relevant parameters, functionality, resource allocation etc by, via the open API, communicating with the network functions part 704 and/or the soft nodes part 702 of the platform 700 to effect the necessary control.

The platform 700 (for example, using the SON entity 1500) may in real time modify specific parameters, such as the traffic handling algorithm and the proportion of processor capacity of the soft network functions 704 provided to a particular application or a particular terminal or device type using that application 740, 742. Also, the type of scheduling in algorithm used and its configuration may be varied to adjust the balance between cell edge performance and cell capacity in dependence upon the measurements received by the SON entity 1500 in order to maximise the user experience.

The SON entity 1500 may modify the control channel overhead/quantity based on a number of users or applications 740, 742 scheduling. The radio resource allocation may be defined for a type of application or user, by allocating particular resource blocks, codes or time slots.

As mentioned above, the mobile telecommunications network includes a plurality of platforms 700. The platform 700 may communicate directly or indirectly with each other. The SON entity 1500 of one platform 700 may communicate with the SON entity or another platform 700 and also to modify the functionality or resource allocation of that other platform. For example, the SON entity 1500 may detect when its storage capacity/cache is nearing maximum capacity, and may communicate with the SON entity of a neighbouring platform to request permission for and arranged for the use of spare storage/cache capacity of that neighbouring platform.

The headings used in this description shall have on affect on the meaning or interpretation of the description.

(P100971-GB-PSP)

These numbered clauses are not presently claims in this application but they do provide a non-exhaustive indication of what the applicant considers to be inventive. The applicant hereby gives notice that they intent to, and reserves the right to, claim any of this subject-matter in the present application or in any divisional applications filed in the future.

1. A mobile telecommunications network including a core and a radio access network having a radio for wireless communication with terminals registered with the network, wherein the radio access network includes a controller operable to control the use of network resources by the terminals, wherein the controller hosts at least one application that provides service to at least one of the terminals, and wherein the controller is operable to adjust the use of network resources in dependence upon the application providing service to the terminal.
2. The network of clause 1, wherein the controller is operable to adjust the content provided by the application.
3. A mobile telecommunications network including a core and a radio access network having a radio for wireless communication with terminals registered with the network, wherein the radio access network includes a controller operable to control the use of network resources by the terminals, wherein at least one of the terminals runs at least one application that provides service to the terminal, and wherein the terminal further includes a resource manager operable to adjust the network resource used by the application.
4. The network of clause 3, wherein the resource manager is operable to receive network resource data from the controller and to adjust the network resource used by the application in dependence upon the network resource data.
5. The network of clause 4, wherein the resource manager receives network resource data from controller via cell broadcast.
6. The network of clause 4 or 5, wherein the controller is operable to monitor whether the terminal uses network resource in accordance with the provided network resource data.
7. The network of clause 3, wherein the resource manager is operable to adjust the network resource used by the application in dependence upon a characteristic of the application.
8. The network of clause 7, wherein the characteristic includes whether data delay is acceptable.
9. A mobile telecommunications network substantially as hereinbefore described with reference to and/or as illustrated in FIG. 16 of the accompanying drawings.

(P100935-GB-PSP)

These numbered clauses are not presently claims in this application but they do provide a non-exhaustive indication of what the applicant considers to be inventive. The applicant hereby gives notice that they intent to, and reserves the right to, claim any of this subject-matter in the present application or in any divisional applications filed in the future.

1. A mobile telecommunications network including a core and a radio access network having a radio for wireless communication with mobile terminals registered with the network, wherein the radio access network includes a controller operable to control the use of network resources by the mobile terminals, and wherein the controller is operable control to the transfer of data between the mobile terminals and a store.
2. The network of clause 1, wherein the controller is operable to temporarily store data transmitted from the mobile terminals at the radio, for subsequent transmission to the data store.
3. The network of clause 1, wherein the controller is operable to temporarily store backup data from the mobile terminals, for subsequent transmission to the store.
4. The network of clause 1, 2 or 3, wherein the store is provided at the core, a webpage and/or cloud storage.
5. The network of clause 2, 3 or 4, wherein the controller is operable to transmit the temporarily stored data in dependence upon one or more predetermined criteria.
6. The network of clause 5, wherein the criteria are determined by the controller and include at least one of location of the terminal, priority of the data, network load, time of day, user subscription information, mobility of the terminal, available storage on the terminal and/or temporary store, radio access technology through which the mobile terminal is connected, offered throughput for the terminal, estimated user experience of data transmission, available bandwidth of radio site backhaul transmission and the terminal user activity in other services.
7. The network of clause 1, 2, 3, 4, 5 or 6, wherein the controller is provided at an access node site and/or a gateway site.
8. The network of any one of clauses 1 to 7, wherein the data are stored in a plurality of distributed data stores, which are at different geographical locations, the controller being operable to control on which of the stores the data are stored.
9. The network of clause 8, wherein the controller is operable to control when data from the distributed data stores are transmitted to the store, webpage or cloud storage.
10. The network of any one of clauses 8 to 9, wherein the controller is operable to control when data from each of the stores are transmitted to the terminal or to another one of the stores.
11. The network of clause 8, 9 or 10, wherein the controller is operable to predict the future location of the terminals and to control on which of the stores data are stored in dependence upon the predicted future location.
12. The network of any one of clauses 1 to 11, wherein the controller is operable to predict at least one of the future location of the terminals, radio performance and radio capacity, and to control when uplink data is transmitted to one of the stores by the terminal in dependence upon the prediction.
13. A method of operating a mobile telecommunications network including a core and a radio access network having a radio for wireless communication with mobile terminals registered with the network, wherein the radio access network includes a controller operable to control the use of network resources by the mobile terminals, the method including using the controller to control to the transfer Of data between the mobile terminals and a store.
14. The method of clause 13, wherein the controller temporarily stores data transmitted from the mobile terminals at the radio, for subsequent transmission to the data store.
15. The method of clause 13, wherein the controller temporarily stores backup data from the mobile terminals, for subsequent transmission to the store.
16. The method of clause 13, 14 or 15, wherein the store is provided at the core, a webpage and/or cloud storage.
17. The method of clause 14, 15 or 16, wherein the controller transmits the temporarily stored data in dependence upon one or more predetermined criteria.

18. The method of clause 17, wherein the criteria are determined by the controller and include at least one of location of the terminal, priority of the data, network load, time of day, user subscription information, mobility of the terminal, available storage on the terminal and/or temporary store, radio access technology through which the mobile terminal is connected, offered throughput for the terminal, estimated user experience of data transmission, available bandwidth of radio site backhaul transmission and the terminal user activity in other services.

19. The method of clause 13, 14, 15, 16, 17 or 18, wherein the controller is provided at an access node site and/or a gateway site.

20. The method of any one of clauses 13 to 19, wherein the data are stored in a plurality of distributed data stores, which are at different geographical locations, the controller being operable to control on which of the stores the data are stored.

21. The method of clause 20, wherein the controller controls when data from the distributed data stores are transmitted to the store, webpage or cloud storage.

22. The method of any one of clauses 20 to 21, wherein the controller controls when data from each of the stores are transmitted to the terminal or to another one of the stores.

23. The method of clause 20, 21 or 22, wherein the controller predicts the future location of the terminals and controls on which of the stores data are stored in dependence upon the predicted future location.

24. The method of any one of clauses 13 to 23, wherein the controller predicts at least one of the future location of the terminals, radio performance and radio capacity, and controls when uplink data is transmitted to one of the stores by the terminal in dependence upon the prediction.

25. A mobile telecommunications network substantially as hereinbefore described with reference to and/or as illustrated in any one of or any combination of FIGS. 17 to 18 of the accompanying drawings.

26. A method of operating a mobile telecommunications network, substantially as hereinbefore described with reference to and/or as illustrated in any one of or any combination of FIGS. 17 to 18 of the accompanying drawings.

(P100943-GB-PSP)

These Numbered Clauses are not Presently Claims in this Application but they do provide a non-exhaustive indication of what the applicant considers to be inventive. The applicant hereby gives notice that they intent to, and reserves the right to, claim any of this subject-matter in the present application or in any divisional applications filed in the future.

1. A mobile telecommunications network including a core and a radio access network having a radio for wireless communication with mobile terminals registered with the network, wherein the radio access network includes a controller operable to control the use of network resources by the mobile terminals, and wherein the controller is further operable to control the charging for use of the network resources.

2. The network of clause 1, wherein the controller is operable to charge in dependence upon the performance of the radio.

3. The network of clause 1 or 2, wherein the controller is operable to schedule the delivery of data in dependence upon the profitability of the transaction.

4. The network of clause 1, 2 or 3, wherein the controller is operable to provide a cost indication to a user or application before delivery of data.

5. The network of clause 1, 2, 3 or 4, wherein the controller is operable to charge the users in dependence upon their location.

6. The network of clause 1, 2, 3, 4 or 5, wherein the controller is operable to charge in dependence upon the characteristics of the data transmitted.

7. The network of any one of clauses 1 to 6, wherein the controller is operable to provide a charge to user or application in dependence on the performance delivered.

8. The network of any one of clauses 1 to 7, wherein the controller is operable to provide a charge to user or application in dependence on the time required to deliver data.

9. A method of operating a mobile telecommunications network including a core and a radio access network having a radio for wireless communication with mobile terminals registered with the network, wherein the radio access network includes a controller operable to control the use of network resources by the mobile terminals, the method including operating the controller to control charging for use of the network resources.

10. The method of clause 9, wherein the controller charges in dependence upon the performance of the radio.

11. The method of clause 9 or 10, wherein the controller schedules the delivery of data in dependence upon the profitability of the transaction.

12. The method of clause 9, 10 or 11, wherein the controller provides a cost indication to a user or application before delivery of data.

13. The method of clause 9, 10, 11 or 12, wherein the controller charges the users in dependence upon their location.

14. The method of clause 9, 10, 11, 12 or 13, wherein the controller charges in dependence upon the characteristics of the data transmitted.

15. The method of any one of clauses 9 to 14, wherein the controller provides a charge to user or application in dependence on the performance delivered.

16. The method of any one of clauses 9 to 15, wherein the controller provides a charge to user or application in dependence on the time required to deliver data.

13. A mobile telecommunications network including controller operable to control charging, substantially as hereinbefore described with reference to and/or as illustrated in any one of or any combination of FIGS. 1 to 19 of the accompanying drawings.

14. A method of operating a mobile telecommunications network including using controller control charging, substantially as hereinbefore described with reference to and/or as illustrated in any one of or any combination of FIGS. 1 to 19 of the accompanying drawings.

(P100942-GB-PSP)

These Numbered Clauses are not Presently Claims in this Application but they do provide a non-exhaustive indication of what the applicant considers to be inventive. The applicant hereby gives notice that they intent to, and reserves the right to, claim any of this subject-matter in the present application or in any divisional applications filed in the future.

1. A mobile telecommunications network including a core and a radio access network having a radio for wireless communication with terminals registered with the network, wherein the radio access network includes a controller operable to control the use of network resources by the mobile terminals, wherein the controller is operable to perform self organising network functions.

2. The network of clause 1, wherein the controller is operable to monitor the device type, customer types and/or application used.

3. The network of clause 2, wherein the controller is operable to monitor the network performance in relation to the device type, customer type and or application used and generate measurements thereof.

4. The network of clause 3, wherein the controller is operable to communicate the measurements to different self organising network entities of the controller that perform the self organising network functions, the entities being at a physical/transport layer, network layer and/or application layer.
5. The network of clause 4, wherein the or each of the entities are operable to modify functionality of their associated layer in response to the measurements.
6. The network of any one of clauses 1 to 5, wherein the controller is operable to in real time modify hardware resource allocation of the controller and/or parameters that control the operation of an application hosted by the controller.
7. The network of any one of clauses 1 to 6, wherein the controller is operable to modify parameters of terminals associated therewith and/or parameters of other controller in the radio access network.
8. A method of operating a mobile telecommunications network including a core and a radio access network having a radio for wireless communication with terminals registered with the network, wherein the radio access network includes a controller operable to control the use of network resources by the mobile terminals, the method including using the controller is perform self organising network functions.
9. The method of clause 8, wherein the controller monitors the device type, customer types and/or application used.
10. The method of clause 9, wherein the controller monitors the network performance in relation to the device type, customer type and or application used and generate measurements thereof.
11. The method of clause 10, wherein the controller communicates the measurements to different self organising network entities of the controller that perform the self organising network functions, the entities being at a physical/transport layer, network layer and/or application layer.
12. The method of clause 11, wherein the or each of the entities modifies functionality of their associated layer in response to the measurements.
13. The method of any one of clauses 8 to 12, wherein the controller in real time modifies hardware resource allocation of the controller and/or parameters that control the operation of an application hosted by the controller.
14. The method of any one of clauses 8 to 13, wherein the controller modifies parameters of terminals associated therewith and/or parameters of other controller in the radio access network.
14. A mobile telecommunications network substantially as hereinbefore described with reference to and/or as illustrated FIGS. 20 and/or 21 of the accompanying drawings.
16. A method of operating a mobile telecommunications network, substantially as hereinbefore described with reference to and/or as illustrated FIGS. 20 and/or 21 of the accompanying drawings.

Various embodiments discussed herein may be combined with each other in appropriate combinations in connection with the system described herein. In that regard, note that the terms "radio", "controller", and "manager" (as well as other terms used herein) may be understood to include one or more components capable of providing the functionality described herein in connection with those components. Additionally, in some instances, the order of steps in the flowcharts, flow diagrams and/or described flow processing may be modified, where appropriate. Further, various aspects of the system described herein may be implemented using software, hardware, a combination of software and hardware and/or other computer-implemented modules or devices having the described features and performing the described functions.

Software implementations of the system described herein may include executable code that is stored in a computer readable medium and executed by one or more processors. The computer readable medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible or non-transitory computer readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:
1. A mobile telecommunications network, comprising:
a core; and
a radio access network having a radio that wirelessly communicates over a coverage area with mobile terminals registered with the network, wherein the radio access network includes a controller that controls allocation of network resources to the mobile terminals, and wherein the controller is operable to:
gauge radio conditions available to the mobile terminals and control transmission of data between the radio access network and the mobile terminals in dependence thereon;
calculate the location and velocity of at least one of mobile terminals and control the transmission of data in dependence thereon,
predict a future location of the at least one of the mobile terminals based on the calculated location and velocity of the mobile terminals;
use a record of radio quality across the coverage area to estimate the radio conditions available to the at least one mobile terminal at the future location and control the transmission of data between the radio access network and the at least one mobile terminal at the calculated location in dependence thereon; and
perform at least one of:
 (i) increase an amount of data transmitted at the calculated location of the at least one mobile terminal if the radio conditions at the future location are predicted to be below a quality threshold, or
 (ii) decrease the amount of data transmitted at the calculated location of the at least one mobile terminal if the radio conditions at the future location are predicted to be above the quality threshold,
wherein the transmitted data is stored on a memory of the at least one mobile terminal.
2. The network of claim 1, wherein the radio access network includes a plurality of cells and the controller controls the transmission of data within at least one of the cells according to conditions therein.
3. The network of claim 1, wherein the controller gauges the radio conditions by measuring radio conditions at the mobile terminals.
4. The network of claim 1, wherein the controller gauges the radio conditions by predicting the radio conditions available to the mobile terminals.

5. The network of claim 1, wherein the controller builds and maintains the record of radio quality across the coverage area of the network.

6. The network of claim 1, wherein the controller gauges backhaul resources available to the mobile terminals and controls transmission of data between the radio access network and the mobile terminals in dependence thereon, and wherein the controller gauges radio conditions by at least one of: assessing the backhaul resources available to the mobile terminals, predicting backhaul capacity available to the mobile terminals, and building and maintaining a record of backhaul capacity for one of: a cell and a radio site and using the record to predict the backhaul capacity available to the mobile terminals.

7. The network of claim 1, wherein the controller triggers initialization, suspension or termination of applications based on one of: measured radio conditions, predicted radio conditions, measured backhaul capacity, and predicted backhaul capacity.

8. The network of claim 1, wherein the controller is operable to control the use of network resources by the mobile terminals, wherein the controller hosts at least one application that provides service to at least one of the mobile terminals, and wherein the controller is operable to adjust the use of network resources in dependence upon the application providing service to the at least one of the mobile terminals.

9. The network of claim 1, wherein the controller is operable to control the use of network resources by the mobile terminals, and wherein the controller is operable control to the transfer of data between the mobile terminals and a store.

10. The network of claim 1, wherein the controller is operable to control the use of network resources by the mobile terminals, and wherein the controller is further operable to control the charging for use of the network resources.

11. The network of claim 1, wherein the controller is operable to control the use of network resources by the mobile terminals, and wherein the controller is operable to perform self-organizing network functions.

12. A method of operating mobile telecommunications network including a core and a radio access network having a radio for wireless communication over a coverage area with mobile terminals registered with the network, the method comprising:

operating a controller to control allocation of network resources to the mobile terminals;

gauging radio conditions available to the mobile terminals; and controlling transmission of data between the radio access network and the mobile terminals according to the radio conditions.

calculating the location and velocity of at least one of mobile terminals and control the transmission of data in dependence thereon, predicting a future location of the at least one of the mobile terminals based on the calculated location and velocity of the mobile terminals;

using a record of radio quality across the coverage area to estimate the radio conditions available to the at least one mobile terminal at the future location and control the transmission of data between the radio access network and the at least one mobile terminal at the calculated location in dependence thereon; and performing at least one of:
  (i) increasing an amount of data transmitted at the calculated location of the at least one mobile terminal if the radio conditions at the future location are predicted to be below a quality threshold, or
  (ii) decreasing the amount of data transmitted at the calculated location of the at least one mobile terminal if the radio conditions at the future location are predicted to be above the quality threshold, wherein the transmitted data is stored on a memory of the at least one mobile terminal.

13. The method of claim 12, wherein the radio access network includes a plurality of cells and the controller controls the transmission of data within a particular one of the cells in dependence upon the gauged conditions within the particular one of the cells.

14. The method of claim 12, wherein the controller gauges the radio conditions by at least one of: assessing the radio conditions available to the mobile terminals and predicting the radio conditions available to the mobile terminals.

15. The method of claim 14, wherein the controller builds and maintains the record of radio quality across the coverage area of the network.

\* \* \* \* \*